United States Patent
Inoue et al.

(12) 
(10) Patent No.: US 6,893,045 B2
(45) Date of Patent: May 17, 2005

(54) OCCUPANT ARRESTING DEVICE

(75) Inventors: Michio Inoue, Aichi (JP); Chiharu Totani, Aichi (JP); Toshinori Tanase, Aichi (JP); Shinji Oguchi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 191 days.

(21) Appl. No.: 10/257,934

(22) PCT Filed: Apr. 27, 2001

(86) PCT No.: PCT/JP01/03695

§ 371 (c)(1),
(2), (4) Date: Oct. 21, 2002

(87) PCT Pub. No.: WO01/83273

PCT Pub. Date: Nov. 8, 2001

(65) Prior Publication Data

US 2003/0075910 A1 Apr. 24, 2003

(30) Foreign Application Priority Data

| May 1, 2000 | (JP) | 2000-132581 |
| May 26, 2000 | (JP) | 2000-157323 |
| Jun. 1, 2000 | (JP) | 2000-164019 |
| Jul. 7, 2000 | (JP) | 2000-207302 |
| Feb. 14, 2001 | (JP) | 2001-37451 |

(51) Int. Cl.⁷ ............................................. B60R 21/02
(52) U.S. Cl. .................... 280/753; 280/730.2; 280/749
(58) Field of Search .......................... 280/753, 730.2, 280/749, 743.1

(56) References Cited

U.S. PATENT DOCUMENTS

| 5,462,308 A | * | 10/1995 | Seki et al. ................... 280/749 |
| 5,480,181 A | * | 1/1996 | Bark et al. ................ 280/730.2 |
| 5,707,075 A | * | 1/1998 | Kraft et al. .............. 280/730.2 |
| 5,752,713 A | | 5/1998 | Matsuura et al. |
| 6,135,497 A | * | 10/2000 | Sutherland et al. ......... 280/749 |

FOREIGN PATENT DOCUMENTS

| DE | 19547494 A1 | 7/1997 |
| DE | 19843111 A1 | 3/2000 |
| JP | A-5-310098 | 11/1993 |
| JP | A-8-026063 | 1/1996 |

* cited by examiner

Primary Examiner—Eric Culbreth
(74) Attorney, Agent, or Firm—Posz Law Group, PLC

(57) ABSTRACT

An occupant restraining device (S1) is provided with a shielding member (51F/51R) to be deployed from the peripheral edge of a window (WF/WR) of a vehicle so as to shield the window (WF/WR). The occupant restraining device (S1) is further provided with an inflator (82), a cylinder (87) and a piston rod (88) for deploying the shielding member (51F/51R) housed to shield the window (WF/WR). The shielding member (51F/51R) is arranged to substantially rise from the lower edge side (DW) in the peripheral edge of the window (WF/WR). The shielding member (51F/51R) can be smoothly expanded to shield the window (WF/WR) even if the occupant leans against the peripheral edge of the window (WF/WR).

8 Claims, 58 Drawing Sheets

Fig.17
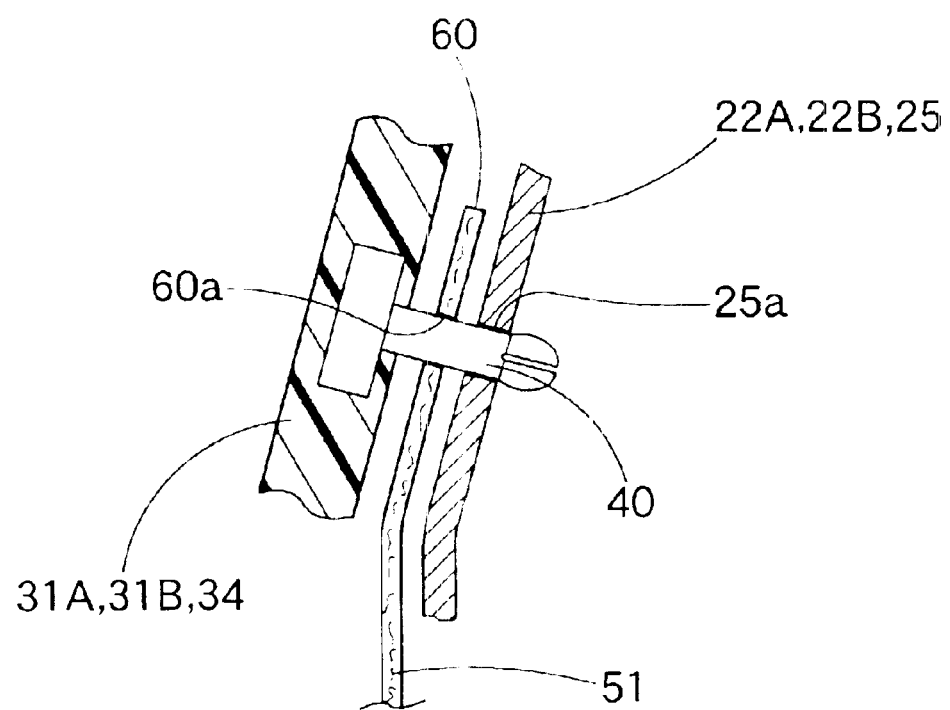
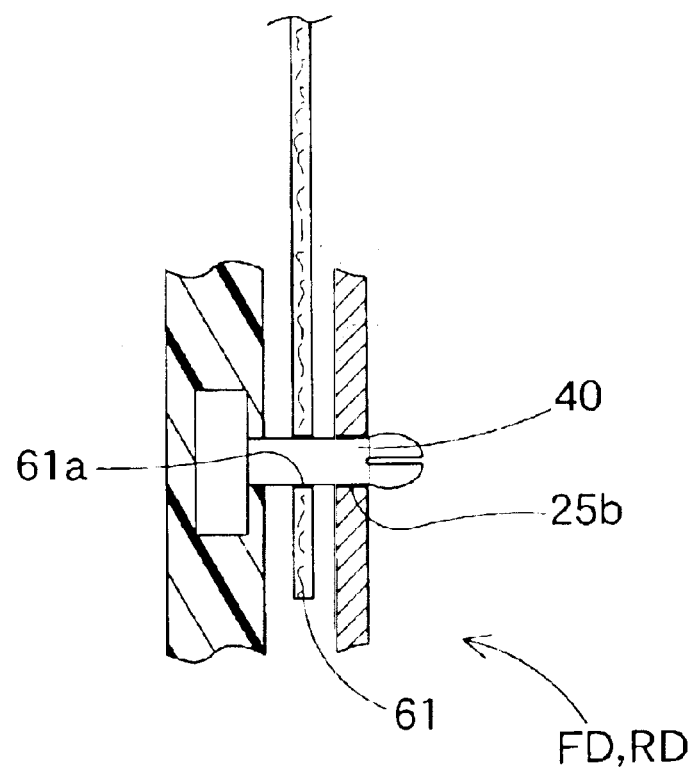

Fig.29
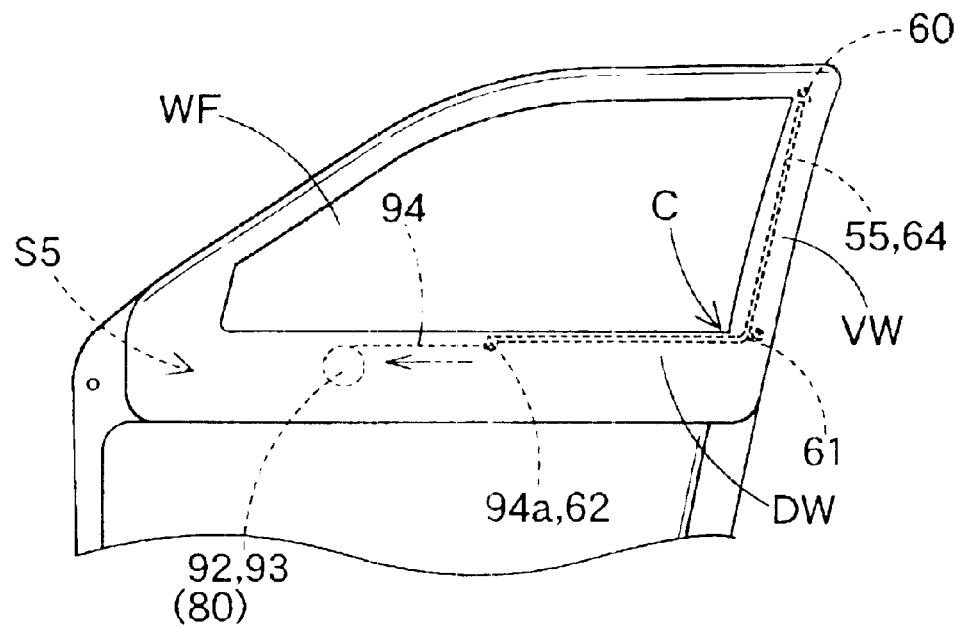
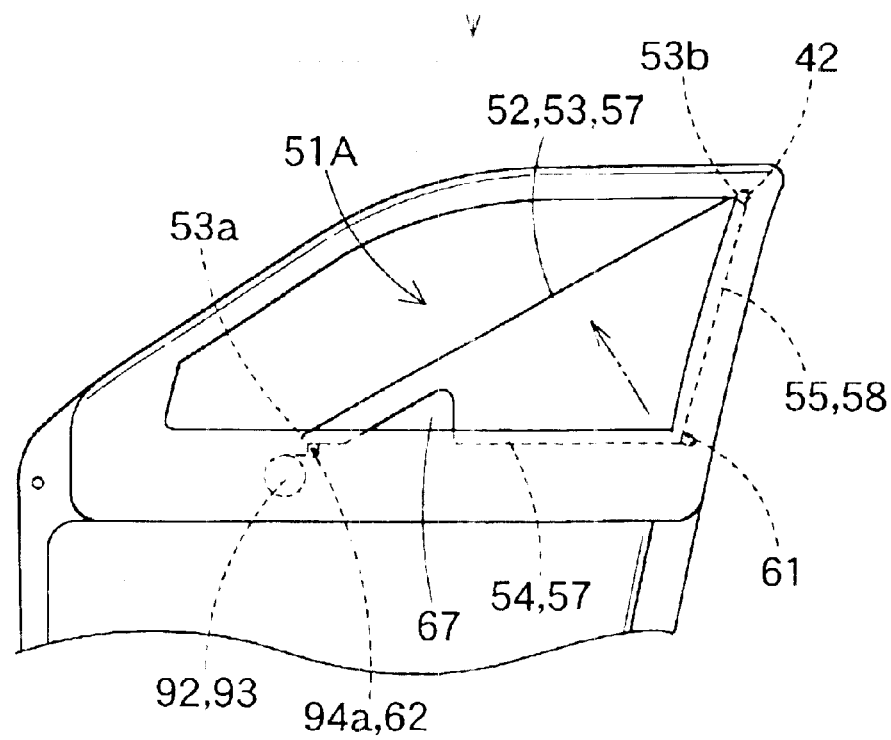

Fig.43
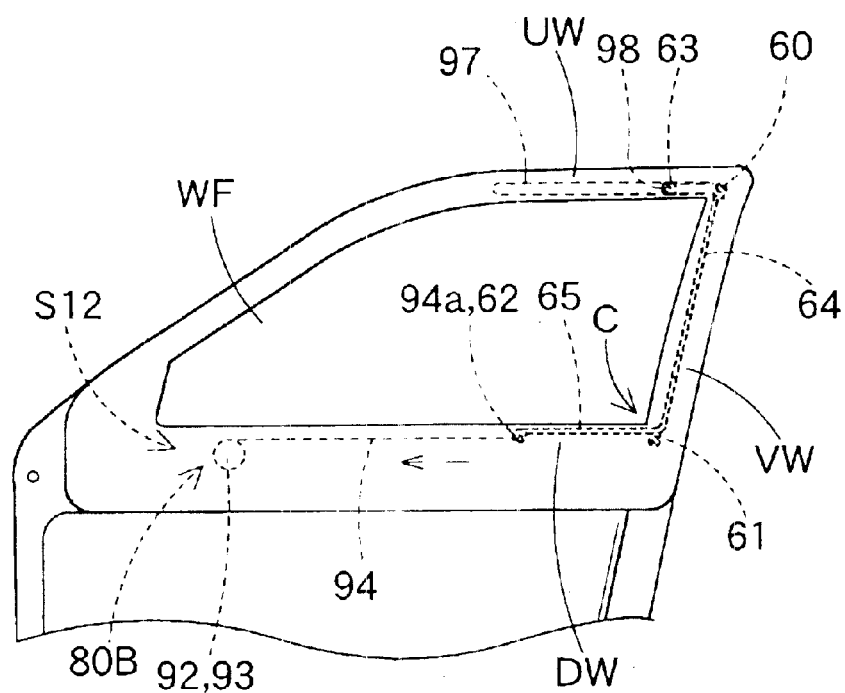
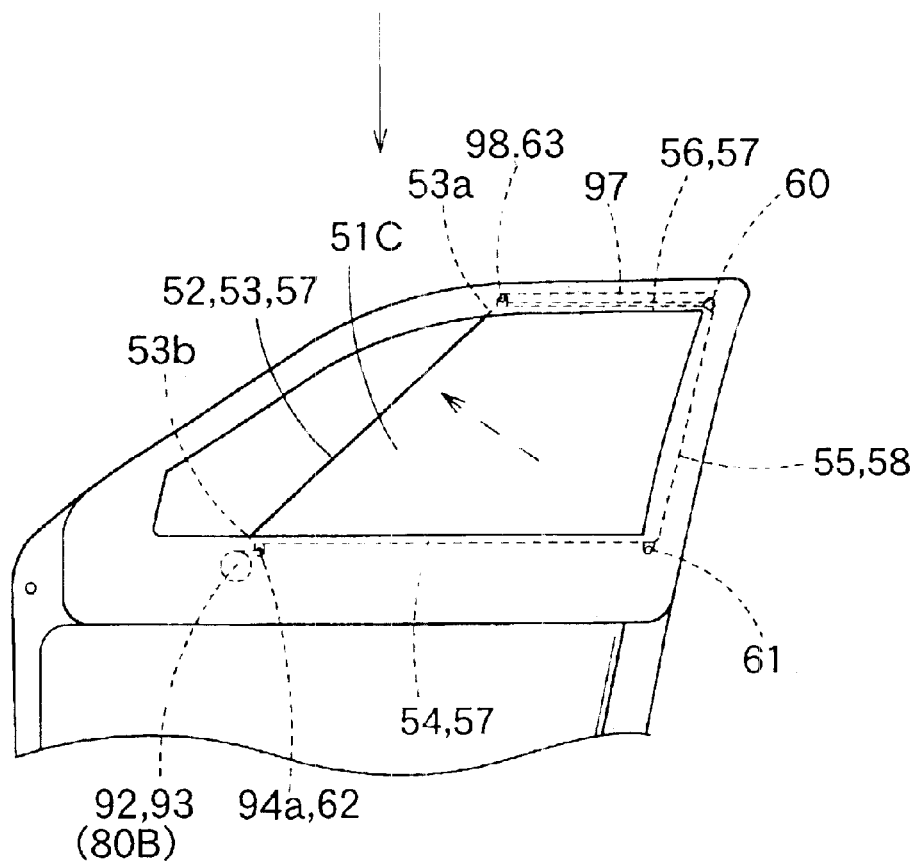

Fig.45
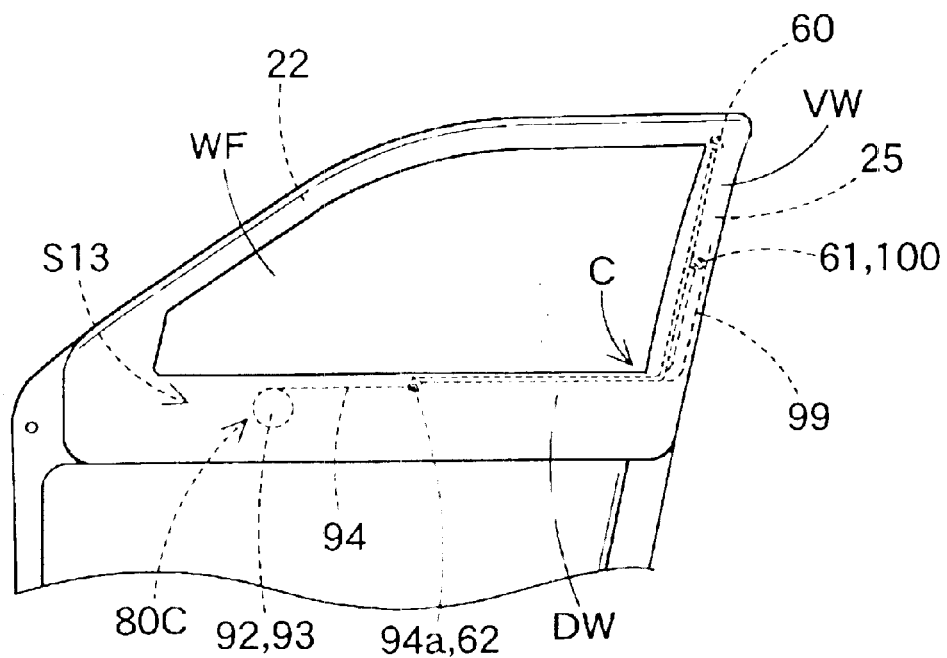
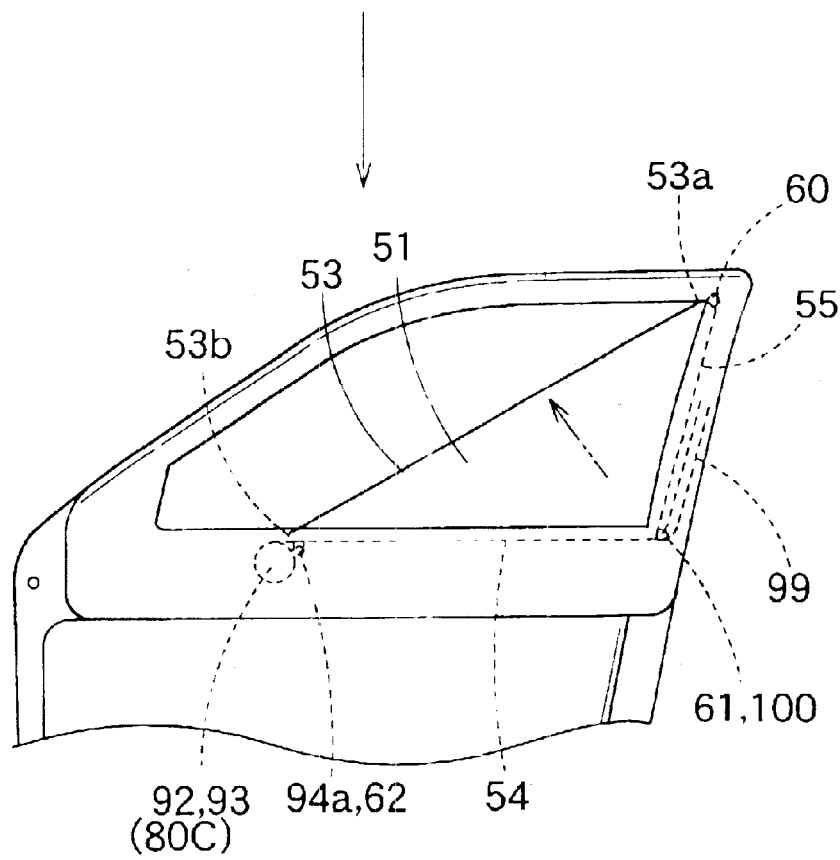

OCCUPANT ARRESTING DEVICE

BACKGROUND OF THE INVENTION

The present invention relates to an occupant restraining device for shielding a vehicle window during vehicle rollover to restrain an occupant in the vehicle. In the occupant restraining device of the prior art, as known in JP5-310098 A or JP8-26063 A, a rollover sensor detects a rollover (or a lateral turning) of a vehicle. Then, a belt-shaped or a sheet-shaped shielding member, as housed in the peripheral edge of the window, is so deployed from the window peripheral edge as to shield the window.

The shielding member of the prior art is deployed either downwardly from the upper edge side in the peripheral edge of the window on the inner side or horizontally from the vertical edge side of the peripheral edge of the window.

However, in case the occupant leans against the peripheral edge of the window, the occupant interferes with the shielding member so that it cannot be expanded sufficiently.

SUMMARY OF THE INVENTION

The present invention overcomes the aforementioned problem and provides an occupant restraining device capable of expanding a shielding member smoothly to shield a window even if an occupant leans against the peripheral edge of the window.

According to the invention, there is provided an occupant restraining device comprising: a shielding member adapted to be so deployed from the peripheral edge of a window of a vehicle to shield the window; and a deployment mechanism for deploying the shielding member so as to shield the window. In the occupant restraining device, the shielding member is arranged to substantially rise from the lower edge side of the peripheral edge of the window.

In the occupant restraining device of the present invention, the shielding member is smoothly expanded to raise the occupant from the lower side, even if the occupant leans against the peripheral edge of the window.

In the occupant restraining device according to the invention, therefore, the shielding member can be smoothly expanded to shield the window even if the occupant leans against the peripheral edge of the window.

The shielding member can be formed of a non-bulging sheet material, a bulging sheet material such as an airbag, a net-or mesh-shaped sheet material, a sheet material made by jointing a plurality of bands, a sheet material having strings arranged in branches or in a grid shape, or a band-shaped material. In short, the shielding member can adopt a variety of structures if it can shield the window to restrain the occupant at the time of deployment.

The deployment mechanism can be exemplified by an inflator using a gas pressure. This inflator is classified into the type generating a combustion gas when ignited, the type discharging a compressed gas or a combination of both. Moreover, the deployment mechanism can be exemplified by a pretensioner. This pretensioner uses electric/mechanical means such as gas pressure of an inflator, an electric motor, the restoring force of a spring or an electromagnetic solenoid. In short, the deployment mechanism can use a variety of means to deploy the shielding member housed in the peripheral edge of the window.

Moreover, the shielding member of the occupant restraining device of the invention may be deployed at the time of a side collision of the vehicle, but is desired to be deployed upon rollover of the vehicle. This is because higher performance must be exhibited to restrain the occupant in the vehicle at the time of a rollover than at the time of a side collision.

In the shielding member of the occupant restraining device of the invention, moreover, the shielding member maybe so shaped upon completion of deployment as to have an upper edge portion and to shield the window on the lower side of the upper edge portion. Moreover, the shielding member may be housed in the peripheral edge of the shielded region of the window to be shielded by the shielding member so as to move the upper edge portion upwardly when deployed.

In this case, the shielding member can raise the occupant leaning against the peripheral edge of the window as its upper edge portion rises when deployed.

In this shielding member, the lower edge side of the shielding member upon completion of deployment may be connected and fixed to the lower edge portion of the window peripheral edge. Then, the shielding member may be so folded and housed as to bring the upper edge portion closer to the lower edge portion from the completely deployed state.

The shielding member may have an oblique side to cross the window obliquely to shield the window with its lower side. Moreover, the shielding member may be folded and housed in the peripheral edge of the shielded region of the window to be shielded by the shielding member.

In this case, the shielding member can raise, when deployed, its oblique side so that the occupant leaning against the peripheral edge of the window can be moved upwardly.

In this case, the shielding member is so shaped as to shield the region on the lower side of the oblique side thereby to minimize the area for shielding the upper side of the window. Therefore, it is possible to shorten the time period from the start of deployment to the completion of deployment. Moreover, the material required to manufacture the shielding member can be reduced, and the shielding member can minimize the entire deployment distance. Therefore, the occupant restraining device employing such a shielding member can suppress the output of the deployment mechanism so that it can shield the window efficiently.

Here, the shielding member having the oblique side shields a small area of the window. However, if the oblique side has its upper end side set closer to the position of the occupant than its lower end side, the shielding member can effectively restrain the occupant within the vehicle.

In the shielding member having the oblique side, moreover, the shielding member may be so folded and housed that the oblique side may come close to a vertical edge portion which is in the shielded portion of the window and extends upwardly from one of the front and rear end portions at the lower edge portion of the window peripheral edge. Moreover, the shielding member may also be so arranged that the oblique side deploys its lower end side in the direction apart from the side of the vertical edge portion being the housed side.

In this case, when the deployment mechanism is activated, the oblique side can be moved upwardly by moving its lower end side laterally.

In this case, moreover, it is desired that the lower end side of the oblique side is housed in the lower edge portion of the window peripheral edge.

In this construction, the shielding member is housed over the lower edge portion and the vertical edge portion of the window peripheral edge. Therefore, the shielding member is dispersed between the lower edge portion and the vertical edge portion in the window peripheral edge, as compared with the case in which the shielding member is housed in its entirety only in the lower edge portion or the vertical edge portion of the window peripheral edge. In this construction, therefore, the shielding member can be housed easily within a limited space in the window peripheral edge.

Moreover, the shielding member having the oblique side may be folded and housed such that the oblique side may approach the side of the lower edge portion of the window peripheral edge being the shielded region of the window. Moreover, the shielding member may be so arranged that the upper end side of the oblique side may be deployed upwardly along the vertical edge portion.

In this case, at the time deployment of the deployment mechanism, the oblique side can be moved upwardly by moving its upper end side vertically.

In this case, too, it is desired that the upper end side of the oblique side is housed in the vertical edge portion of the window peripheral edge. In this construction, as has been described hereinbefore, the shielding member is housed over the lower edge portion and the vertical edge portion of the window peripheral edge. Therefore, the shielding member can be housed easily within a limited space in the window peripheral edge.

Moreover, it is desired that the deployment mechanism of the occupant restraining device of the invention is arranged on the lower side of the window.

There is a larger space on the lower side of the window than on the upper side of the window peripheral edge having adjoining windows or a ceiling portion. Therefore, the deployment mechanism can be easily arranged.

In case the deployment mechanism of the occupant restraining device of the invention includes a drive source for generating a motive power for deploying the shielding member, and a connector for connecting the drive source and the shielding member housed, it is desired that the drive source is arranged on the lower side of the window.

A larger space is on the lower side of the window than on the upper side of the window peripheral edge having adjoining windows or the ceiling portion. Therefore, the drive source occupying a large part of the deployment mechanism can be easily arranged.

In this case, at the time of deployment of the deployment mechanism, the connection portion of the connection means to the shielding member may move generally along the lower edge portion of the window peripheral edge. Alternatively, the connection portion of the connector to the shielding member may move upwardly along the vertical edge portion of the window peripheral edge.

In the occupant restraining device of the invention, when the shielding member is formed generally into a sheet shape, in order that the edge portion of the peripheral edge of the shielding member crosses the window at upon deployment, and so that the tension in the direction along the edge portion is higher than that in other directions, it is desired that the shielding member is so arranged that at least one of the end portions of the edge portion is connected to the deployment mechanism.

With this construction, the edge portion remains secured even if the occupant is restrained by the sheet shaped shielding member in the vicinity of the edge portion of the shielding member. Therefore, the occupant can be effectively restrained by a region of the shielding member apart from the edge portion.

The shielding member of this construction may have an oblique side being the edge portion as its shape upon deployment completion to cross the window obliquely, and may shield the window on the lower side of the oblique side.

In this case, the oblique side remains secured even if the occupant is restrained by the shielding member in the vicinity of the oblique side. Therefore, the occupant can be effectively restrained in the region of the shielding member apart from the oblique side.

Moreover, the following construction may be adopted, in case the tension in and along the oblique side of the shielding member is to be increased. Specifically, the oblique side of the shielding member is constructed to be longer at deployment than at times of flat, expanded and non-deployment.

In this case, the oblique side is tensed upon completion of deployment, so that a high tension is established in the oblique side.

In case the tension in and along the oblique side of the shielding member is to be increased, on the other hand, the deployment mechanism has its release direction set generally along the oblique side in the shielding member at deployment completion.

In this case, the deployment force of the deployment mechanism can be applied directly to the oblique side to establish the high tension in the oblique side.

In case the tension in and along the oblique side of the shielding member is to be increased, moreover, a notched recess opened in the peripheral edge side is formed in a position in the vicinity of the connected portion, as connected to the deployment mechanism, in the shielding member and in the peripheral edge excepting the oblique side.

In this case, the peripheral edge of the shielding member having the notched recess has a margin corresponding to the length of the inner peripheral edge of the notched recess. When the shielding member is completely deployed, therefore, the peripheral edge in the shielding member having the notched recess has less tension than the oblique side. As a result, the oblique side has a higher tension in the direction there along than those in other directions.

In case the tension in and along the oblique side of the shielding member is to be increased, still moreover, the following construction can be adopted. Specifically, the shielding member is formed of a woven fabric of warps and wefts. Moreover, the shielding member is arranged to have the warps or the wefts generally in parallel with the oblique side and to have the bias direction of the woven fabric at the deployment completion along the release direction of the deployment mechanism.

In this case, the oblique side, being generally in parallel with the warps or wefts of the woven fabric, is less likely to extend in the release direction along the bias direction of the woven fabric. When the shielding member is completely deployed, therefore, the oblique side has a higher tension in the direction therealong than those in other directions.

On the other hand, the occupant restraining device of the present invention may also be constructed in the following manner. Specifically, the shielding member has one of the edge portions in the peripheral edge at deployment completion excepting the moving side edge portion to move at the deployment time as a stationary side edge portion. In the shielding member, the two end portions of the stationary side edge portion in the direction along the stationary side edge portion are mounted and fixed on the peripheral edge of the window. Moreover, the shielding member is folded and housed in the peripheral edge of the window so that the moving side edge portion comes closer to the stationary side edge portion without changing the length of the stationary side edge portion.

With this construction, the stationary side edge portion does not change its length even when the shielding member is folded. Therefore, the stationary side edge portion of the shielding member in the folded state can be mounted as it is on the window peripheral edge. As a result, the housing work of the shielding member is facilitated in the occupant restraining device of this construction.

In this case, it is desired that the shielding member is housed across the lower edge portion and the vertical edge portion extending upwardly from one of the front or rear end portions of the lower edge portion in the peripheral edge of the window.

With this construction, the shielding member is housed over the lower edge portion and the vertical edge portion of the window peripheral edge, as has been described hereinbefore. Therefore, the shielding member is easily housed even if the window peripheral edge has a limited space.

In case the shielding member is provided, as its shape at deployment completion, with an oblique side as the moving side edge portion to cross the window obliquely and is in a generally triangular shape to shield the window on the lower side of the oblique side, the construction may be as follows. Specifically, an edge portion excepting the oblique side or the moving side edge portion is used as the stationary side edge portion. The shielding member may be folded and housed in a bellows fashion on folds generally parallel to the oblique side while the stationary side edge portion is overlapped with the oblique side.

With this construction, the folding work can be facilitated, because the shielding member is simply folded in bellows on the folds generally parallel to the oblique side after the stationary side edge portion was laid over the oblique side.

Moreover, the construction may also be made in the following manner, in case the shielding member is provided, as its shape at deployment completion, with an oblique side as the moving side edge portion to cross the window obliquely and is in a generally triangular shape to shield the window on the lower side of the oblique side. Specifically, one of the edge portion excepting the oblique side for the moving side edge portion is used as the stationary side edge portion. Then, the shielding member may be folded and housed like a folding-fan having its center near the intersection between the oblique side and the stationary side edge portion.

With this construction, at the time of deploying the shielding member, the oblique side, as folded closer to the stationary side edge portion, opens in a fan-like manner in the vicinity of the intersection between the oblique side and the stationary side edge portion so that it moves upwardly. At the time of deploying the shielding member, therefore, the oblique side of the shielding member raises the occupant leaning against the window peripheral edge smoothly upwardly from the lower side.

BRIEF DESCRIPTION OF THE DRAWINGS

FIG. 17 presents a partially longitudinal section showing the state in which the occupant restraining unit is mounted on a door frame, as taken along the rear vertical edge portion of the door frame.

FIG. 29 presents diagrams showing an occupant restraining device of a fifth embodiment.

FIG. 43 presents diagrams showing an occupant restraining device of a twelfth embodiment.

FIG. 45 presents diagrams showing an occupant restraining device of a thirteenth embodiment.

DETAILED DESCRIPTION OF THE PREFERRED EMBODIMENTS

The present invention will now be described with reference to the accompanying drawings.

Figure 1:
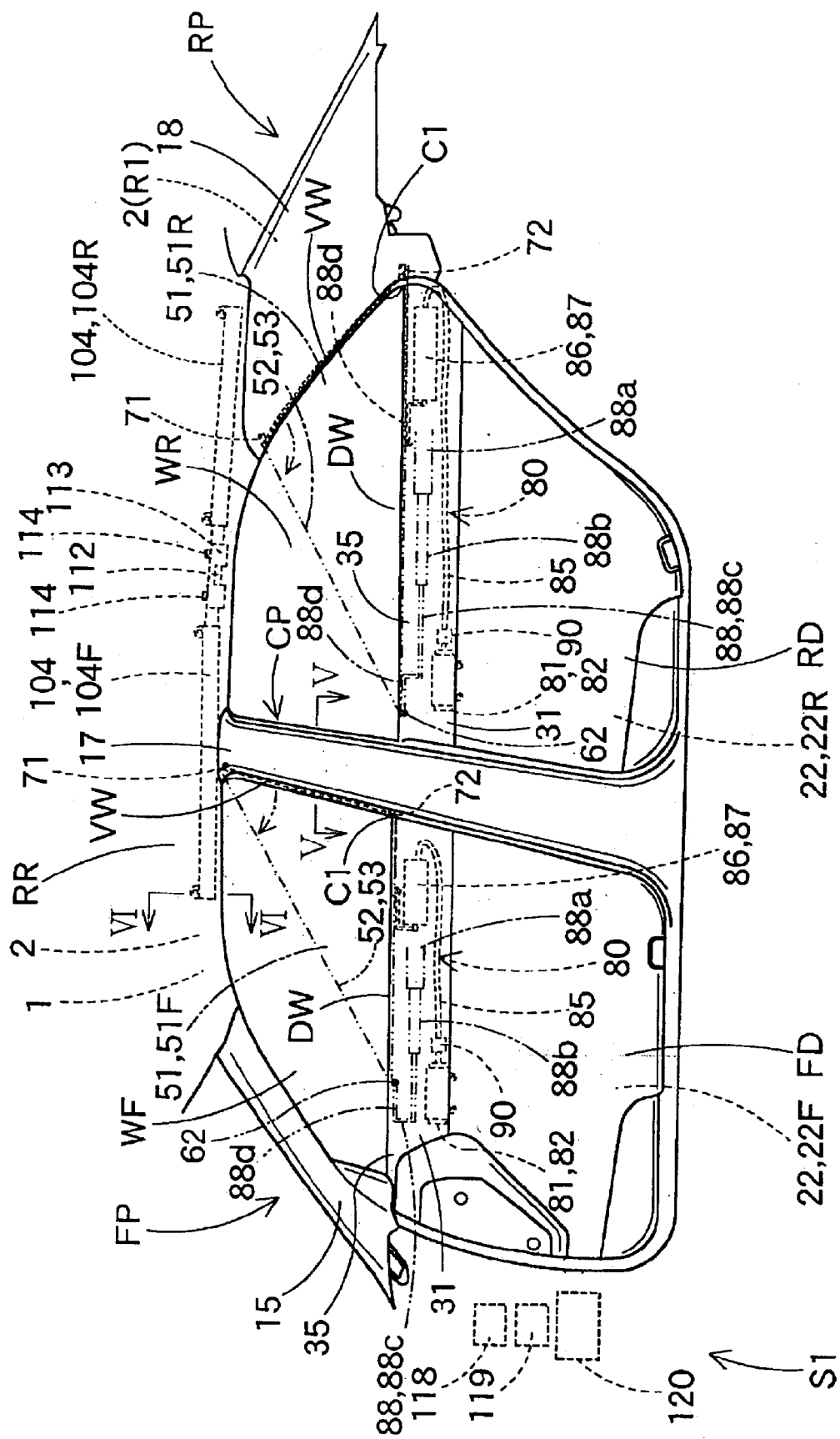
FIG. 1 is a front elevation showing an occupant restraining device according to a first embodiment of the invention as taken from the inner side of a vehicle.
Figure 2:
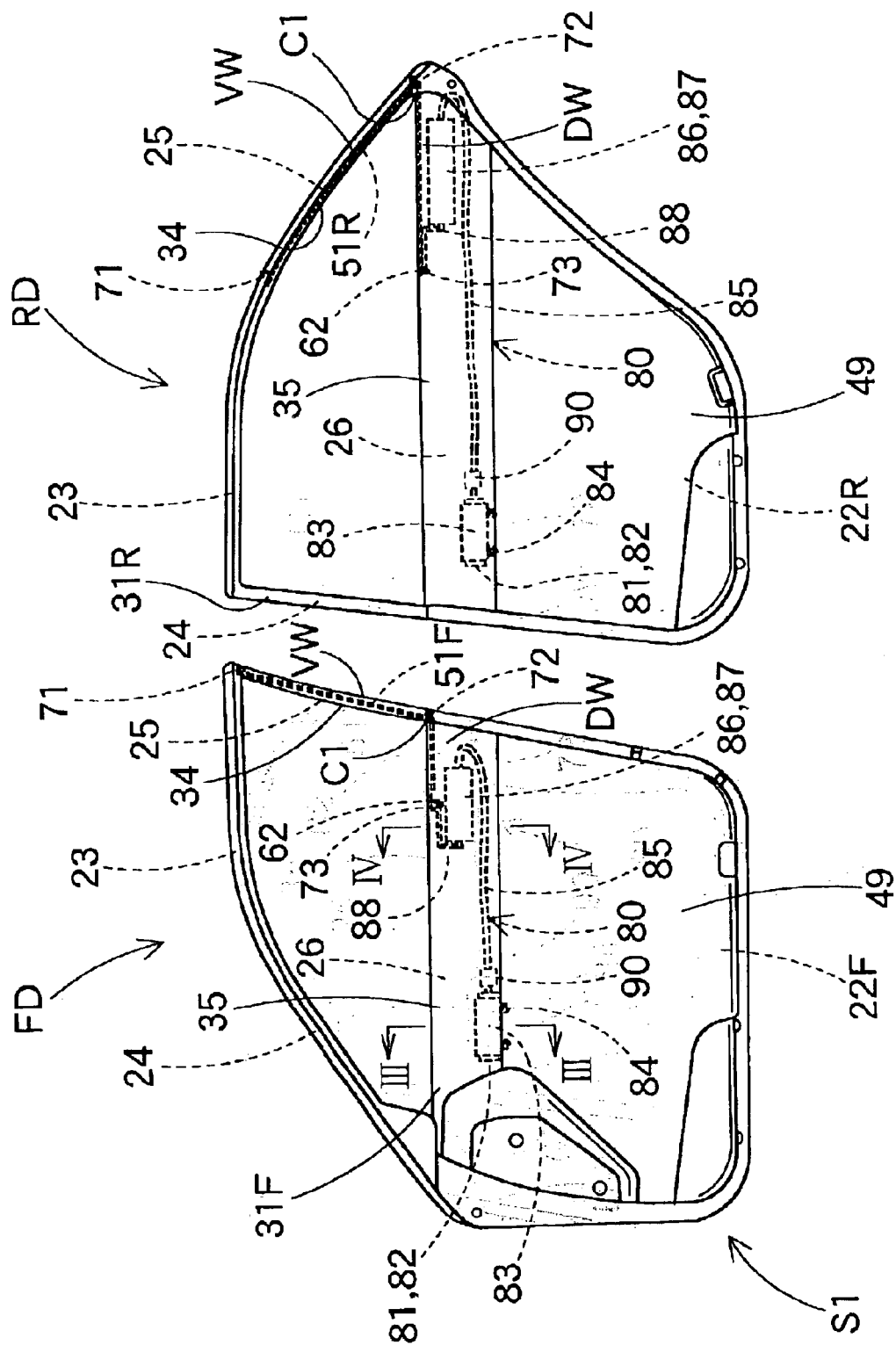
FIG. 2 is a front elevation of two doors including the occupant restraining device of the first embodiment.
Figure 7:
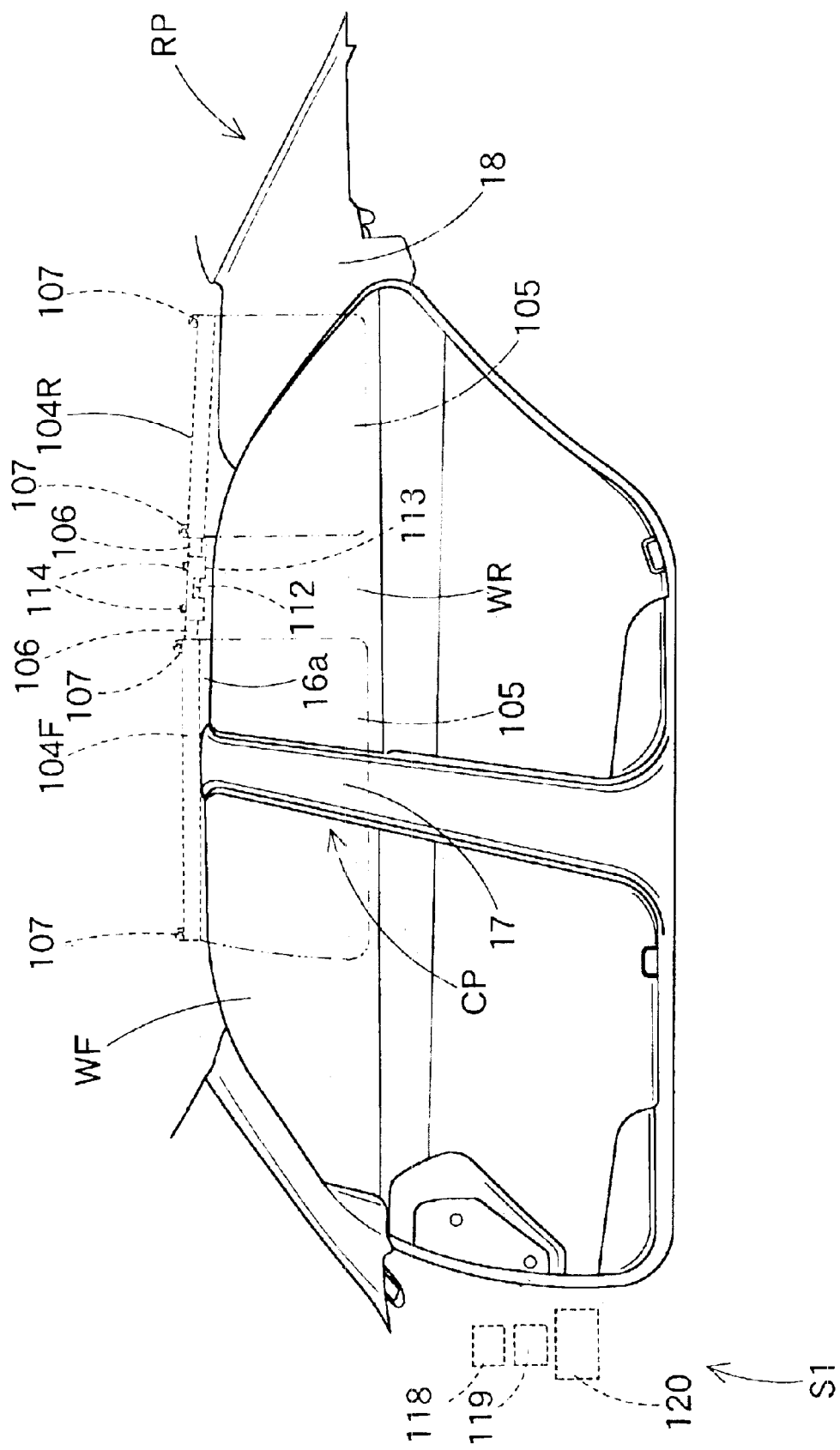
FIG. 7 is a front elevation showing the expansion and inflation of an airbag in the occupant restraining device of the first embodiment as taken from the inner side of the vehicle.

An occupant restraining device S1 of a first embodiment, as shown in FIGS. 1, 2 and 7, is constructed to include the sheet-shaped shielding member 51 (51F/51R) and the airbag 104 (104F/104R). The shielding members 51F/51R are arranged in the front and rear doors FD/RD, respectively. The airbags 104F/104R are folded and housed on the lower edge side of the roof side rail portion RR. The shielding members 51F/51R are individually expanded from their folded state when an inflator 82 of the deployment mechanism 80 is activated. This inflator 82/82 is a drive source 81 for the deployment mechanism 80 and is activated by the control device 120. The control device 120 activates the inflators 82 when it receives such a rollover detection signal from the rollover sensor 118 as predicts a rollover (e.g., a lateral rollover) of the vehicle. The airbags 104F/104R are expanded from its folded states by the action of an inflator 112. This inflator 112 is activated by the control device 120. This control device 120 activates the inflator 112 when it receives a side collision detection signal from a side collision sensor 119 when an impact at a predetermined or higher level is applied to the side face of the vehicle. Here, the rollover sensor 118, the side collision sensor 119 and the control device 120 are arranged at predetermined positions of the vehicle and are electrically connected with one another. Moreover, the inflators 82 and 112 are also electrically connected with the control device 120. In the case of the embodiment, moreover, the control device 120 makes a control to deployed the shielding members 51F/51R, too, when it receives a side collision signal from the side collision sensor 119.

Figure 6:
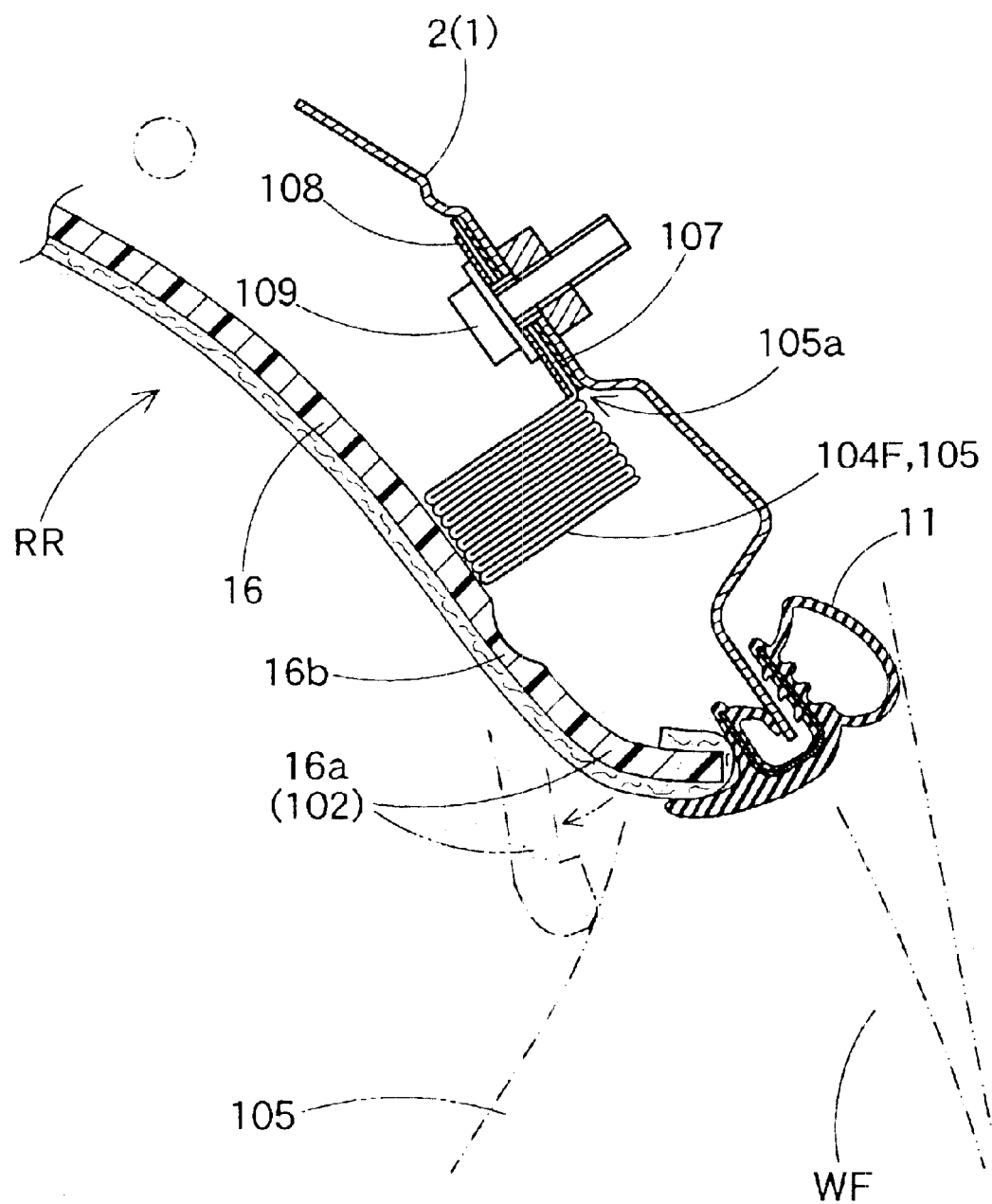
FIG. 6 is a sectional view of a portion VI—VI of FIG. 1.

The airbags 104F/104R are made separate and independent of each other in the bag shape and is inflated when fed with the inflating gas from the inflator 112, as shown in FIGS. 1, 6 and 7. In the case of the embodiment, both airbags 104F/104R are formed generally into rectangular sheets. Each airbag 104F/104R is constructed to include: a body portion 105 to be inflated when fed with the inflating gas; and a cylindrical gas inlet port 106 for introducing the inflating gas into the body portion 105. The gas inlet port 106 of the airbag 104F is arranged on the upper rear side of the body portion 105 of the airbag 104F, and the gas inlet port 106 of the airbag 104R is arranged on the upper front side of the body portion 105 of the airbag 104R. These gas inlet portions 106 are individually connected with the inflator 112. On the upper end side of each airbag 104F/104R, there is arranged a plurality of mounting portions 107. These mounting portions 107 are fixed at the roof side rail portion RR on the inner panel 2 on the side of the body 1. On the mounting portion 107, as shown in FIG. 6, there is fixed a mounting bracket 108. Each of the mounting portions 107, together with the mounting bracket 108, is fixed on the inner panel 2 by means of a bolt 109. Here, a member indicated by numeral 11 in FIG. 6 is a weather strip.

Figure 8:
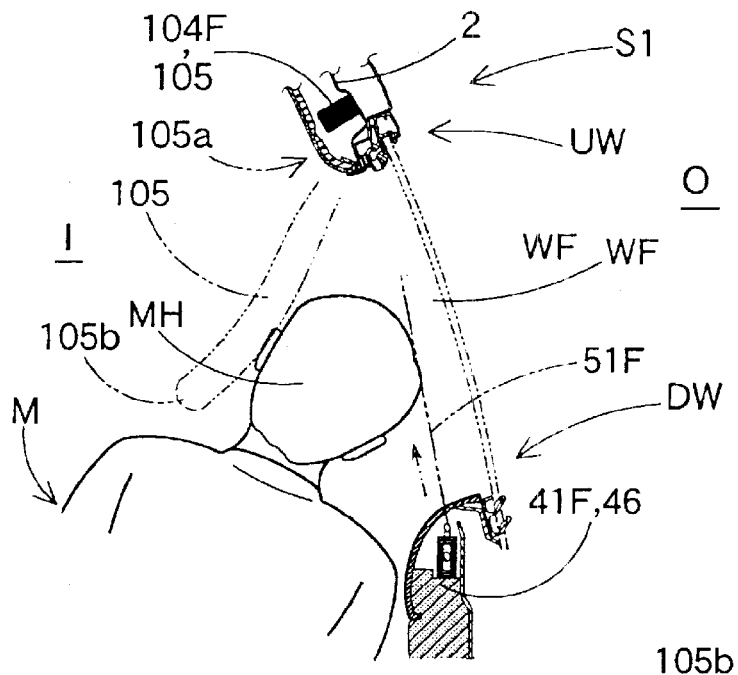
FIGS. 8A–8C diagram the operation of the airbag of the first embodiment at the time of a rollover of the vehicle.
Figure 8:
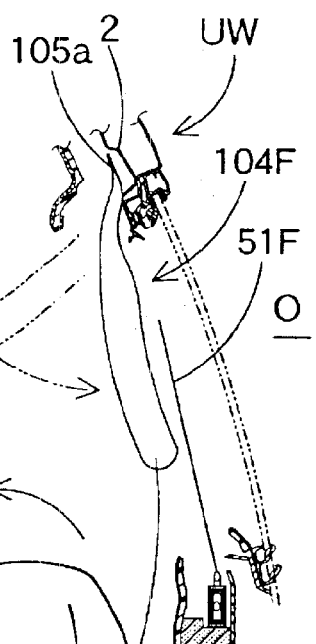
Figure 8:
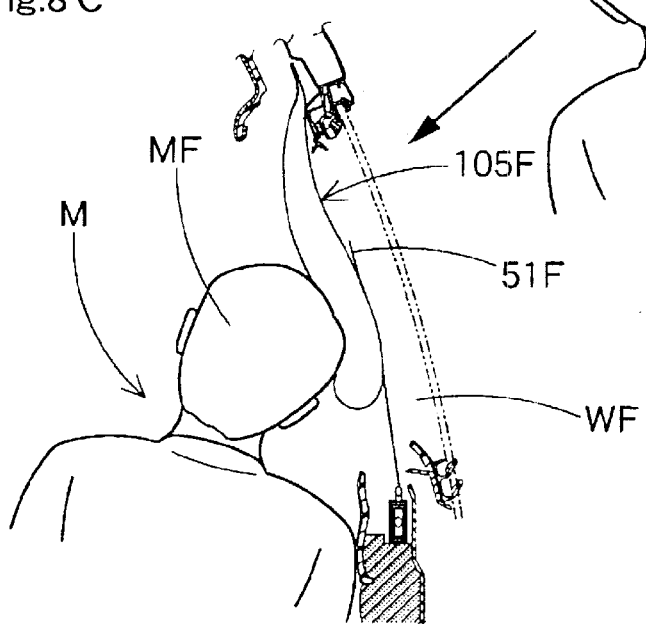

Moreover, the airbags 104F/104R are individually fixed only at the sides of the upper end 105*a* of the body portion 105 at expanded and inflated time on the inner panel 2, by using the individual mounting portions 107, as shown in FIGS. 6 and 8. In other words, the airbags 104F/104R are so arranged that the sides of the body portion lower ends 105*b* at the time of the expansion/inflation are allowed to act as free ends. Therefore, the side of the body portion lower end 105*b* at the time of expansion and inflation can swing toward the inner side I and the outer side O generally normal to the windows WF/WR.

Moreover, the airbags 104F/104R are folded in a bellows shape from the lower end 105*b* to the upper end 105*a*. Moreover, the folded airbags 104F/104R are covered with a roof head lining 16 on the inner side I of the roof side rail portion RR. This roof head lining 16 is made of a synthetic resin and is provided at its lower edge with a door portion 16*a* as an airbag cover 102. The door portion 16*a* can be opened to the inner side I by arranging a thin hinge portion 16*b* on the upper edge side. At the time of the expansion/inflation, moreover, the airbags 104F/104R push and open the door portion 16*a* and protrude downwardly to take a position between the occupant and the inner side face of the vehicle. Here in the embodiment, the airbags 104F/104R are interposed, when expanded/inflated, between the occupant, e.g. a driver or a passenger, and the shielding members 51F/51R.

At the time of the expansion/inflation, the airbag 104F covers the rear inner side of the window WF, the upper side of a center pillar garnish 17 on the inner side I of the center pillar portion CP and the front inner side of the window WR. The airbag 104R covers the rear inner side of the window WR and the front side of a rear pillar garnish 18 on the inner side I of the rear pillar portion RP.

In the case of the embodiment, moreover, the airbags 104F/104R are so arranged that most of the side of the lower end 105*b* at the time of completion of the expansion/inflation horizontally overlaps the shielding members 51F/51R at the end of deployment.

The inflator 112 is made into a cylinder type and is held by a mounting bracket 113. This inflator 112 is mounted on the inner panel 2 of the roof side rail portion RR by using the bracket 113. This bracket 113 is fixed on the inner panel 2 by means of bolts 114. The inflator 112 is of a dual type capable of discharging the inflating gas from its two ends so that the inflating gas discharged from the front end side expands/inflates the airbag 104F on the front side and the inflating gas discharged from the rear end side expands/inflates the airbag 104R on the rear side.

The shielding members 51F/51R of the first embodiment are formed into a sheet shape of a flexible cloth of polyester or polyamide yarns. Both shielding members 51F/51R are formed into a triangular sheet shape, as shown in FIGS. 1 and 2, and the upper/lower portions on the rear edge side are attached on the door frames 22F/22R of the doors FD/RD by means of connection bolts 71/72. These bolts 71/72 are fastened to the upper and lower portions of a rear vertical edge portion 25 in the peripheral edge of the window WF/WR of the door frame 22F/22R. Moreover, the shielding members 51F/51R are folded backward in a bellows shape and housed in an inverted L-shape. In other words, the shielding members 51F/51R are housed to cross the corner C1 at which the lower edge portion DW and the vertical edge portion VW of the peripheral edge of the window WF/WR intersect. The shielding members 51F/51R thus housed are covered with the rear vertical edge portion 34 and the lower edge portion 35 of the door frame garnishes 31F/31R, respectively.

The door frame garnishes 31F/31R are made of a synthetic resin and mounted on the door frames 22F/22R of the peripheral edge of the windows WF/WR, respectively. Here, the inner side of each of the doors FD/RD is provided with one of the door frame garnishes 31F/31R and the door trim 49 below the former.

Figure 3:
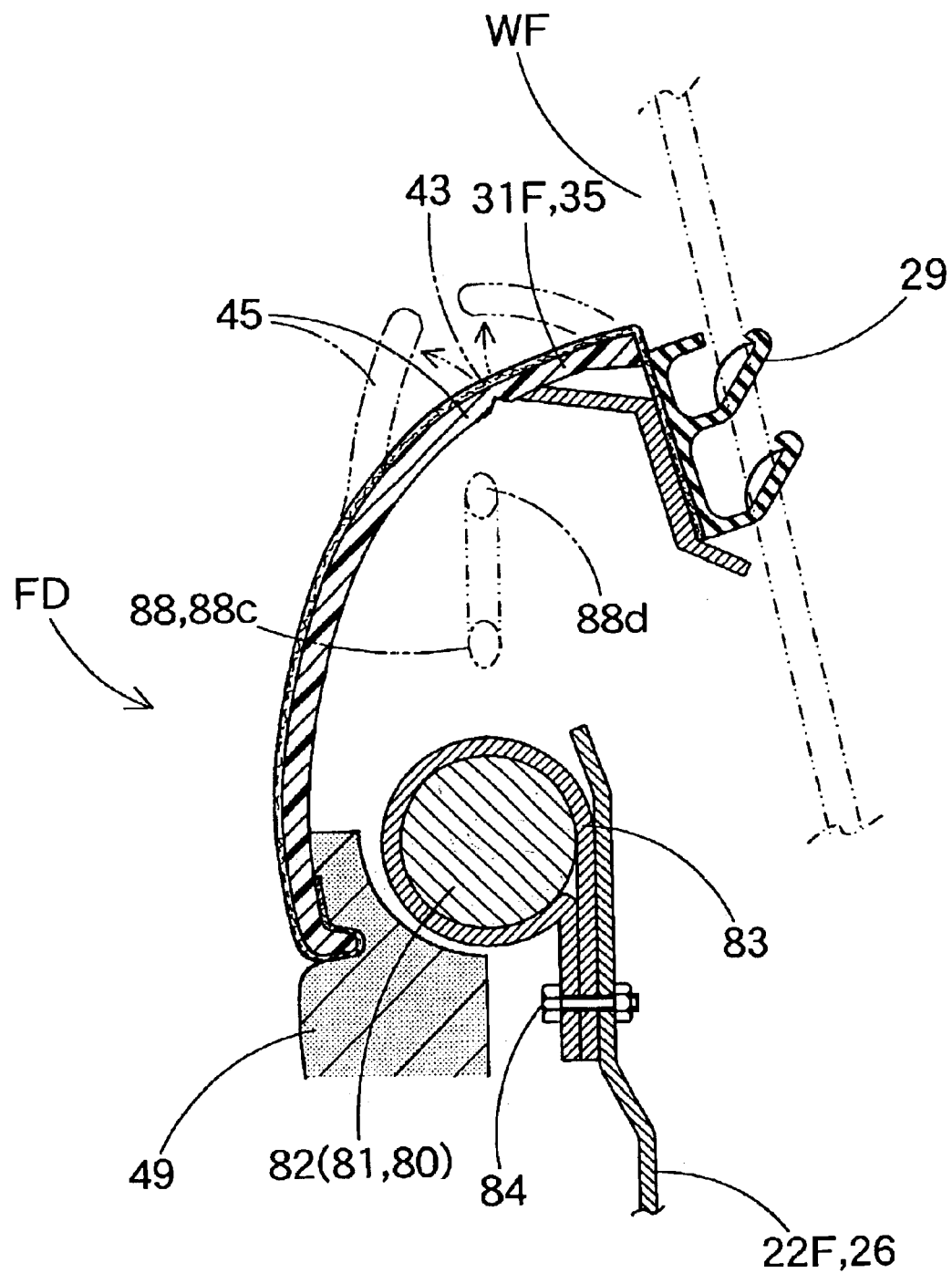
FIG. 3 is a sectional view of a portion III—III of FIG. 2.
Figure 4:
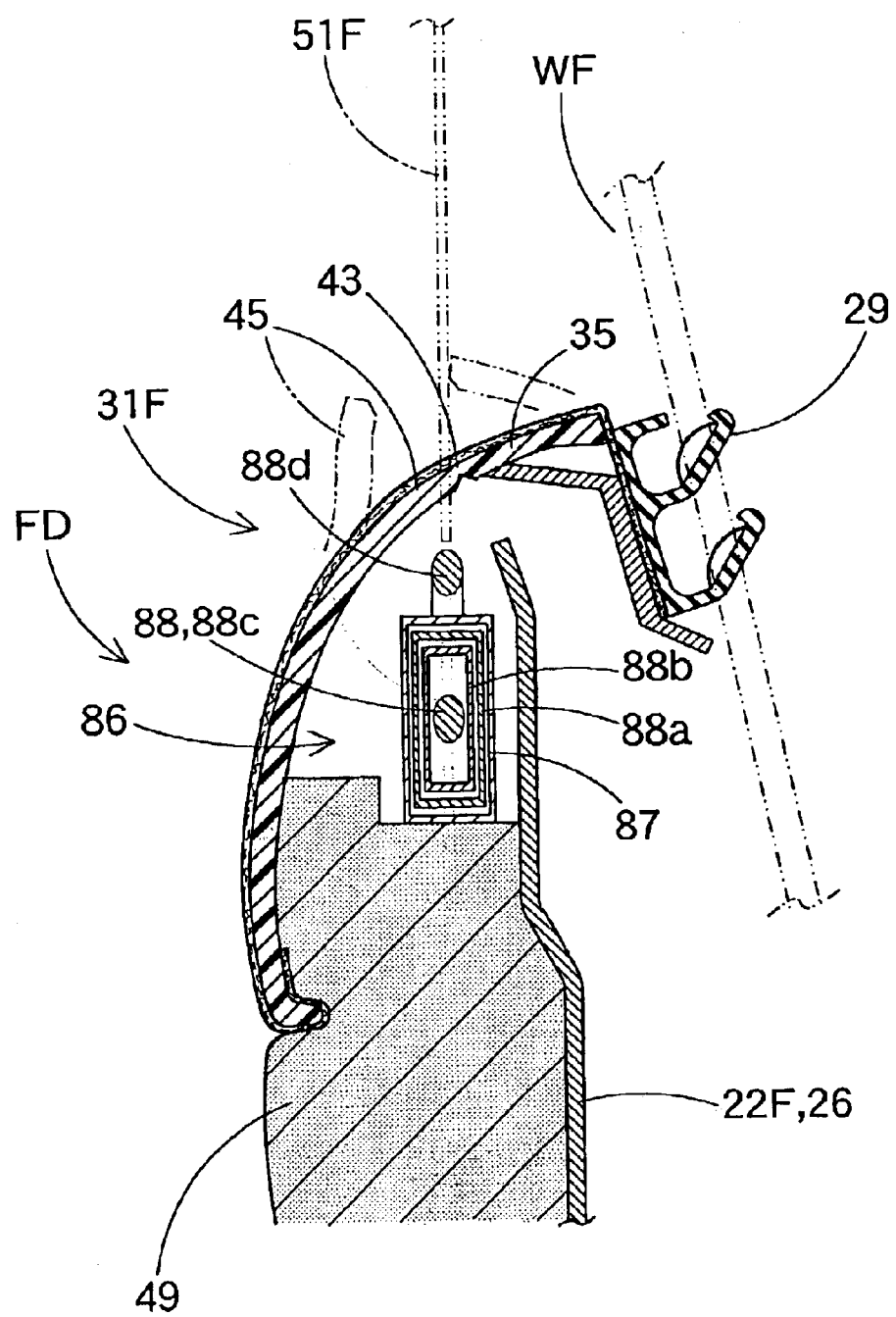
FIG. 4 is a sectional view of a portion IV'IV of FIG. 2.
Figure 5:
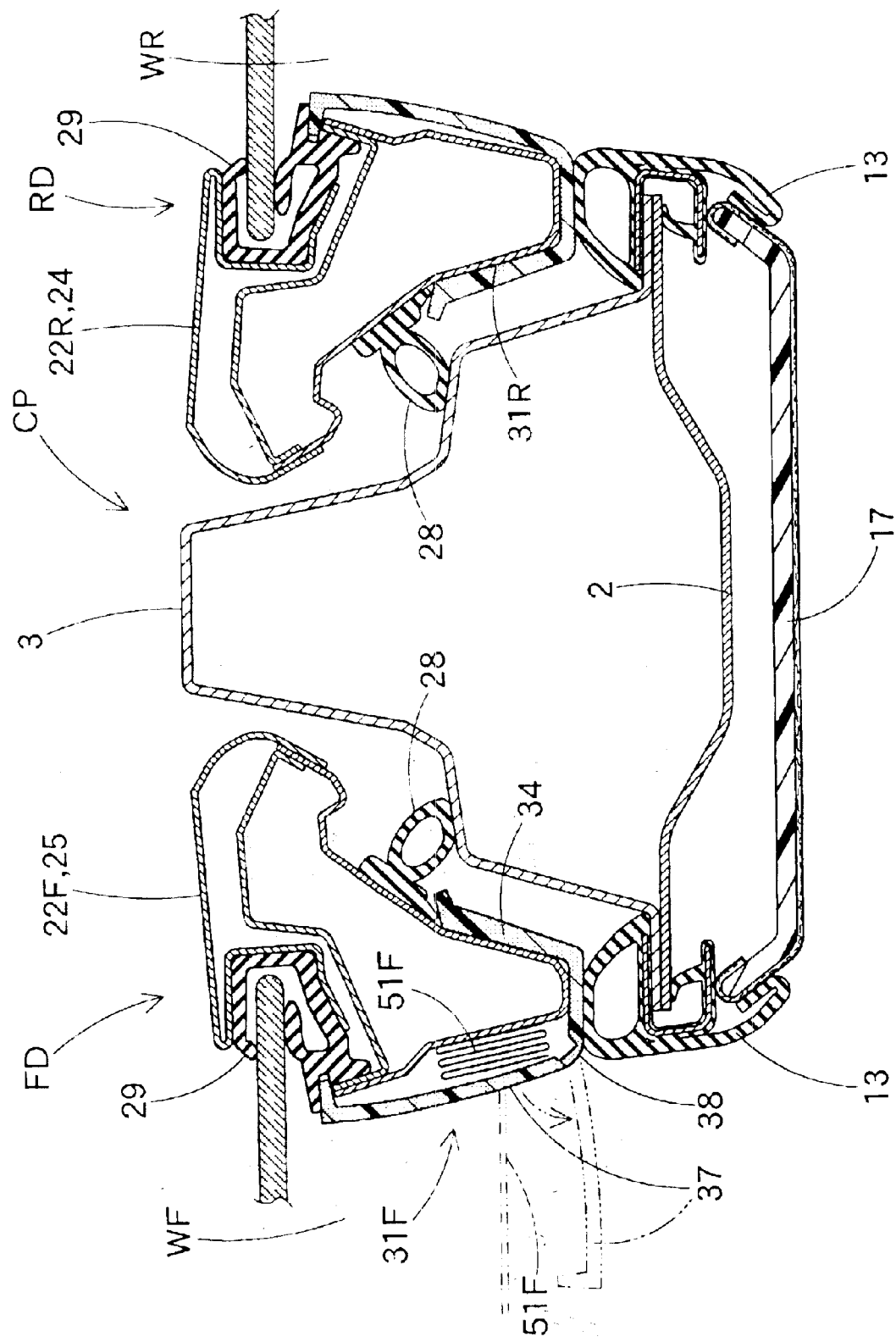
FIG. 5 is a sectional view of a portion V—V of FIG. 1.

At the rear vertical edge portion 34 of each of the door frame garnishes 31F/31R and at the lower edge portion 35 extending forward from the lower end of the rear vertical edge portion 34, moreover, there are formed door portions 37/45 which can be opened to the inner side of the vehicle, as shown on FIGS. 2 to 5. The door portion 37 is provided with a thin hinge portion 38, as shown in FIG. 5, so that it can be easily opened. The door portion 45 is opened by breaking a thin portion 43 to be broken, as shown in FIGS. 3 and 4. Moreover, the shielding members 51F/51R push and open the door portion 37/45, when expanded, to shield the windows WF/WR. The lower side of each of the shielding members 51F/51R in the folded state is not housed over the entire length of the lower edge portion 35 in the longitudinal direction. In other words, the lower side of each of the folded shielding members 51F/51R is housed in about one third to one fifth of the entire length of the lower edge portion 35 and close to the side of the rear vertical edge portion 34.

Here, a member designated by numeral 29 in FIG. 4 is a glass run. In FIG. 5, a member designated by numeral 3 is an outer panel of the center pillar portion CP on the side of the body 1, and members of numerals 13 and 28 are weather strips.

A leading end side apex portion 62 or the front end side of each of the expanded shielding members 51F/51R is connected to the upper end 88*d* of a piston rod 88 by means of mounting bolts 73.

Moreover, the deployment mechanism 80 of the shielding members 51F/51R of the first embodiment is constructed to include the inflator 82 as the drive source 81 and connection means 86. This connection means 86 is connected to the shielding members 51F/51R. Moreover, the connection means 86 also acts as guide means for guiding the deployed shielding members 51F/51R. The inflator 82 discharges the inflating gas, when activated, like the inflator 112 for inflating the airbags 104F/104R. Moreover, the connection means 86 is constructed of a cylinder 87 and a piston rod 88 in the case of the embodiment. The cylinder 87 admits the inflating gas from the inflator 82. The piston rod 88 protrudes largely from the cylinder 87 when the inflating gas of the cylinder 87 flows in. The cylinder 87 is fixed on the side of the lower edge portion 26 of each of the doors FD/RD, as shown in FIGS. 1 and 4, by using not-shown mounting brackets and mounting bolts. The inflator 82 and the cylinder 87 thus fixed are covered with the lower edge portion 35 of the garnish 31. The piston rod 88 is formed of multiple stages of a first rod 88*a*, a second rod 88*b* and a third rod 88*c*. When the inflating gas is introduced into the cylinder 87, the first rod 88*a* of the piston rod 88 is protruded forward from the cylinder 87, and the second rod 88*b* is protruded forward from the first rod 88*a*. The third rod 88*c* is further protruded forward from the second rod 88*b*. The third rod 88*c* is bent at its front end portion, and its upper end 88*d* is connected at its leading end to the leading end apex portion 62 of each of the shielding members 51F/51R by bolts 73.

The inflator 82 for deploying and expanding each of the shielding members 51F/51R is of a cylinder type, as shown in FIGS. 2 and 3, and is clamped by a mounting bracket 83. The inflator 82 is connected on its rear end side to a feed pipe 85 for feeding the inflating gas discharged to the rear end side of the cylinder 87. An inflator 82 is individually arranged on the front side of the lower edge portion DW in the peripheral edge of the windows WF/WR of the door frames 22F/22R by means of the mounting bracket 83. The mounting bracket 83 is fixed on the lower edge portion 26 of the door frames 22F/22R by means of bolts 84.

The feed pipe 85 is provided with a flow control valve 90 near the inflator 82. The flow control valve 90 adjusts the flow rate of the inflating gas. Moreover, the flow control valve 90 is electrically connected with the control device 120, by which the flow rate of the inflating gas is adjusted. In the case of the embodiment, moreover, the flow control valve 90 is normally kept fully open. By the control of the control device 120, moreover, the valve 90 is controlled to a closed side for throttling the flow rate of the inflating gas. In the case of the embodiment, moreover, when an inflator 82 is activated with the flow control valve 90 being fully open, the corresponding shielding members 51F/51R expands substantially simultaneously with the inflation of the corresponding airbag 104F/104R. When the flow control valve 90 is controlled to throttle the flow rate of the inflating gas, moreover, the shielding members 51F/51R complete their expansion after the airbags 104F/104R are completely expanded. In the case of the embodiment, more specifically, the control device 120 does not make the throttling control of the flow control valve 90 but activates the inflator 82 when it receives a side collision detection signal from the side collision sensor 119. In response to a rollover detection signal from the rollover sensor 118, moreover, the control device 120 controls the flow control valve 90 to throttle the flow rate of the inflating gas.

Operation of the occupant restraining device S1 of the first embodiment will now be described. When the control device 120 receives a rollover detection signal predicting the rollover of the vehicle from the rollover sensor 118, it controls the flow control valve 90 and activates the individual inflators 82/82. Then, the inflating gas discharged from the activated inflators 82/82 flow via the feed pipe 85 into the cylinder 87. In this cylinder 87, moreover, the individual rods 88a/88b/88c are individually protruded forward.

At this time, the shielding members 51F/51R is released from the folded state according to the forward movement of the piston rod 88, as indicated by double-dotted lines in FIG. 1, so that its leading end apex portion 62 laterally moves forward. As a result, the shielding members 51F/51R push and open the door portions 37/45 of the door frame garnish 31. At this time, the shielding members 51F/51R are housed in advance from the rear vertical edge portion 34 to the lower edge portion 35 on the lower edge side of the door frame garnish 31 in the peripheral edge of the windows WF/WR on the inner side of the vehicle. Therefore, the shielding members 51F/51R raise the oblique side 53 clockwise, as viewed from the inner side, on the bolt 71 from the lower edge portion DW of the peripheral edges of the windows WF/WR thereby to shield the windows WF/WR. Specifically, each oblique side 53 sloping down forward in the triangular sheet shape at the time of expansion becomes the edge portion 52 to cross one of the windows WF/WR so that it substantially rises from the respective lower edge portion of the corresponding window WF/WR.

As a result, the shielding members 51F/51R are smoothly expanded to raise the occupant from the lower side even if this occupant leans against the peripheral edge (especially, the lower edge portion DW) of the windows WF/WR on the inner side of the vehicle.

In the occupant restraining device S1 of the first embodiment, therefore, the shielding members 51F/51R for shielding the windows WF/WR are smoothly expanded even if an occupant leans against one of the lower edge portions DW of the windows WF/WR on the inner side, so that it properly restrains the occupant at the time of a rollover of the vehicle.

In the occupant restraining device S1 of the first embodiment, on the other hand, the control device 120 activates the inflator 112 when it receives a side collision detection signal from the side collision sensor 119. When the inflator 112 is activated, the inflator 112 discharges the inflating gas from the front/rear ends and feeds it to the airbags 104F/104R. At this time, the airbags 104F/104R are expanded/inflated when the inflating gas enters into the body portion 105 via the gas inlet portion 106. Then, the airbags 104F/104R push and open the door portion 16a of the roof head lining 16 to interpose the body portion 105/105 thereof between the occupant and the center pillar portion CP or the rear pillar portion RP, i.e., the inner face of the inner side I, as indicated by double-dotted lines in FIG. 7. Simultaneously, the shielding members 51F/51R are deployed so that the body portion 105/105 is interposed between the occupant and the shielding members 51F/51R.

In the occupant restraining device S1 of the first embodiment, in response to a side collision detection signal from the side collision sensor 119, the control device 120 activates the inflators 82/82 without controlling the flow control valves 90/90 in the fully open state. Therefore, the shielding members 51F/51R are expanded to complete their shielding action in a shorter time period than the time from the starting to the shield completion by the rollover sensor 118. Even if an impact acts on the side face of the vehicle, therefore, the shielding members 51F/51R shield the window WF/WR properly restrain the occupant.

In the occupant restraining device S1 of the first embodiment, more specifically, the deployment mechanism 80 employs the inflator 82 using gas pressure as the drive source 81 for expanding and moving the shielding members 51F/51R. Moreover, the deployment mechanism 80 is provided in its gas passage with the flow control valve 90 for adjusting the flow rate of the gas thereby to adjust the expanding/moving speed of the shielding member 51F/51R. In the first embodiment, therefore, the expanding/moving speed of the shielding members 51F/51R can be easily changed to match the rollover and the side collision merely by adjusting the open state of the flow control valve 90.

In the case of the embodiment, moreover, the flow control valve 90 is normally held in the fully open state. In the first embodiment, therefore, the shielding members 51F/51R can be quickly expanded at the time of a side collision, in which the impact acts on the side face of the vehicle, without adjusting the flow control valve 90.

Here in the first embodiment, in coping with a rollover, the control device 120 may activate the inflator 112 to expand/inflate the airbags 104F/104R.

At this time, in the first embodiment, the airbags 104F/104R allow the side of the body portion lower end 105b at the time of the expansion and inflation to act as the free end and to swing to the inner side or the outer side in the direction generally perpendicular to the window WF/WR.

With the head MH of the occupant M being close to the window WF, the airbag 104F may be expanded/inflated, as shown in FIG. 8A, and may be arranged on the inner side I of the occupant's head MH. As has been described herein before, however, the airbag 104F is so connected at its upper end 105a to the inner panel 2 of the upper edge portion UW of the peripheral edge of the window WF that the lower end 105b thereof may become the free end to swing generally perpendicularly to the window WF. At the time of a rollover of the vehicle, the occupant M may leave or approach the window WF while the vehicle is rolling over. Therefore, when the occupant M leaves the window WF, as shown in FIG. 8B, the airbag 104F swings to the outer side O of the vehicle and easily goes into the space between the occupant M and the window WF or the shielding member 51F. If the airbag 104F is then sandwiched between the occupant's head MH and the window WF or the shielding member 51F, as shown in FIG. 8C, the airbag 104F restrains the occupant's head properly. These correlations likewise apply to the airbag 104R.

Even if the occupant's head MH approaches the window WF/WR at the beginning of the expansion/inflation of the airbag 104 so that the airbag 104 takes a position on the inner side I of the occupant's head MH, the shielding members 51F/51R is arranged on the inner side of the window WF/WR. Therefore, the shielding members 51F/51R cushion the occupant's head MH.

In the occupant restraining device S1 of the first embodiment, therefore, the airbag 104F/104R to be activated at the time of detection of a rollover can be smoothly interposed between the occupant M and the window WF/WR even if the occupant M is close to the window WF/WR.

In the occupant restraining device S1 of the first embodiment, on the other hand, the shielding members 51F/51R are housed in the inverted L-shape in the rear vertical edge portion 34 and the lower edge portion 35 in the peripheral edge of the window WF/WR. The rear vertical edge portion 34 extends upward from the lower corner C1 of the peripheral edge of the window WF/WR, and the lower edge portion 35 extends in the longitudinal direction from the corner C1. In the first embodiment, therefore, the space for housing the shielding member to be arranged in the peripheral edge of the window WF/WR can be minimized, as compared with the case in which the shielding member is raised from the entire area of the lower edge side portion DW of the peripheral edge of the window WF/WR. As a result, in the first embodiment, the shielding members 51F/51R can be easily arranged in the door FD/RD which has a limited space.

In the first embodiment, moreover, the shielding members 51F/51R are housed in the peripheral edge of the window WF/WR at the door FD/RD, and the inflator 82 as the drive source 81 for expanding and moving the shielding members 51F/51R is arranged in the front side of the lower edge portion DW of the peripheral edge of the window WF/WR of the door frame 22F/22R. In short, the inflator 82 is arranged in front of the occupant so that the interference with the occupant can be avoided. Moreover, both shielding members 51F/51R and the drive source 81/81 are arranged on the side of the door FD/RD. Without any complicated structure of the occupant restraining device S1, therefore, the shielding members 51F/51R are smoothly expanded by the drive source 81/81.

Here, in the first embodiment, the shielding members 51F/51R are exemplified by the sheet shape which is not inflated. In a second embodiment shown in FIG. 9, the shielding member may be exemplified by a sheet-shaped type which is expanded by introducing the inflating gas thereinto.

Figure 9:
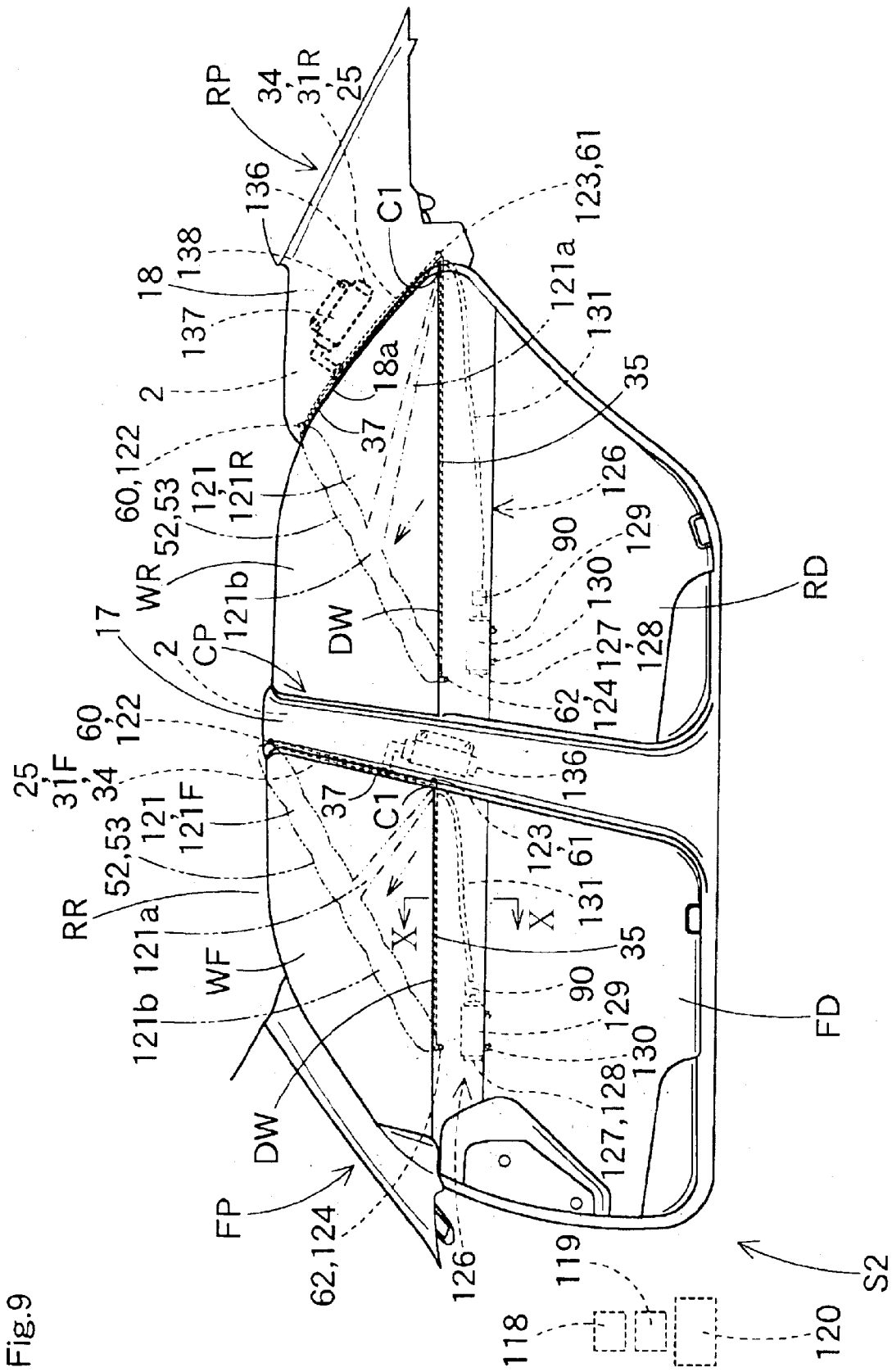
FIG. 9 is a front elevation showing an occupant restraining device according to a second embodiment as taken from the inner side.
Figure 10:
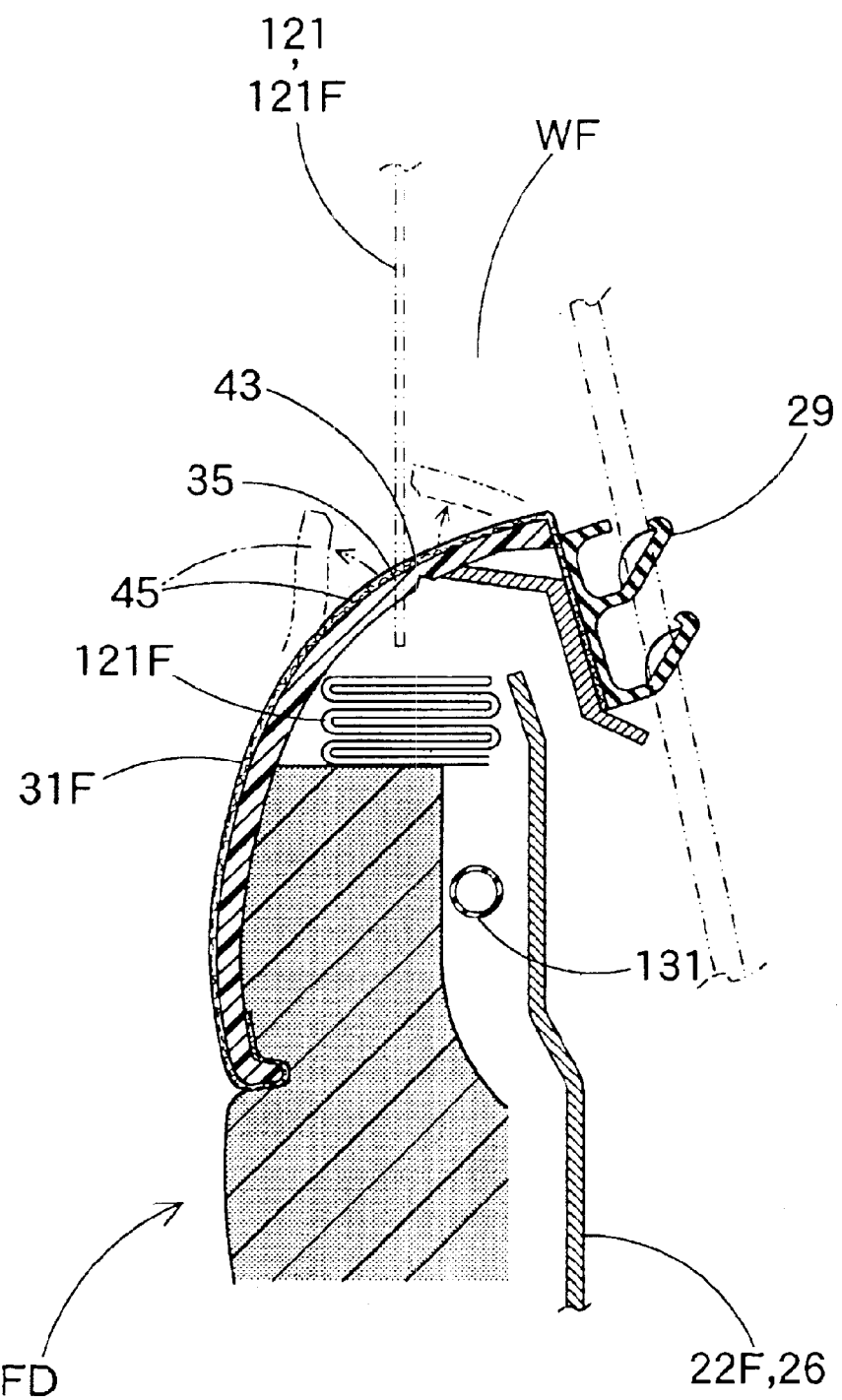
FIG. 10 is a sectional view of a portion X—X of FIG. 9.
Figure 13:
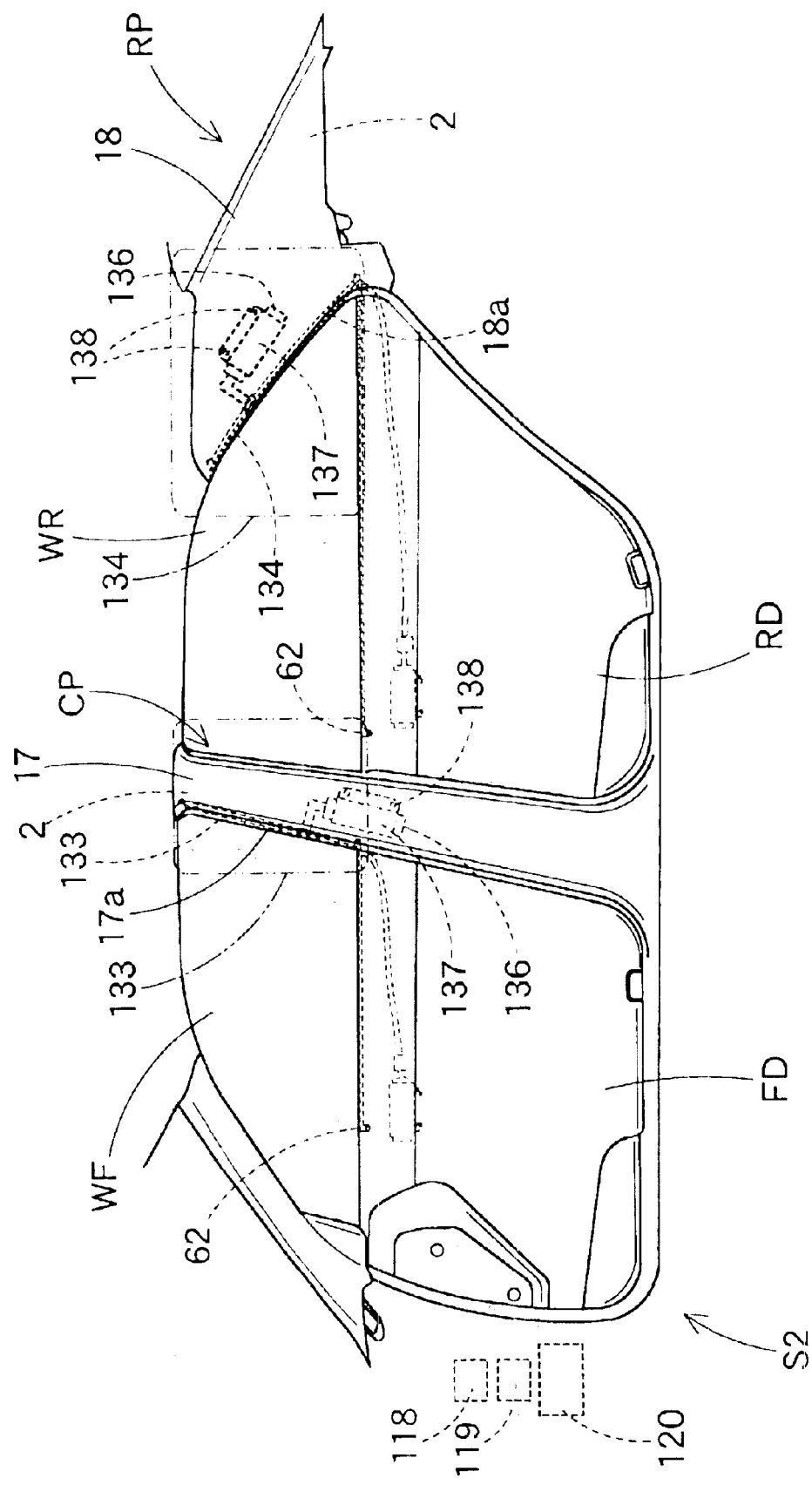
FIG. 13 is a front elevation showing the expansion and inflation of an airbag in the occupant restraining device of the second embodiment as taken from the inner side.

In the occupant restraining device S2 of the second embodiment, as shown in FIGS. 9 and 13, a shielding members 121F/121R for shielding the window WF/WR of the door FD/RD is expanded by admitting the inflating gas thereinto. Airbags 133/134 that expand at the time of a side collision are mounted to the inner panel 2 on the side of the body 1 of the center pillar portion CP and the rear pillar portion RP.

These shielding members 121F/121R are expanded from their folded states when inflator 128/128 acts as a drive source 127 for deployment mechanism 126. The inflator 128 is activated when the control device 120 receives a rollover detection signal from the rollover sensor 118. The airbags 133/134 are individually formed into generally rectangular sheet shape. Moreover, the airbags 133/134 are expanded from their folded state by the action of the inflator 136/136. Each inflator 136 is activated when the control device 120 receives a side collision detection signal from the side collision sensor 119 at the time when a predetermined or higher impact is applied to the side face of the vehicle.

Here, the rollover sensor 118, the side collision sensor 119 and the control device 120 are arranged at predetermined positions of the vehicle and are electrically connected to one another, and the inflator 128/136 is also electrically connected with the control device 120.

In the case of the second embodiment, the airbags 133/134 are housed while being covered with the center pillar garnish 17 and the rear pillar garnish 18 which are arranged on the inner side of the pillar portions CP/RP. The garnish 17/18 is made of a synthetic resin and is provided on its front edge side with a door portion 17a/18a to be opened by the push of the airbags 133/134. The door portion 17a/18a is provided on its rear edge side with a thin hinge portion (although not designated by any numeral) for opening the door portion 17a/18a smoothly. The airbags 133/134 are mounted on the inner panel 2 of the pillar portion CP/RP on the side of the body 1. Moreover, the airbags 133/134 are interposed, when expanded/inflated with the inflating gas from the inflator 136/136, between the occupant and the garnish 17/18, as shown in double-dotted lines in FIG. 13.

The inflator 136/136 is held by a mounting bracket 137. Moreover, this mounting bracket 137 is fixed on the inner panel 2 by means of mounting bolts 138.

Figure 11:
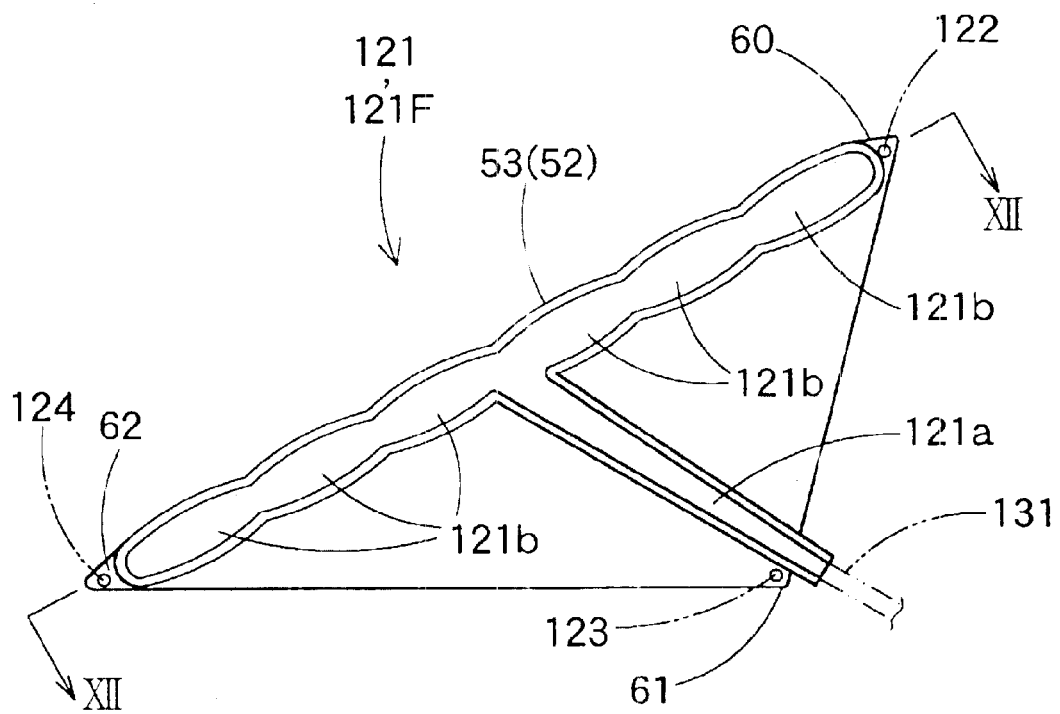
FIG. 11 is a front elevation showing the time of inflation of the single shielding member of the second embodiment.
Figure 12:
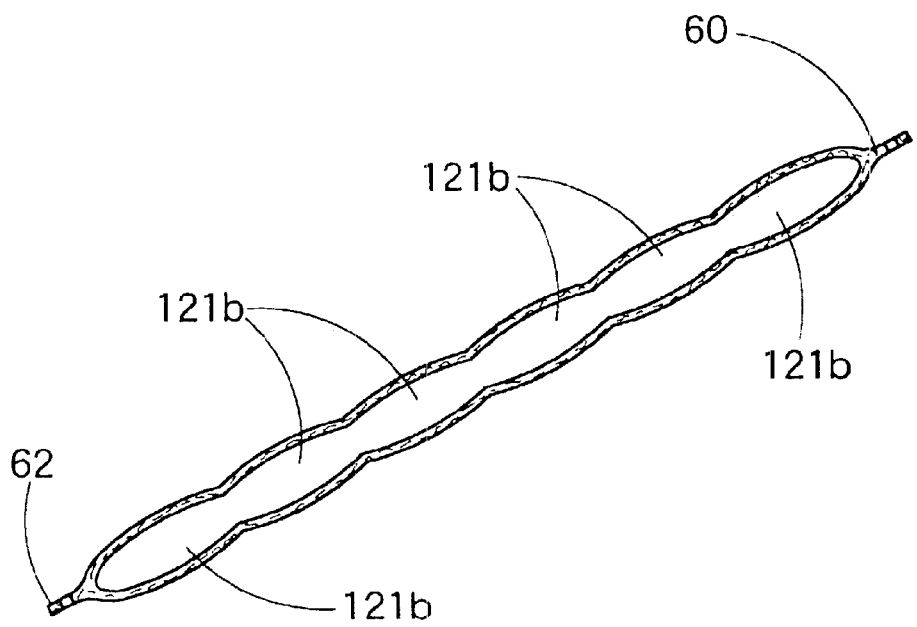
FIG. 12 is a sectional view of a portion XII—XII of FIG. 11.

The shielding members 121F/121R are expanded like the shielding members 51F/51R into a triangular sheet shape, as shown in FIGS. 9 and 11. Specifically, the shielding members 121F/121R shield the triangular region extending downward to the front from the rear vertical edge portion 25 in the window WF/WR of the door frame 22F/22R. The shielding members 121F/121R fixes the three apex portions 60/61/62 in the expanded state on the peripheral edge of the window WF/WR of the door frame 22F/22R by using mounting bolts 122/123/124. At the oblique side 53 of the shielding members 121F/121R, moreover, there are arranged a plurality of inflation portions 121b for causing a tension along the oblique side 53. In the inflation portions 121b, there is arranged an inlet passage 121a for admitting the inflating gas. The individual inflation portions 121b are made to communicate with one another so that they may be roundly inflated when fed with the inflating gas. The inlet passage 121a is extended obliquely upward from the vicinity of the rear lower apex portion 61 to communicate with the inflation portions 121b at the central portion of the oblique side 53 to enable the deployment of the shielding member 121. To the vicinity of the apex portion 61 of the inlet passage 121a, there is connected a feed pipe 131 for guiding the inflating gas from the inflator 128.

Moreover, the shielding members 121F/121R are housed in the folded state that they are covered with the rear vertical edge portion 34 and the lower edge portion 35 of the door frame garnish 31F/31R. If the inflating gas flows in via the inlet passage 121a, the shielding members 121F/121R push and open the door portions 37/45 of the edge portions 34/35 and protrude into the window WF/WR. Subsequently, the inflation portions 121b are inflated in a spherical shape, and the inlet passage 121a is inflated in a rod shape, so that the shielding members 121F/121R are expanded into a triangular sheet shape joining the top portions 60/61/62.

The deployment mechanism 126 for expanding the shielding members 121F/121R is constructed to include the inflator 128 as the drive source 127, and the feed pipe 131. The inflator 128 is connected, as a cylinder type similar to the inflator 82 of the first embodiment, to the feed pipe 131. Each of the inflators 128 is clamped by a mounting bracket 129. By fixing the mounting bracket 129 on the door frame 22F/22R with bolts 130, the inflator 128 is arranged in the front side of the lower edge portion DW in the window WF/WR.

Each of the feed pipes 131 is provided near the inflator 128 with the flow control valve 90. This valve 90 is also normally held in the fully open state. In response to a rollover detection signal from the rollover sensor 118, the control device 120 controls the valve 90 to throttle the flow rate of the inflating gas.

In this occupant restraining device S2 of the second embodiment, too, the control device 120 controls each of the flow control valves 90 and activates the inflator 128 when it receives a rollover detection signal from the rollover sensor 118. Then, the shielding members 121F/121R shielding members 121F/121R are inflated by feeding the inflating gas from the inflator 128 via the feed pipe 131 and the inlet passage 121a to the inflation portions 121b. Therefore, the shielding members 121F/121R push and open the door portion 37/45 and protrudes into the window WF/WR. Then, the inflation portions 121b is inflated in the spherical shape, and the inlet passage 121a is inflated in the rod shape. Specifically, the shielding members 121F/121R are expanded, as indicated by double-dotted lines in FIG. 9, obliquely forward and upward along the arranged direction of the inlet passage 121a from the rear corner C1 of the lower edge portion DW of the peripheral edge of the window WF/WR. Consequently, the shielding members 121F/121R are expanded in the triangular sheet shape jointing the top portions 60/61/62.

Therefore, the shielding members 121F/121R are smoothly expanded to raise the occupant from the lower side, even if the occupant leans against the lower edge portion DW of the window WF/WR on the inner side of the vehicle, thereby to shield the window WF/WR.

Therefore, the occupant restraining device S2 of the second embodiment can also restrain the occupant properly at the time of a rollover of the vehicle.

In the occupant restraining device S2 of the second embodiment, on the other hand, the control device 120 activates each inflator 136 to expand/inflate the airbags 133/134 in response to the side collision detection signal from the side collision sensor 119. Therefore, the airbag 133/134 push and open the door portion 17a/18a of the center pillar garnish 17 and the rear pillar garnish 18 so that it is interposed between the occupant and the center pillar portion CP or the rear pillar portion RP, i.e., the inner side face of the vehicle.

At this time, the control device 120 naturally actuates each inflator 128 without controlling the flow control valve 90 being fully opened. Therefore, the shielding members 121F/121R are also expanded.

Figure 14:
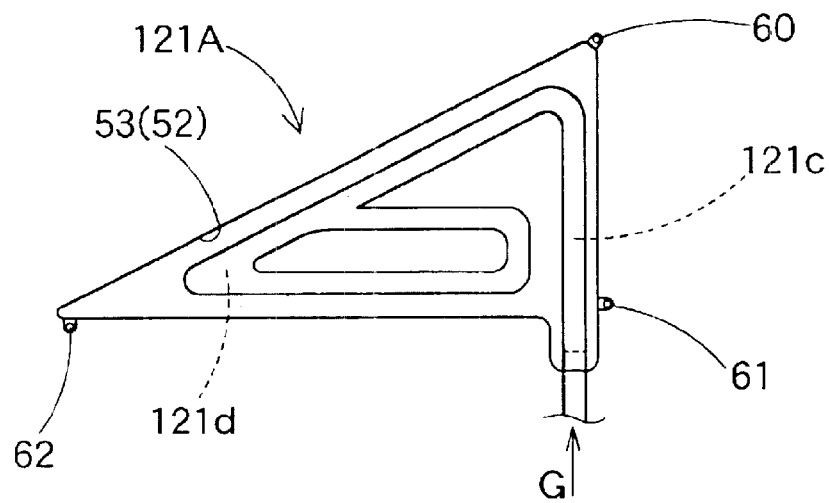
FIG. 14 is a diagram showing a modification of the shielding member of the second embodiment.

Here, the shielding member for admitting the inflating gas G may be constructed as a shielding member 121A, as shown in FIG. 14. In this shielding member 121A, there are arranged a vertical gas passage 121c for expanding itself, and a bent gas passage 121d for causing the oblique side 53 to exhibit a tension.

Here, the second embodiment has been described on the case in which the airbags 133/134 and the inflators 136/136 for inflating the airbags 133/134 are mounted on the roof side rail portion RR or the pillar portion CP/RP on the side of the body 1. However, the inflator 136 for expanding/inflating the airbags 133/134 against the side collision may be shared with the drive source 127 of the deployment mechanism 126.

Specifically, each inflator 128 of the second embodiment is constructed into such a dual type capable of discharging the inflating gas from the two axial ends as to expand/inflate the airbags 133/134 nearby. Moreover, each inflator 128 is connected to such a feed pipe in addition to the feed pipe 131 as to feed the airbags 133/134 with the inflating gas.

Moreover, the airbag 133/134 are so folded and housed as is covered with the rear vertical edge portion 34 of the peripheral edge of the window WF/WR. At the time of the expansion and inflation, therefore, the airbag 133/134 are expanded/inflated while pushing and opening the door portion 37 of the rear vertical edge portion 34.

Moreover, the inflator 128 of this case feeds the shielding members 121F/121R with the inflating gas when the control device 120 receives a rollover detection signal from the rollover sensor 118. When the control device 120 receives a side collision detection signal from the side collision sensor 119, on the other hand, the inflator 128 feeds the airbags 133/134 with the inflating gas.

In the occupant restraining device of this case, therefore, the shielding members 121F/121R, the airbags 133/134 and the inflator 128 acting as the drive source for expanding/inflating them are arranged in the door FD/RD, so that the mounting of the occupant restraining device on the vehicle is carried out simultaneously with the time of assembling the door FD/RD in the body 1. Therefore, the occupant restraining device can be assembled in the vehicle simply.

Figure 15:
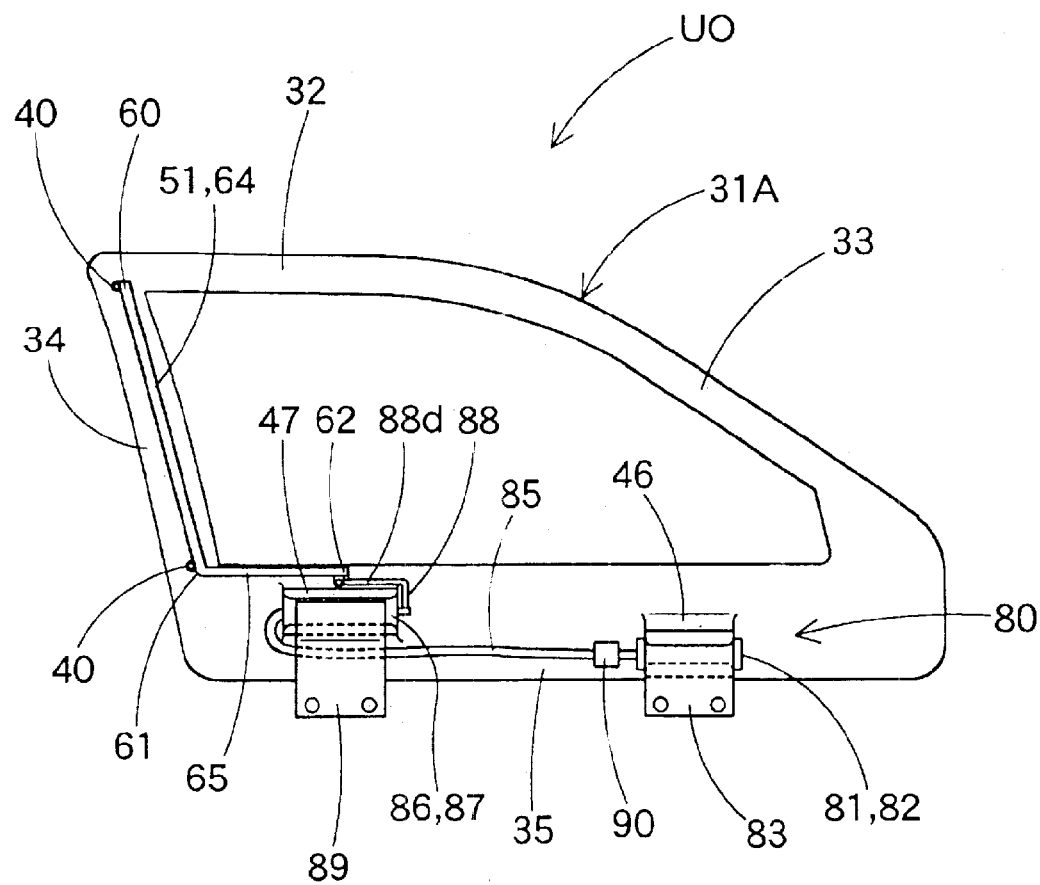
FIG. 15 is a diagram showing an occupant restraining unit in a modification of the first embodiment mounted to an exterior side of a door frame garnish as viewed from the exterior of the vehicle.
Figure 16:
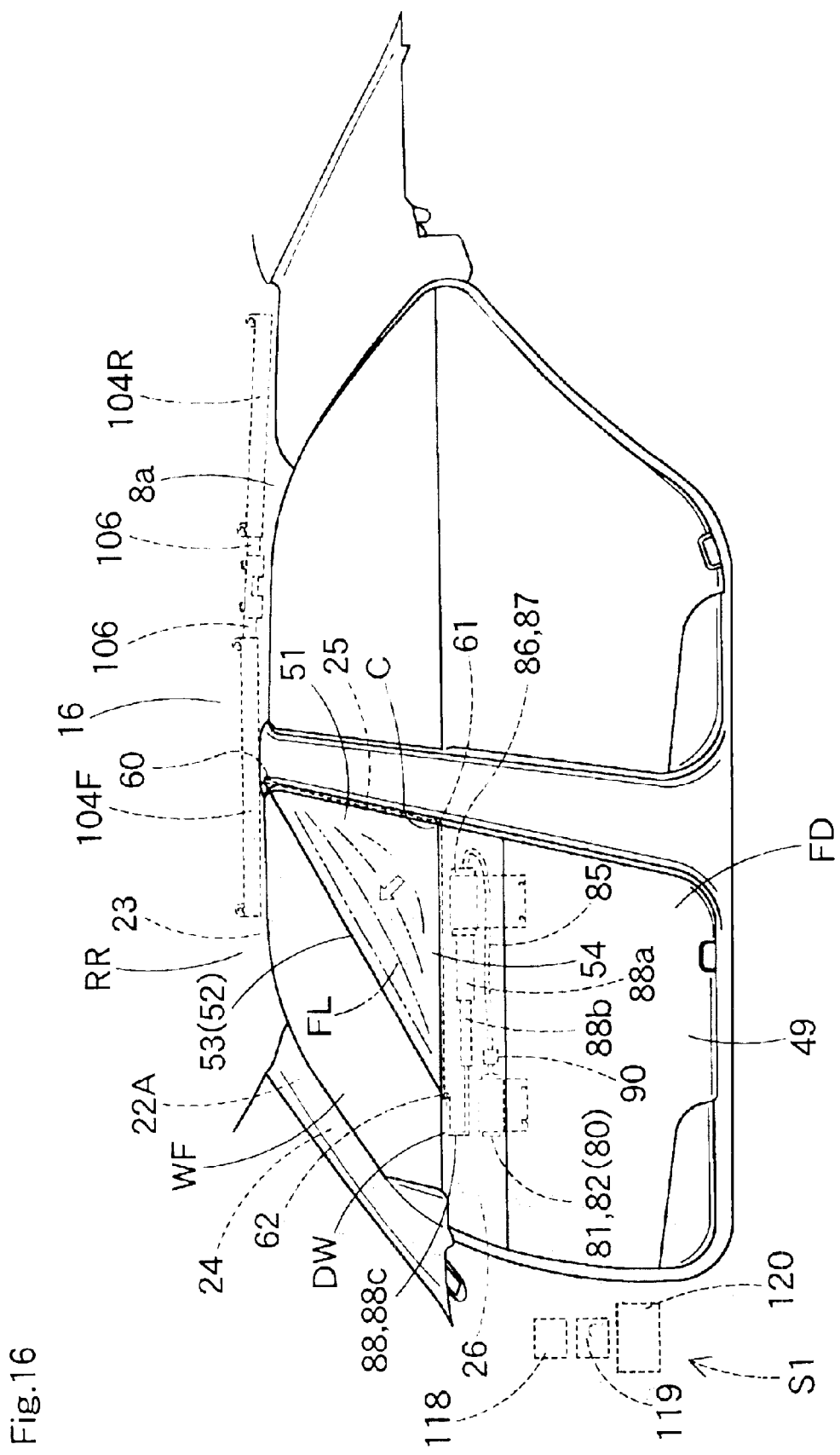
FIG. 16 is a diagram showing the state in which the occupant restraining unit shown in FIG. 15 is mounted on the vehicle, as taken from the inner side.

From this viewpoint, the shielding member 51, the deployment mechanism 80 and a door frame garnish 31A may be assembled together in advance to form an occupant restraining unit U0, as shown in FIGS. 15 and 16. Alternatively, the shielding member 51 and a door frame garnish 31B may be assembled together in advance to form a shielding member unit U1, as shown in FIGS. 18 and 19.

Figure 18:
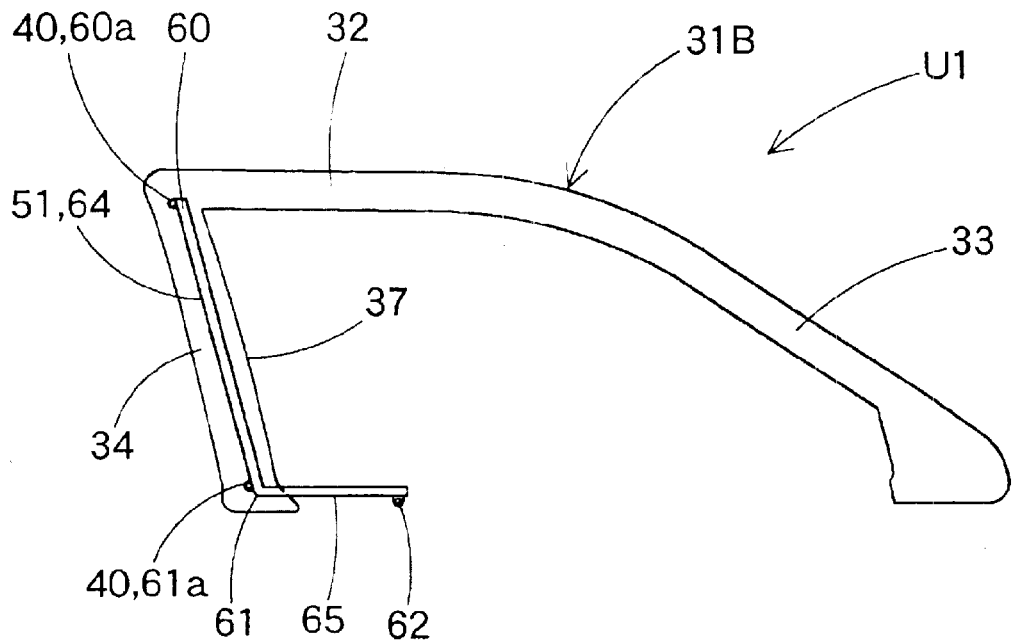
FIG. 18 is a diagram showing an shielding member unit to be employed in a modification of the first embodiment as taken from the outer side.
Figure 19:
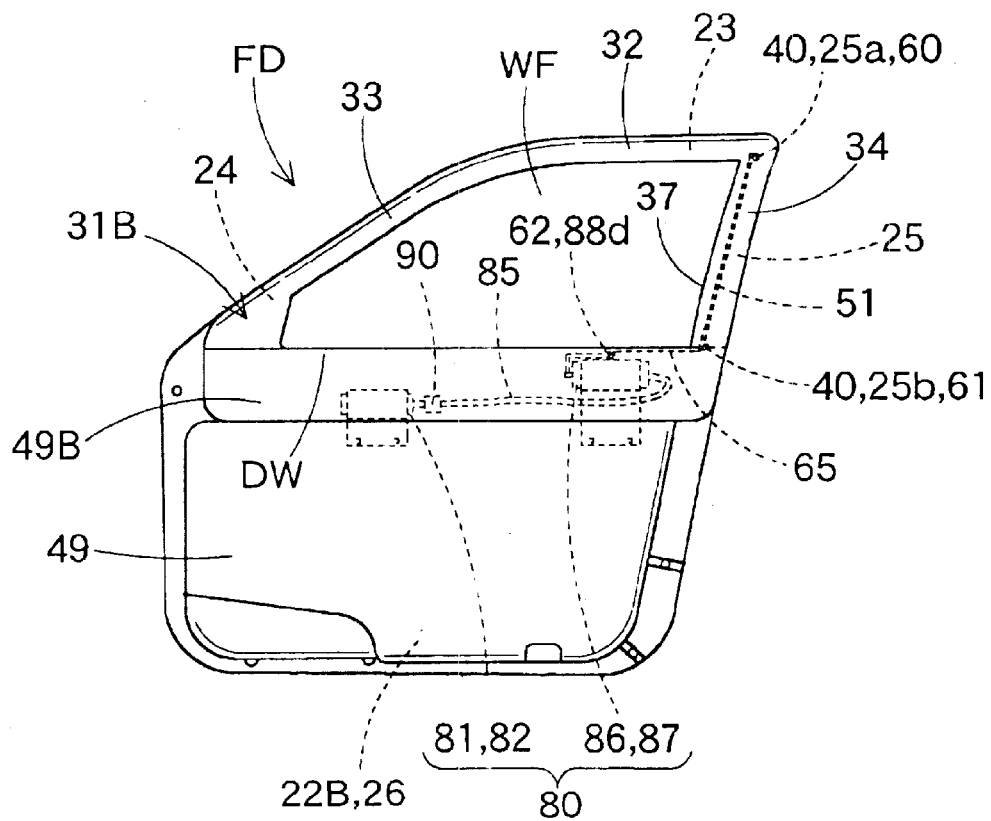
FIG. 19 is a diagram showing the state in which the shielding member unit shown in FIG. 18 is mounted on a door, as taken from the inner side.

Here, the shielding member 51 for forming the unit U0/U1 is provided at its apex portions 60/61 with mounting holes 60a/61a, as shown in FIGS. 15, 17 and 18. The garnish 31A/31B is provided with retaining pins 40 buried in the rear vertical edge portion 34. Moreover, a door frame 22A/22B is provided with mounting holes 25a/25b in the upper/lower portions of the rear vertical edge portion 25. The retaining pins 40 are inserted through the mounting holes 60a/61a into the mounting holes 25a/25b to be retained on the peripheral edges of the mounting holes 25a/25b. As a result, the apex portion 60/61 is fixed in the door frame 22A/22B. On the other hand, the apex portion 62 is fixed on the piston rod upper end 88d by means of bolts.

Moreover, the garnish 31A is provided on the vehicle's outer side face of the lower edge portion 35 with grip portions 46/47. The grip portion 46 grips the inflator 82 constructing the deployment mechanism 80. The grip portion 47 grips the cylinder 87 constructing the connection means 86. With this cylinder 87, there is assembled a mounting bracket 89 for fixing the cylinder 87 on the lower edge portion 26 of the door frame 22A.

In the assembly of this occupant restraining unit U0, the shielding member 51 in the flatly expanded state is so folded in the bellows shape with folds FL that the front apex portion 62 may approach the rear apex portion 60/61, and the shielding member 51 thus folded is wrapped with a plurality of not-shown breakable tape members for preventing the collapse. The inflator 82 and the cylinder 87 are gripped by the grip portions 46/47 and are assembled with the garnish 31A. At this time, the feed pipe 85 provided with the flow control valve 90 is connected in advance to the inflator 82 and the cylinder 87. Then, the retaining pins 40 are inserted into the mounting holes 60a/61a to mount the apex portions 60/61 of the shielding member 51 in the garnish rear vertical edge portion 34 on the outer side of the vehicle. Thus, the occupant restraining unit U0 can be assembled, as shown in FIG. 15, if the front end side apex portion 62 of the shielding member 51 is connected to the upper end 88d of the piston rod 88 by means of predetermined bolts.

In the occupant restraining unit U0 thus assembled, the retaining pins 40/40 are attached to the mounting holes 25a/25b of the door frame 22A. The garnish 31A is fixed on the door frame 22A by using bolts or the like at not-shown positions, while being fitted in the upper edge portion 23, the front vertical edge portion 24, the rear vertical edge portion 25 and the lower edge portion 26 of the door frame 22A. When the individual mounting brackets 83/89 are fixed on the door frame lower edge portion 26, the occupant restraining unit U0 can be assembled in the door frame 22A. After this, the door trim 49 is mounted on the door frame lower edge portion 26 so that the assembly of the door FD can be completed. Then, the door FD is mounted on the body 1 so that the occupant restraining device S1 can be mounted on the vehicle, as shown in FIG. 16. Here, the control device 120 and the sensors 118/119 are separately mounted at predetermined positions of the vehicle. At the time of mounting the occupant restraining device S1 on the vehicle, not-shown lead wires extending from the inflator 82 are connected to the control device 120.

The garnish 31B constructing the shielding member unit U1 is not provided with the lower edge portion 35, as shown in FIG. 18, unlike the garnish 31A. Moreover, the lower edge portion 35 is formed in a door trim 49B for covering the lower edge portion 26 of the door frame 22B.

In the assembly of this shielding member unit U1, the shielding member 51 in the flatly expanded state is so folded in the bellows shape that the front apex portion 62 may approach the rear apex portion 60/61, and the shielding member 51 thus folded is wrapped with a plurality of not-shown breakable tape members for preventing the collapse. Then, the retaining pins 40 are inserted into the mounting holes 60a/61a to mount the apex portions 60/61 of the shielding member 51 in the garnish rear vertical edge portion 34 on the outer side of the vehicle, so that the shielding member unit U1 can be assembled.

Moreover, the retaining pins 40/40 are fitted in the mounting holes 25a/25b of the door frame 22B. The upper edge portion 32, the front vertical edge portion 33 and the rear vertical edge portion 34 of the garnish 31B are fitted in the upper edge portion 23, the front vertical edge portion 24 and the rear vertical edge portion 25 of the door frame 22B, and the garnish 31B is fixed on the door frame 22B by using bolts at not-shown portions. Thus, the shielding member unit U1 can be assembled with the door frame 22B.

After this, the inflator 82 and the cylinder 87 are fixed on the door frame 22B, and the door trims 49B/49 are mounted on the door frame lower edge portion 26. Then, the assembly of the door FD can be completed, as shown in FIG. 19. Moreover, the subsequent mounting of the unit on the vehicle and the action modes are similar to those of the occupant restraining unit U0.

Here, the unit U0/U1 has been described on the side of the front door FD, but the rear door RD can be likewise constructed.

Figure 25:
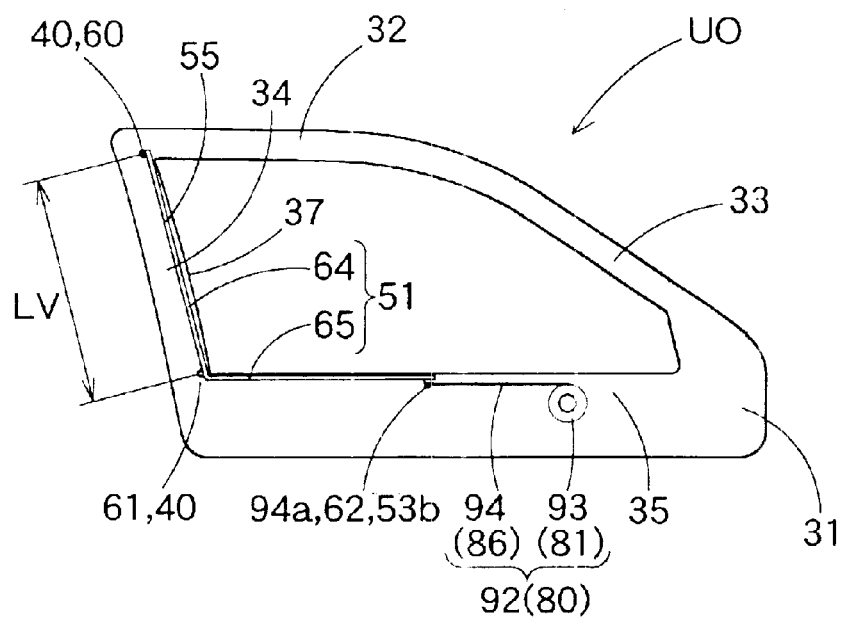
FIG. 25 is a front elevation showing the occupant restraining unit of the third embodiment as taken from the outer side.
Figure 50:
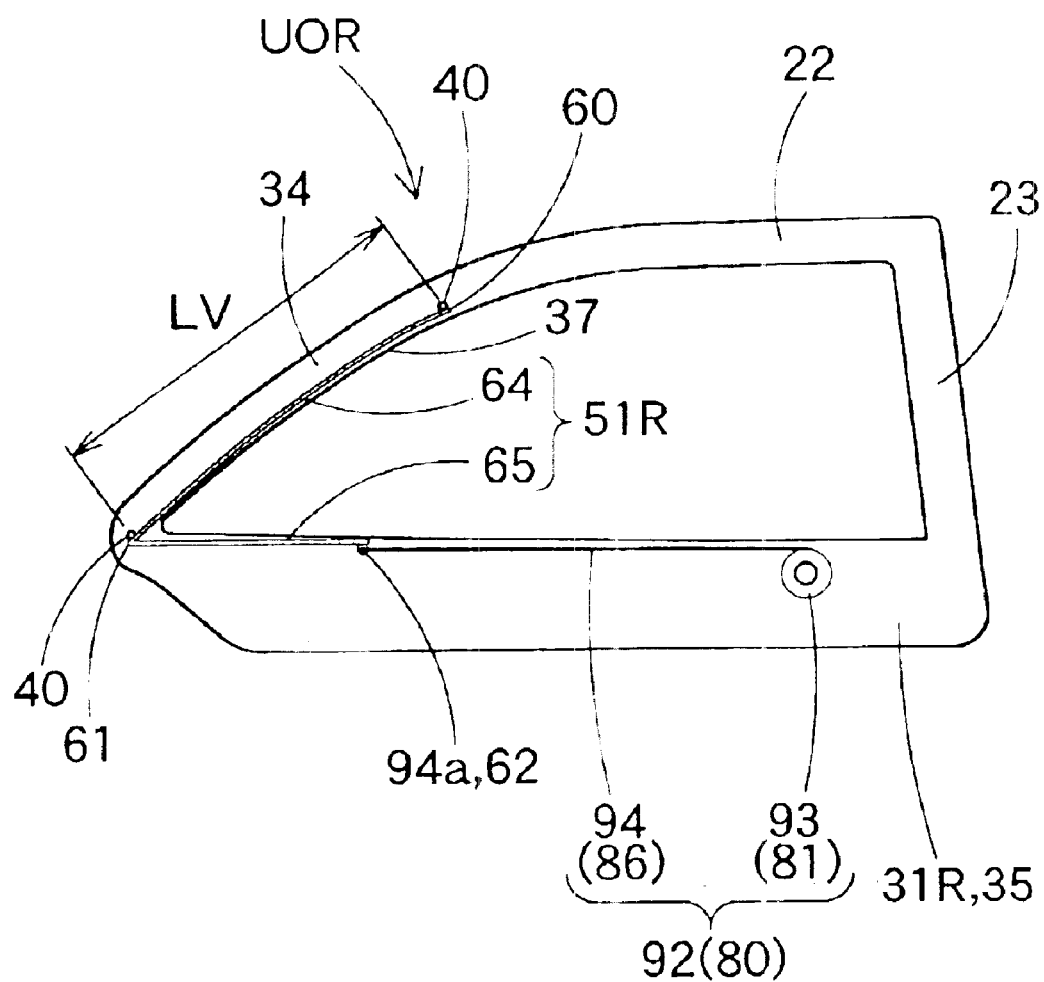
FIG. 50 is a front elevation showing the occupant restraining unit of the fourteenth embodiment on the rear side of the vehicle as taken from the outer side.

As the deployment mechanism 80, a pretensioner 92 may be used, as shown in FIGS. 25 and 50. This pretensioner 92 is constructed to include a body 93 as the drive source 81 and a tension member 94 as the connection means 86 to be tensed at the time of action of the body 93. The tension member 94 is connected to the apex portion 62 of the shielding member 51. The pretensioner 92 utilizes electric/mechanical means such as gas pressure of the inflator, an electric motor, the restoring force of a spring, or an electromagnetic solenoid. In case the pretensioner 92 is used as the deployment mechanism 80, moreover, the construction of the deployment mechanism 80 can be made compact so that it can be properly employed in the occupant restraining unit U0.

Here will be described an occupant restraining device S3 of a third embodiment. The occupant restraining device S3 of the third embodiment is constructed, as shown in FIGS. 20, 21, 23 and 26, to include: a shielding member 51 which is so expanded and inflated from the peripheral edge of the window WF as to shield the inner side of the window WF; and an airbag 104 which is so expanded/inflated from the peripheral edge of the window WF as to be interposed between the shielding member 51 and the occupant.

The shielding member 51 is activated by a pretensioner 92 acting as deployment mechanism 80, and the airbag 104 is expanded/inflated by the inflating gas from an inflator 112. The pretensioner 92 and the inflator 112 are operationally controlled by a control device 120. The control device 120 activates the pretensioner 92 and the inflator 112 when it receives such a rollover detection signal from the rollover sensor 118 as to predict a rollover of the vehicle. Here, the control device 120 and the rollover sensor 118 are arranged at predetermined positions of the vehicle.

The front door FD, in which the shielding member 51 is arranged, is constructed to include: a door frame 22 on the outer side O; a door frame garnish 31 on the peripheral edge of the window WF of the door frame 22 on the inner side I; and a door trim 49 arranged below the garnish 31 on the inner side I of the door frame 22.

The door frame 22 is made of a sheet metal and constructed to include: an upper edge portion 23; front/rear vertical edge portions 24/25 arranged generally vertically on the two front and rear end sides; and a lower edge portion 26 on the lower end side, each of which is arranged in the peripheral edge enclosing the window WF, respectively. Near the upper/lower portions of the rear vertical edge portion 25, there are formed mounting holes 25a/25b for mounting the shielding member 51 (as referred to FIG. 24).

The door frame garnish 31 is made of a synthetic resin such as a thermoplastic elastomer of polyolefin, and is constructed to include an upper edge portion 32, front/rear vertical edge portions 33/34 and a lower edge portion 35 which are individually arranged on the peripheral edge around the window WF. The upper edge portion 32 is located on the upper edge side; the front/rear vertical edge portions 33/34 are arranged generally vertically on the two front/rear end sides; and the lower edge portion 35 is located on the lower edge side. The upper edge portion 32, the front vertical edge portion 33 and the rear vertical edge portion 34 are formed to have such a generally U-shaped section that they can fit in the inner side I of the upper edge portion 23, the front vertical edge portion 24 and the rear vertical edge portion 25 of the door frame 22 in the peripheral edge of the window WF (as referred to FIGS. 22 and 23).

Figure 22:
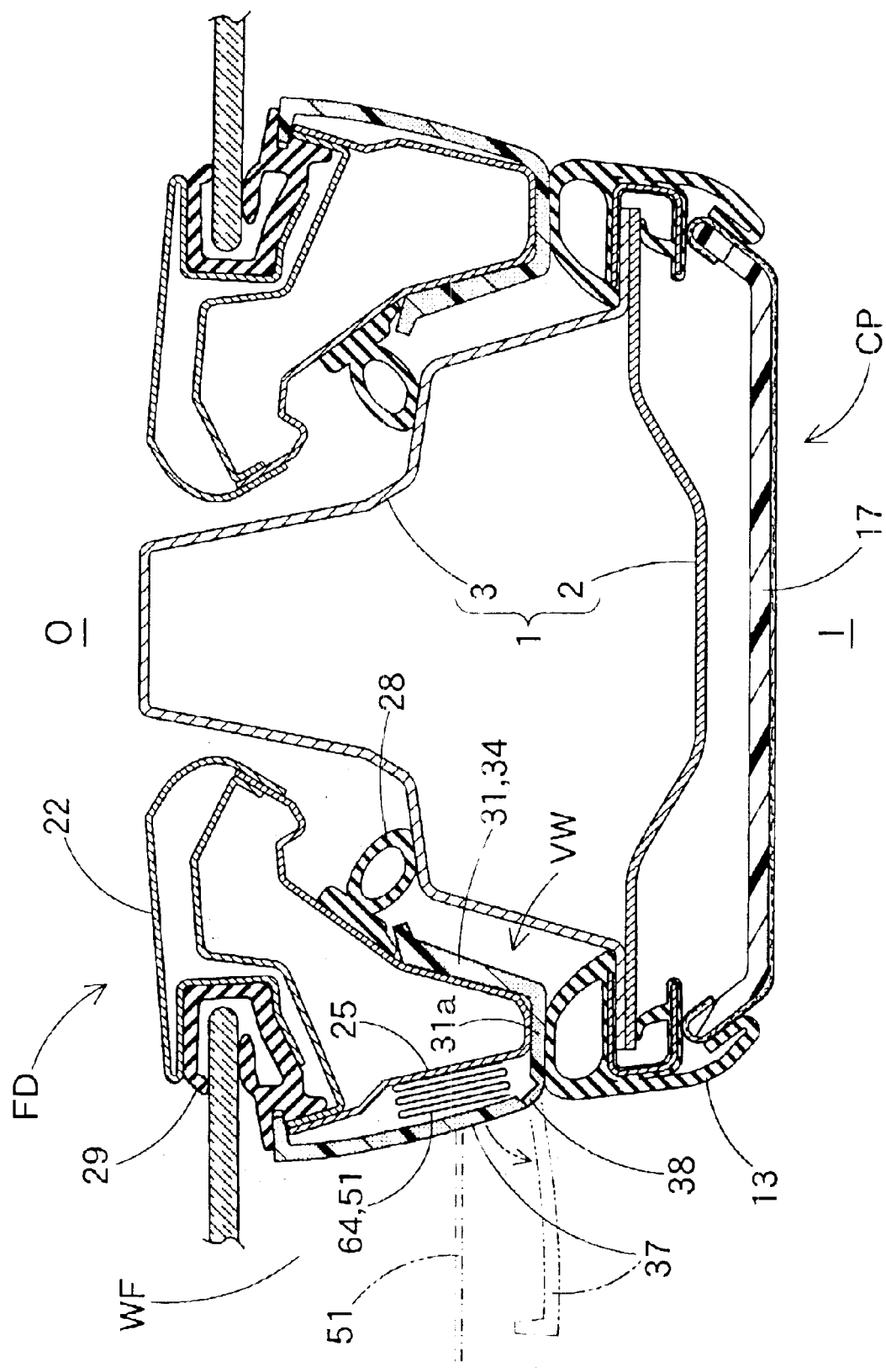
FIG. 22 is a schematic section of a portion XXII—XXII of FIG. 20.
Figure 24:
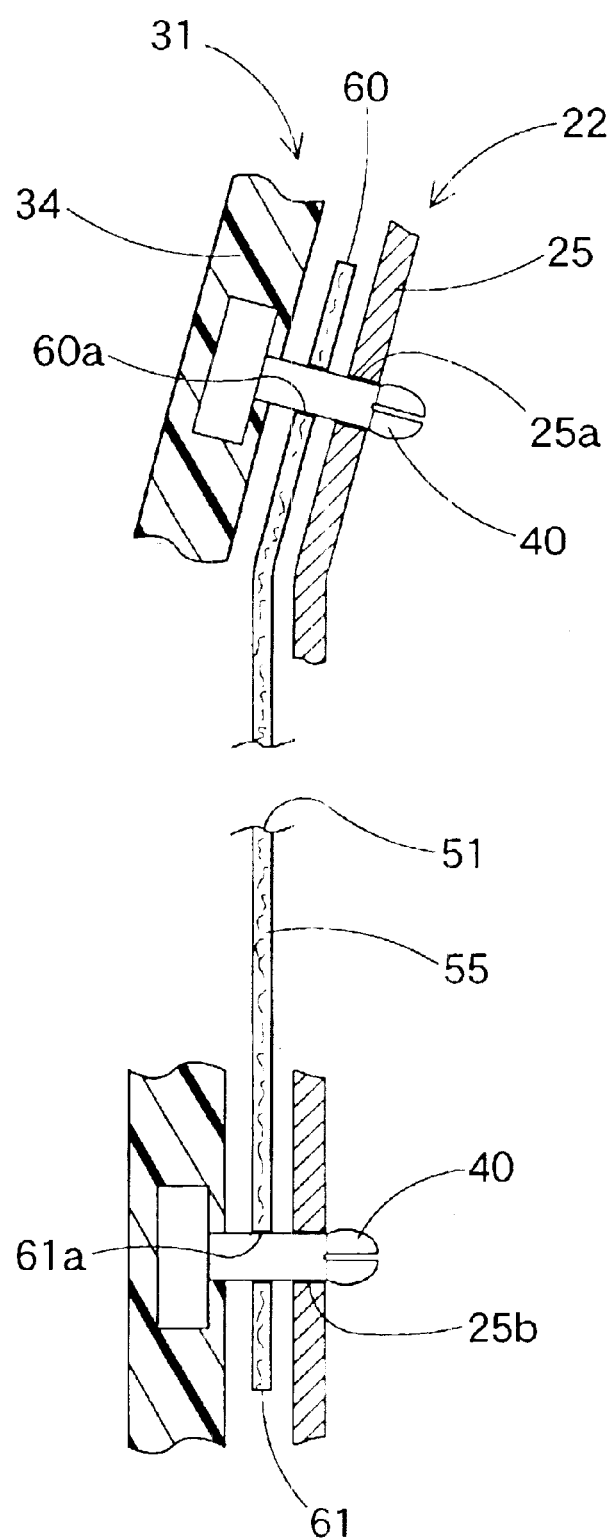
FIG. 24 is a schematic section of a portion XXIV—XXIV of FIG. 21.

Retaining pins 40 are made of a metal and are embedded in the rear vertical edge portion 34 covering the housed shielding member 51. Each of the pins is inserted into and retained in the mounting holes 25a, 25b of the door frame 22 (as shown in FIG. 24). At the rear vertical edge portion 34 of each garnish 31, as shown in FIG. 22, there is arranged a door portion 37 which is pushed and opened, when the housed shielding member 51 is deployed, by the push of the shielding member 51. The door portion 37 is provided with a thin hinge portion 38 on the inner side end portion so that it may be easily opened. A later-described vertical edge side housed portion 64 of the shielding member 51 folded and housed is housed between the door portion 37 and the rear vertical edge portion 25 of the door frame 31 while being covered on its front side with the door portion 37.

Figure 23:
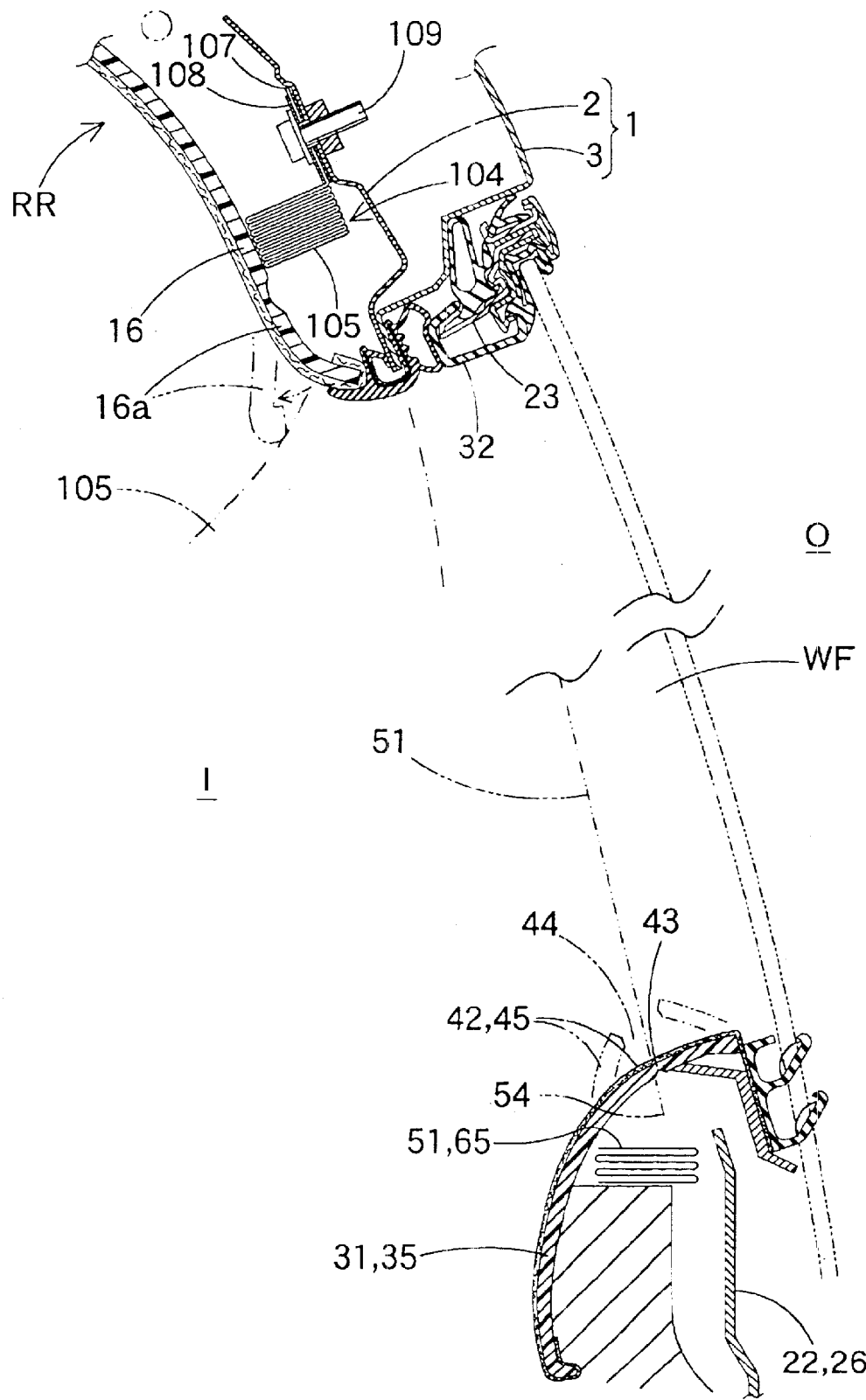
FIG. 23 is a schematic section of a portion XXIII—XXIII of FIG. 20.

On the upper edge side of the lower edge portion 35 of the garnish 31, as shown in FIG. 23, there is arranged a cover portion 42 which is provided with such a thin portion 43 to be broken as extends longitudinally along the vehicle. The cover portion 42 covers not only a later-described lower edge side housed portion 65 of the shielding member 51 folded and housed, but also the track of a moving tension member leading end 94a in the pretensioner 92 acting as the deployment mechanism 80. When the tension member leading end 94a moves forward (as referred to FIGS. 20, 21 and 26), the portion 43 to be broken is broken by the shielding member 51 to form an opening 44, in which the lower edge portion 54 of the shielding member 51 expanded is arranged.

On the outer face of the garnish lower edge portion 35, moreover, there is mounted the body 93 as the drive source 81 of the pretensioner 92 (as referred to FIG. 25).

The garnish 31 of the third embodiment is constructed as a two-color molded part having a mutual compatibility. Specifically, the door portion 37, the hinge portion 38 and the cover portion 42 are made of a thermoplastic elastomer of polyolefin or the like so that they may be easily opened when the shielding member 51 is expanded, and the remaining portions are made of a synthetic resin such as hard polypropylene so that they may be able to retain a strength.

Moreover, the side of the body 1 of the peripheral edge of the door FD is constructed of an inner panel 2 and an outer panel 3, as shown in FIG. 22. There is also arranged on the side of the body 1 a weather strip 13 for sealing the outer peripheral edge of the door FD. The weather strip 13 is forced, when the door FD is closed, to contact with the top portion 31a of the garnish 31 protruding to the inner side I and the front edge, the lower edge and the rear edge of the door FD on the lower side apart from the garnish 31. The inward protruding top portion 31a of the garnish 31 is arranged at the upper edge portion 32, the front vertical edge portion 33 and the rear vertical edge portion 34. A member designated by numeral 28 in FIG. 22 is a weather strip fixed on the outer edge side of the door frame 22. This weather strip 28 is pressed, when the door FD is closed, on the outer panel 3 on the side of the body 1. Moreover, a member designated by numeral 29 is a glass run.

Figure 20:
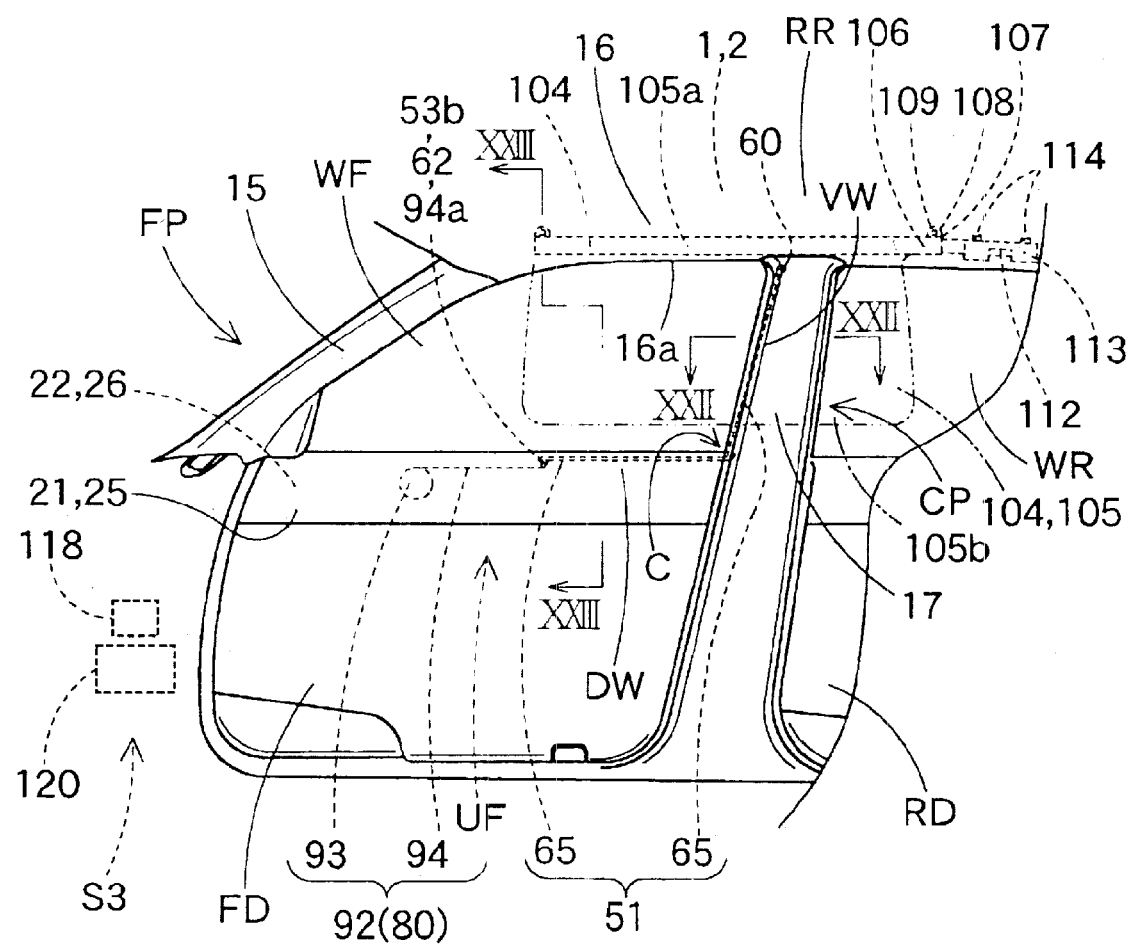
FIG. 20 is a front elevation showing an occupant restraining device of a third embodiment as taken from the inner side.
Figure 21:
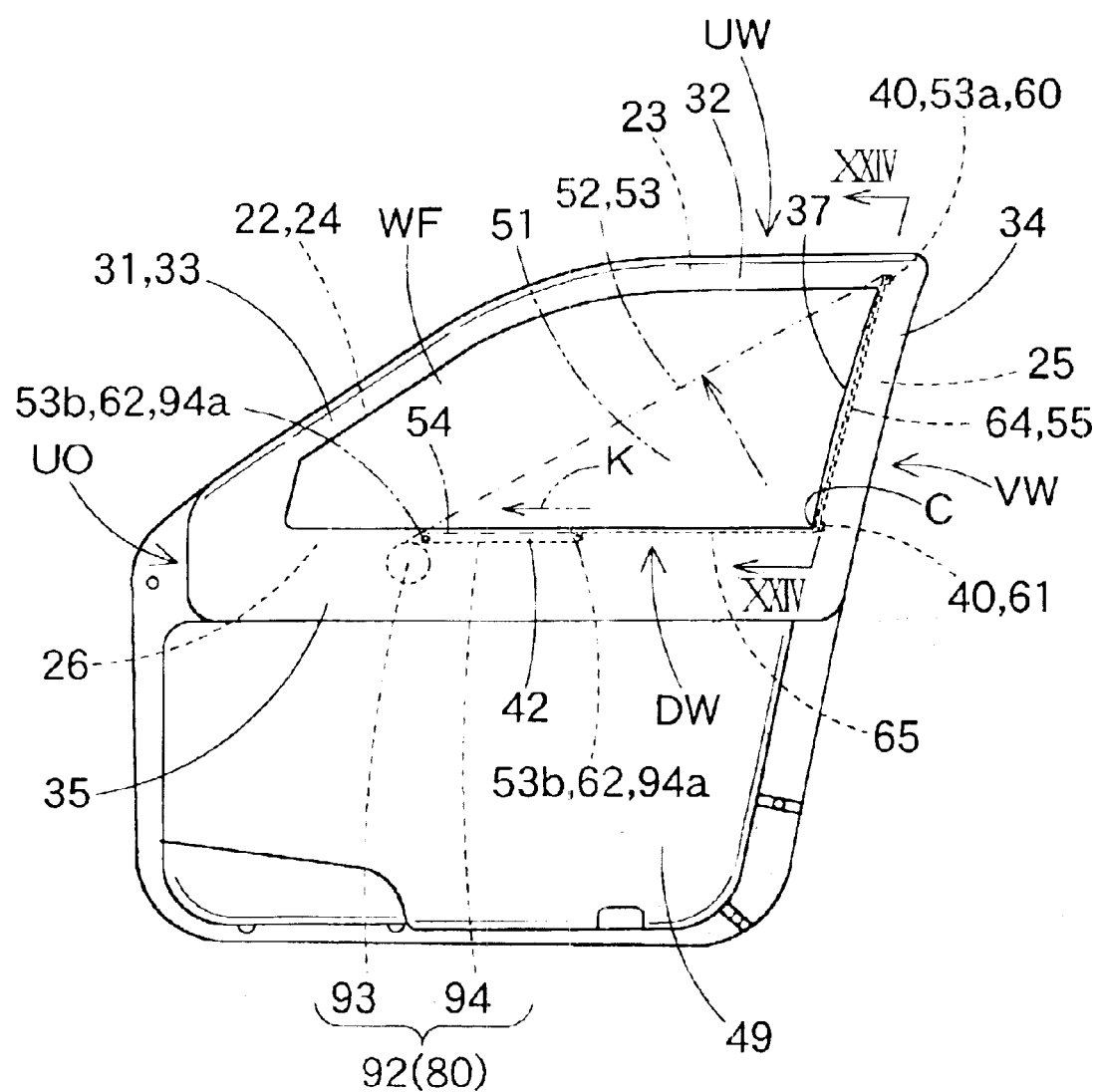
FIG. 21 is a front elevation showing a door of the third embodiment as taken from the inner side.
Figure 26:
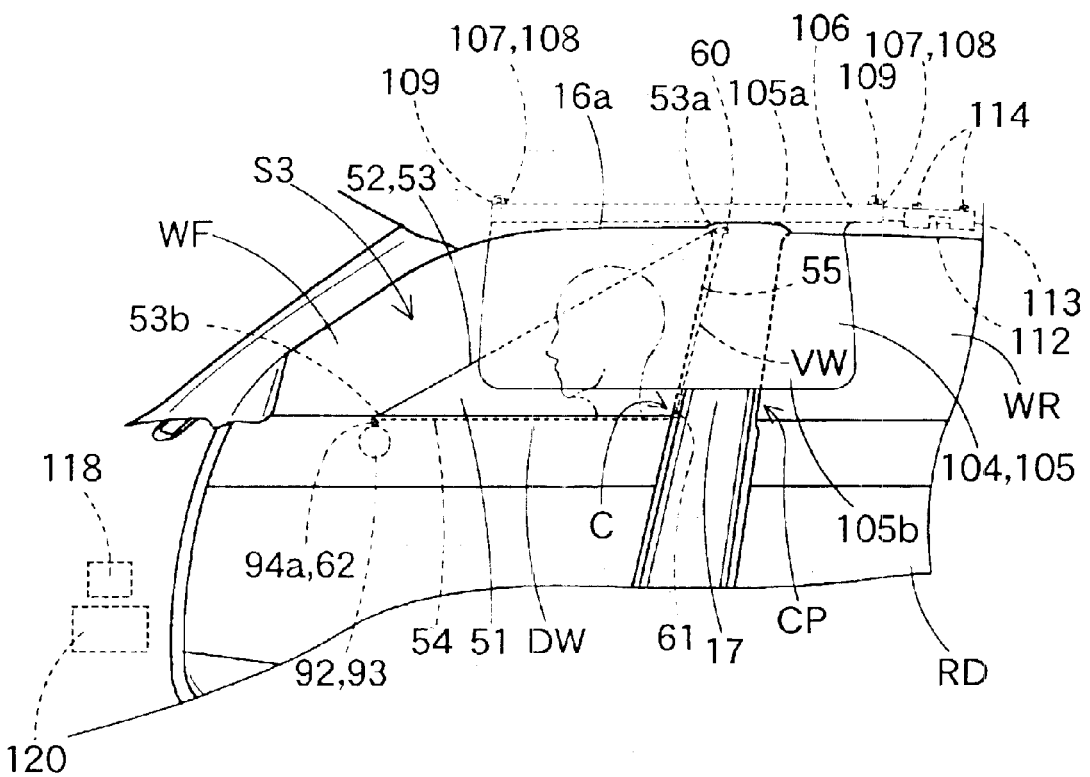
FIG. 26 is a front elevation showing the occupant restraining device of the third embodiment in action as taken from the inner side.

As shown in FIGS. 20, 21 and 26, moreover, the shielding member 51 is formed into such a sheet shape of a flexible cloth of polyester or polyamide yarns as to shield the window WF. The shielding member 51 is so shaped at its deployment completion as to have the oblique side 53 to cross the window WF obliquely. Moreover, the shielding member 51 is so shaped as to shield the region of the window WF halved by the oblique side 53, i.e., the region on the lower side of the oblique side 53. Moreover, the shielding member 51 is folded and housed in the peripheral edge in that shielded region of the window WF that is shielded by the shielding member 51.

In the case of the third embodiment, the shielding member 51 is formed into such a generally triangular shape as includes: the oblique side 53; the lower edge portion 54 extending backward from the lower end 53b of the oblique side 53; and a vertical edge portion 55 extending downward from the upper end 53a of the oblique side 53. The vertical edge portion 55 is arranged along the vertical edge portion VW which is arranged generally vertically in the rear side of the peripheral edge of the window WF, and the lower edge portion 54 is arranged along the lower edge portion DW which is arranged generally longitudinally in the lower side of the peripheral edge of the window WF.

Moreover, the shielding member 51 is set to have a longer length L1 of the oblique side 53 at the completion of deployment than the length L0 expanded flatly at non-deployment, as shown in FIG. 27A, so as to increase the tension in the direction along the oblique side 53 which is to be established in the oblique side 53 at the completion of deployment. In the case of the third embodiment, moreover, the shielding member 51 is manufactured to have the lower edge portion 54 of a length LD, the vertical edge portion 55 of a length LV and the oblique side 53 of the length L0 and to have an angle of intersection of $\alpha 0$ between the lower edge portion 54 and the vertical edge portion 55. LD is the length of the lower edge portion 54 corresponding to the arrangement of the leading end apex portion 62 and the lower apex portion 61 at the instant of deployment completion. LV is the length of the vertical edge portion 55 corresponding to the arrangement of the upper apex portion 60 and the lower apex portion 61 at the instant of deployment completion. The intersection angle $\alpha 0$ is made smaller than that $\alpha 1$ between the lower edge portion 54 and the vertical edge portion 55 at the instant of deployment completion. Moreover, the length L0 is length of the flatly expanded oblique side 53 at the non-deployment-time and is shorter than the length L1 of the oblique side 53 corresponding to the arrangement of the upper apex portion 60 and the leading end apex portion 62 at the instant of deployment completion.

As shown in FIGS. 20 and 21, the shielding member 51 is folded and housed in the inverted L-shape across an intersection corner C at which the vertical edge portion VW and the lower edge portion DW of the peripheral edge of the window WF intersect. Specifically, the shielding member 51 is folded and housed between the rear vertical edge portion 25 of the door frame 22 and the rear vertical edge portion 34 of the door frame garnish 31 and between the lower edge portion 26 of the door frame 22 and the lower edge portion 35 of the door frame garnish 31.

In the shielding member 51 of the third embodiment, moreover, the upper apex portion 60 in the generally triangular shielding member 51 on the side of the upper end 53a of the oblique side 53 and the lower apex portion 61 at the intersection between the lower edge portion 54 and the vertical edge portion 55 are fixed on the rear vertical edge portion 25 of the door frame 22 in the vertical edge portion VW, and the leading end apex portion 62 or the side of the lower end 53b of the oblique side 53 is connected to the tension member 94 of the pretensioner 92. The upper/lower apex portions 60/61 are individually provided with the mounting holes 60a/61a, as shown in FIG. 24. Moreover, the upper/lower apex portions 60/61 are fixed on the door frame 22 by inserting the retaining pins 40 buried in the garnish 31 arranged on the inner side of the door frame 22 into the mounting holes 60a/61a and by retaining and fixing the same pins in the mounting holes 25a/25b formed in the upper/lower portions of the rear vertical edge portion 25 of the door frame 22. The leading end apex portion 62 is connected to the leading end 94a of the tension member 94 of the pretensioner 92.

Figure 27:
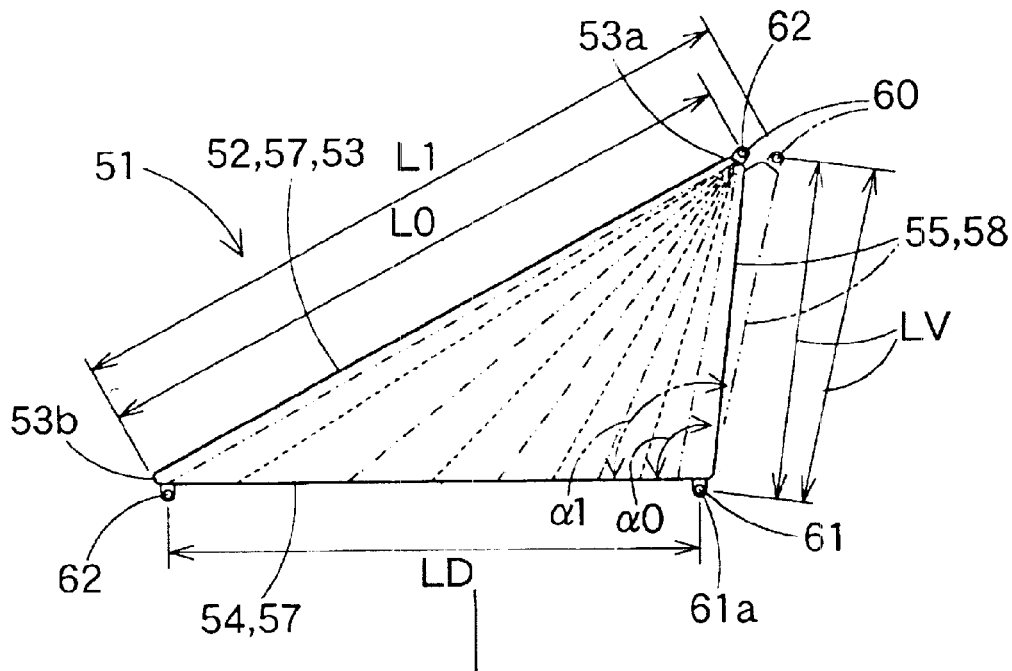
FIGS. 27A–27C illustrate the folding steps of the shielding member of the third embodiment.
Figure 27:
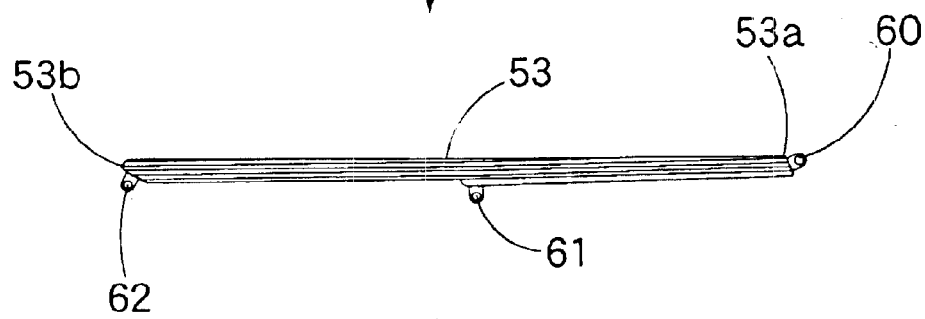
Figure 27:
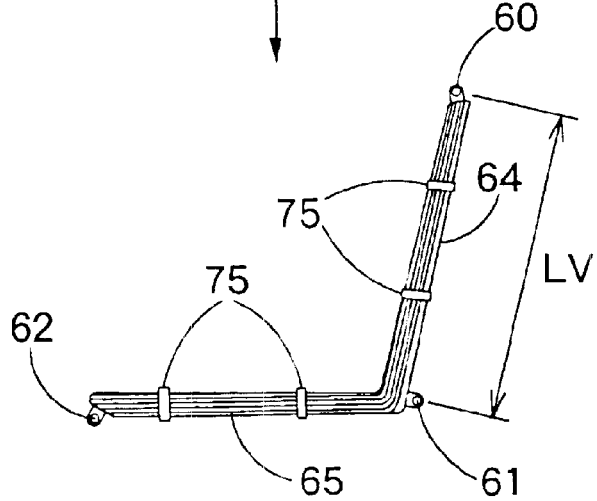

On the other hand, the shielding member 51 is so folded from the flatly expanded state before housed, as shown in FIG. 27, that the oblique side 53 may approach the vertical edge portion 55 while making the folding width larger on the lower edge side than on the upper side thereby to leave the distance of the vertical edge portion 55 to be fixed on the peripheral edge of the window WF, i.e. the distance LV between the upper apex portion 60 of the upper end 53a of the oblique side 53 and the lower apex portion 61 near the intersection corner C unchanged. In the case of the third embodiment, the shielding member 51 in the flatly expanded state is folded in such a folding-fan shape that is centered on its upper apex portion 60 and have a larger folding width on the side of the lower edge portion 54 than on the side of the upper apex portion 60.

The pretensioner 92 as the deployment mechanism 80 of the shielding member 51 is constructed to include the body 93 as the drive source 81, and the tension member 94 as the connection means 86 to be connected to the shielding member 51. The body 93 is enabled to tense the flexible tension member 94 instantly by using gas pressure of the inflator, an electric motor, the restoring force of a spring, an electromagnetic solenoid and so on. In the case of the third embodiment, the pretensioner 92 connects the leading end 94a of the tension member 94 to the leading end apex portion 62 on the lower end side in the oblique side 53 of the shielding member 51 and sets the direction K (as referred to FIG. 21) to deployed the shielding member 51 folded and housed, forward along the lower edge portion DW in the peripheral edge of the window WF. Moreover, this pretensioner 92 is mounted in advance together with the shielding member 51 on the outer side face of the garnish 31 of the door FD.

The airbag 104 is formed into a bag shape which is inflated when fed with the inflating gas from the inflator 112, as shown in FIGS. 20, 23 and 26. In the case of the third embodiment, the airbag 104 is formed generally into a rectangular sheet. The airbag 104 is constructed to include: the body portion 105 to be inflated when fed with the inflating gas; and the cylindrical gas inlet port 106 for feeding the inflating gas into the body portion 105. The gas inlet port 106 is arranged on the upper rear side of the body portion 105 and is connected to the inflator 112. On the upper end side of the airbag 104, there are arranged a plurality of mounting portions 107. These mounting portions 107 are fixed at the roof side rail portion RR on the inner panel 2 on the side of the body 1. The mounting bracket 108 is fixed on each mounting portion 107, as shown in FIG. 23. The mounting portion 107 is fixed together with the mounting bracket 108 by means of bolts 109.

Moreover, the airbag 104 is fixed only at the upper end 105a of the body portion 105 on the inner panel 2, when expanded/inflated, by using the mounting portion 107. Therefore, the airbag 104 is so arranged that the side of the body portion lower end 105b at the time of the expansion/inflation is allowed to act as the free end, i.e., to swing toward the inner side I or the outer side O generally normal to the window WF.

Moreover, the airbag 104 is folded in the bellow shape from the lower end 105b to the upper end 105a and is housed while being covered with the roof head lining 16 on the inner side of the roof side rail portion RR corresponding to the upper edge portion UW of the peripheral edge of the window WF. The roof head lining 16 is made of a synthetic resin and is provided at its lower edge with a door portion 16a which can be opened to the inner side. At the time of the expansion/inflation, moreover, the airbag 104 pushes and opens the door portion 16a and protrudes downward to take a position between the occupant and the shielding member 51.

At the time of the expansion/inflation, the airbag 104 covers the rear inner side of the window WF, the upper side of a center pillar garnish 17 on the inner side of the center pillar portion CP and the front inner side of the window WR of the rear door RD.

In the case of the third embodiment, moreover, the airbag 104 is so arranged that the substantially entire length of the lower end 105b excepting the pillar portion CP at the time of completion of the expansion/inflation and in the non-restraining state horizontally overlaps the shielding member 51 at the deployment completion time (as referred to FIG. 26).

The inflator 112 is made into a cylinder type and is mounted on the inner panel 2 of the roof side rail portion RR by means of mounting bolts 114 while being held by a mounting bracket 113.

Here will be described how to mount the occupant restraining device S3 of the third embodiment on the vehicle. First of all, the occupant restraining unit U0 is assembled, as shown in FIGS. 21 and 25. The occupant restraining unit U0 is constructed to include the shielding member 51, the garnish 31 and the pretensioner 92, and improves the assembling workability of these members on the door frame 22 by integrating them.

In the assembling work of the occupant restraining unit U0, the shielding member 51 in the flatly expanded state is folded at first in such a folding-fan shape on its upper apex portion 60 or the upper end 53a of the oblique side 53 that the folded width may be wider on the side of the lower edge portion 54 than on the side of the upper apex portion 60 and the oblique side 53 may be closer to the vertical edge portion 55, as shown in FIGS. 27A and 27B. As shown in FIG. 27C, the shielding member 51 thus folded is wrapped with a plurality of tape members 75 which can be broken to prevent the folding collapse. In this folded state, the folded portion from the upper apex portion 60 to the lower apex portion 61 where the vertical edge portion 55 is positioned provides the vertical edge side housed portion 64 which is to be housed between the rear vertical edge portion 25 of the door frame 22 and the rear vertical edge portion 34 of the door frame garnish 31. The folded portion from the lower apex portion 61 to the leading end apex portion 62 where the lower edge portion 54 is positioned provides the lower edge side housed portion 65 which is to be housed between the lower edge portion 26 of the door frame 22 and the lower edge portion 35 of the door frame garnish 31. Moreover, the pretensioner 92 is mounted on the outer side face of the garnish 31. Here, the leading end apex portion 62 is so exposed at the leading end position as to be easily jointed to the later-described tension member leading end 94a of the pretensioner 92 in the completely folded state.

Then, the occupant restraining unit U0 can be assembled by inserting the retaining pins 40 into the mounting holes 60a/61a to mount the upper/lower apex portion 60/61 of the shielding member 51on the outer side of the garnish rear vertical edge portion 34 and by jointing the leading end apex portion 62 of the shielding member 51 to the leading end 94a of the tension member 94 of the pretensioner 92.

After the occupant restraining unit U0 was assembled, the retaining pins 40/40 are mounted in the mounting holes 25a/25b of the door frame 22, and the upper edge portion 32, the front vertical edge portion 33 and the rear vertical edge portion 34 of the garnish 31 are fitted in the upper edge portion 23, the front vertical edge portion 24 and the rear vertical edge portion 25 of the door frame 22. When the garnish 31 is fixed on the door frame, 22 of the door FD by means of bolts or the like at not-shown portions, the occupant restraining unit U0 can be assembled with the door frame 22. When the door trim 49 is then mounted on the lower portion of the door frame lower edge portion 26, the assembly of the door FD can be completed. When this door FD is mounted on the body 1, the shielding member 51 and the pretensioner 92 can be mounted on the vehicle.

Here will be described how to mount the airbag 104 on the vehicle. The airbag 104 is folded on the side of the upper end 105a and is so wrapped with not-shown breakable tape members that it may not be collapsed. Next, the mounting bracket 108 is mounted on the mounting portion 107 of the airbag 104, and the airbag assembly is made by connecting the gas inlet port 106 to the inflator 112 and mounting the mounting bracket 113 on the inflator 112. After this, the mounting brackets 108/113 are mounted on the inner panel 2 by the bolts 109/114, and the roof head lining 16 is mounted on the inner panel 2. Thus, the airbag 104 and the inflator 112 can be mounted on the vehicle. When the shielding member 51, the pretensioner 92, the airbag 104 and the inflator 112 are then mounted on the vehicle, the occupant restraining device S3 can be mounted on the vehicle.

Here, the control device 120 and the rollover sensor 118 are separately mounted at predetermined positions of the vehicle, and not-shown lead wires extending from the pretensioner 92 and the inflator 112 are connected with the control device 120 when the occupant restraining device S3 is mounted on the vehicle.

After the occupant restraining device S3 was mounted on the vehicle, the control device 120 activates the pretensioner 92 when it receives a rollover detection signal predicting a rollover of the vehicle from the rollover sensor 118. Then, the pretensioner 92 pulls the leading end 94a of the tension member 94 to move laterally forward, so that the shielding member 51 has its leading end apex portion 62 move laterally forward from its folded state, as indicated by double-dotted lines in FIGS. 21, 22 and 23 or by solid lines in FIG. 26. Accordingly, the shielding member 51 expands to push and open the door portion 37 of the garnish rear vertical edge portion 34 and to open the portion 43 to be broken of the garnish lower edge portion 35, thereby to shield the window WF.

At this time, the control device 120 receives a rollover detection signal from the rollover sensor 118 and activates the inflator 112 to discharge the inflating gas from the inflator 112. In the airbag 104, the body portion 105 is then inflated with the inflating gas to break the not-shown tape members and to open the door portion 16a of the roof head lining 16 so that the airbag 104 is expanded/inflated downward in the inner side of the shielding member 51 to shield the window WF, as shown in FIG. 26.

In the occupant restraining device S3 of the third embodiment, more specifically, the shielding member 51 shields the window WF in the vehicle's inner side so that the airbag 104 can be interposed between the shielding member 51 and the occupant on the inner side I to shield the window WF thereby to restrain the occupant properly with the shielding member 51 and the airbag 104.

In the occupant restraining device S3 of the third embodiment, moreover, at the deployment time of the shielding member 51, the oblique side 53 as the edge portion 52 to cross the window WF substantially rises from the intersection corner C of the peripheral edge of the window WF so that it may turn clockwise, as viewed from the inner side of the vehicle, on the upper apex portion 60. In short, the oblique side 53 is deployed obliquely upward from the intersection corner C on the lower side of the peripheral edge of the window WF. Even if the occupant leans against the peripheral edge of the window WF on inner side I, therefore, the oblique side 53 raises the occupant from the lower side, and the shielding member 51 is deployed smoothly.

Even if the airbag 104 is arranged on the inner side of the head portion of the occupant close to the window WF, the airbag 104 is so connected at its upper end 105a to the upper edge portion UW of the peripheral edge of the window WF that the lower end 105b may become the free end to swing generally perpendicularly to the window WF. On the other hand, the occupant may leave or approach the window WF while the vehicle is rolling over. When the occupant leaves the window WF, therefore, the airbag 104 swings to the outer side O of the vehicle and easily goes into the space between the occupant and the shielding member 51. If the airbag 104 is then sandwiched between the occupant's head and the shielding member 51, the airbag 104 can restrain the occupant's head properly.

Moreover, the shielding member 51 is provided with the oblique side 53 to cross the window WF obliquely when it is completely deployed. Moreover, the shielding member 51 is shaped to shield the region of the window WF halved by the oblique side 53, i.e., the region below the oblique side 53. In short, the shielding member 51 shields as a small area as possible at the upper side of the window WF. Therefore, the shielding member 51 can shorten the time period from the start of the action to the completion of the deployment. Moreover, the shielding member 51 can reduce the material therefof. Still moreover, it is possible to minimize the entire deployment distance of the shielding member 51. As a result, in the occupant restraining device S3, the output of the pretensioner 92 as the deployment mechanism 80 can also be suppressed to shield the window WF efficiently by the shielding member 51.

Here, the shielding member 51 provided with the oblique side 53 shields a small area of the window WF. However, if the side of the intersection corner C is set on the arranged side of the occupant in the lower edge side of the peripheral edge of the window WF, the shielding member 51 in the deployment completed state can properly protect, or restrain, the occupant.

Therefore, the occupant restraining device S3 of the third embodiment lets off the shielding member 51, when the rollover is detected, to shield the window WF on the inner side I smoothly and efficiently even if the occupant leans against the peripheral edge of the window WF on the inner side I.

In the third embodiment, moreover, the oblique side 53 as the edge portion 52 to cross the window WF is set to have a larger length L1 at the deployment completion than the flat expanded length L0 at the non-deployment. At the action time of the pretensioner 92, therefore, when the leading end apex portion 62 on the side of the lower end 53b of the oblique side 53 connected to the tension member leading end 94a of the pretensioner 92 completes the deployment, the sheet-shaped shielding member 51 has a higher tension to be established in the oblique side 53 and along the oblique side 53 than that to be established in other directions at a portion near the oblique side 53. As a result, the oblique side 53 is hardly loosened even when restraining an occupant by the side of the oblique side 53. Therefore, the restrained occupant moves from the side of the oblique side 53 to be accommodated in the inner region of the oblique side 53 in the shielding member 51. As a result, the occupant is restrained in the region of the shielding member 51 apart from the oblique side 53 without leaving the shielding member 51.

Here, the shielding member 51 of the first embodiment can also attain the working-effects similar to the aforementioned if the oblique side 53 as the edge portion 52 to cross the window WF/WR is set to such a length size as to extend at the deployment completion. In the shielding member 121 of the second embodiment, on the other hand, the oblique side 53 as the edge portion 52 to cross the window WF/WR has a plurality of expansion portions 121b to bulge in a spherical shape at the deployment completion, so that its length becomes shorter than that before the inflating gas comes in. Accordingly, a high tension is established in and along the oblique side 53.

Figure 28:
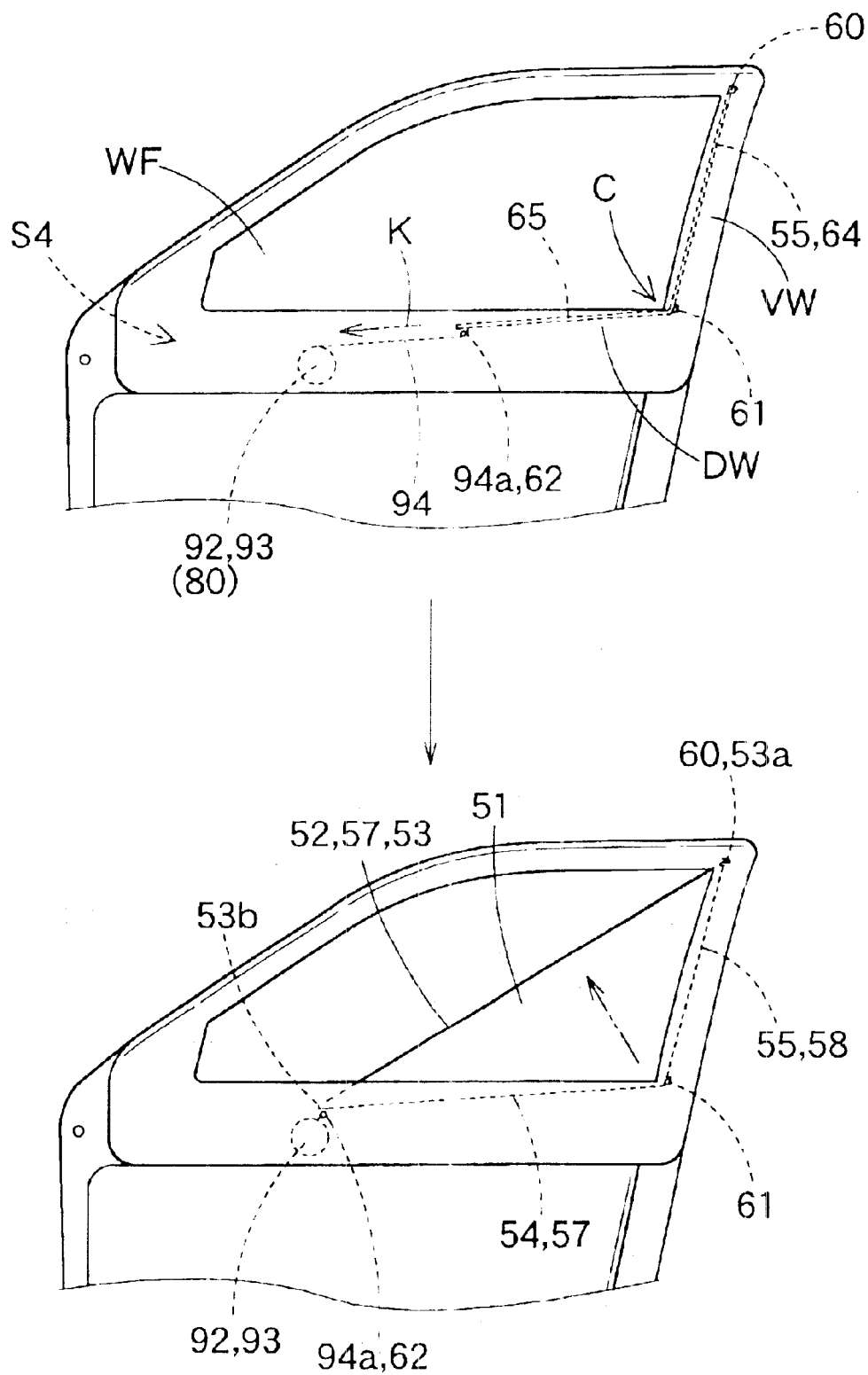
FIG. 28 presents diagrams showing an occupant restraining device of a fourth embodiment.

In case the tension of the oblique side 53 in the shielding member 51 at the deployment completion is to be increased, the construction may be made like a fourth embodiment shown in FIG. 28.

In the occupant restraining device S4 of the fourth embodiment shown in FIG. 28, the direction K to deployed the shielding member 51 of the deployment mechanism 80, i.e., the direction K for the pretensioner 92 to tense the tension member 94 is set generally along the oblique side 53 of the shielding member 51 at the deployment completion. Specifically, the pretensioner 92 of the fourth embodiment is arranged below the position of the pretensioner 92 of the occupant restraining device S3 of the third embodiment. In the fourth embodiment, moreover, the direction K to deploy the leading end apex portion 62 on the side of the lower end 53b of the oblique side 53 is set slightly more forward and downward than the forward direction along the lower edge portion DW of the peripheral edge of the window WF. With this construction, the letting-off force of the pretensioner 92 as the deployment mechanism 80 can be easily applied directly to the oblique side 53. As a result, in the occupant restraining device S4 of the fourth embodiment, a high tension along the oblique side 53 can be established in the oblique side 53.

When the tension of the oblique side 53 of the shielding member 51 is to be increased, moreover, a shielding member 51A may be constructed as in an occupant restraining device S5 of a fifth embodiment, as shown in FIG. 29.

The shielding member 51A of the occupant restraining device S5 of the fifth embodiment is provided with a notched recess 67. This notched recess 67 is formed in the vicinity of the connection portion (i.e., the leading end apex portion on the side of the lower end 53b of the oblique side 53) 62 connected to the tension member leading end 94a of the pretensioner 92 as the deployment mechanism 80 and in the peripheral edge excepting the oblique side 53, i.e., in the lower edge portion 54. Moreover, the recess 67 opens in the peripheral edge on the side of the lower edge portion 54. Like the shielding member 51 of the first embodiment, the shielding member 51A is housed in the peripheral edge DW/VW of the window WF and is connected, at the leading end apex portion 62 on the side of the oblique side lower end 53b, to the leading end 94a of the tension member 94 of the pretensioner 92 as the deployment mechanism 80.

In this fifth embodiment, the length of the lower edge portion 54, as having the notched recess 67 of the shielding member 51A, has a margin corresponding to the length of the inner peripheral edge of the notched recess 67. When the pretensioner 92 acts to complete the deployment of the shielding member 51A, therefore, the lower edge portion 54 generates less tension than the oblique side 53. As a result, the shielding member 51A of the fifth embodiment makes the tension of the oblique side 53 at the deployment completion higher than that of the lower edge portion 54 in the vicinity of the oblique side 53, if the deployment force (or tensile force) or the deployment stroke (or tension stroke) of the pretensioner 92 as the deployment mechanism 80 is adjusted to establish a predetermined tension in the lower edge portion 54. In short, the tension established in and along the oblique side 53 is higher than those in other directions.

Figure 30:
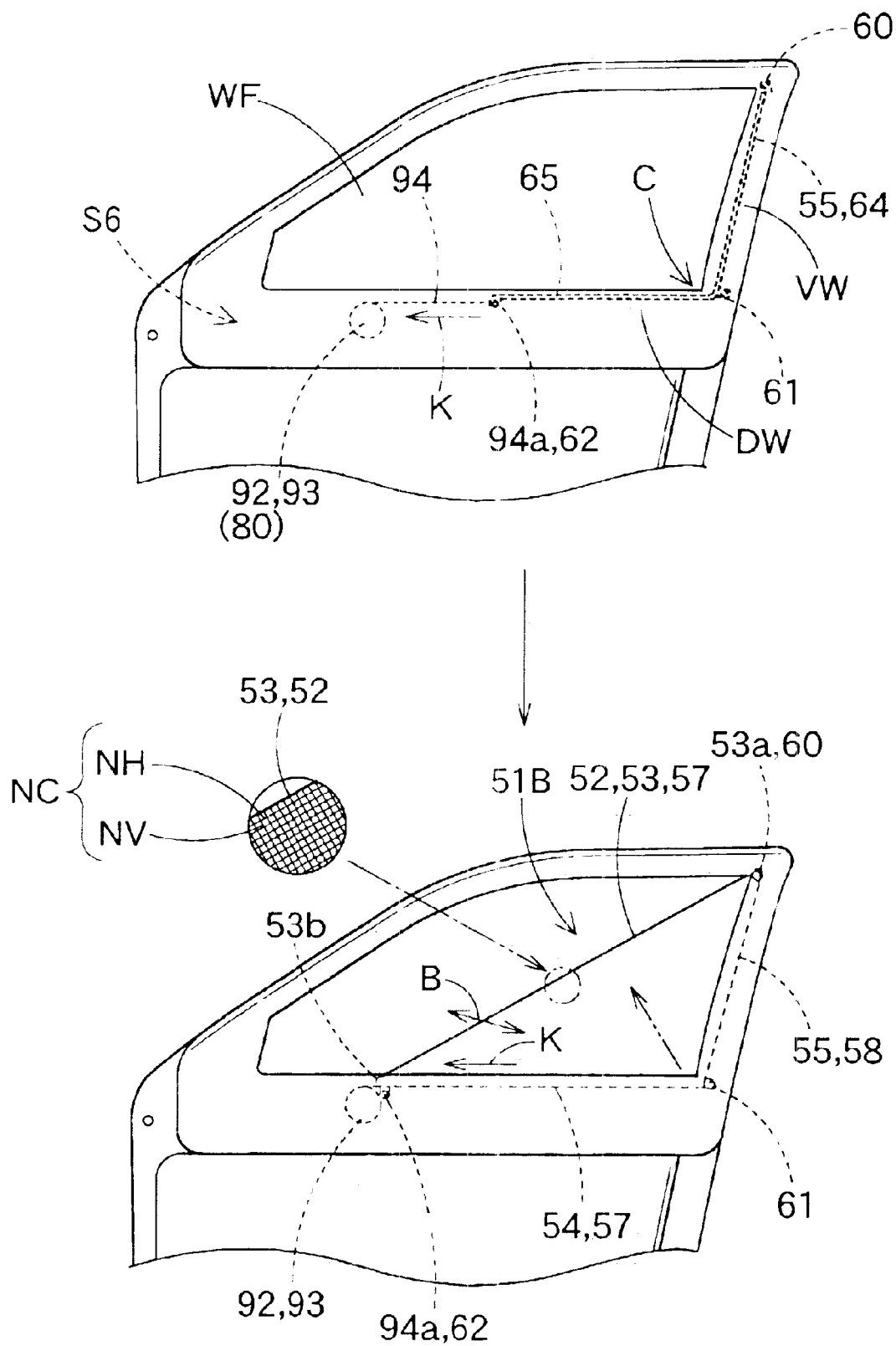
FIG. 30 presents diagrams showing an occupant restraining device of a sixth embodiment.

When the tension of the oblique side of the shielding member is to be increased, still moreover, the construction may be made like an occupant restraining device S6 of a sixth embodiment shown in FIG. 30.

In this occupant restraining device S6, a shielding member 51B is made of a plain-woven fabric NC of warps NV and wefts NH of polyamide, polyester or the like. Moreover, the shielding member 51B is so arranged to have its warps NV or wefts NH in parallel with the oblique side 53 at the deployment completion that the bias direction B of the woven fabric NC at the deployment completion may extend along the release direction K by the pretensioner 92 as the deployment mechanism 80. In short, the shielding member 51B is less extended at the oblique side 53 than in the release direction or the bias direction B of the woven fabric NC. If the deployment force (or tensile force) or the deployment stroke (or tension stroke) of the pretensioner 92 as the deployment mechanism 80 is adjusted to establish a predetermined tension in the lower edge portion 54, therefore, the oblique side 53 is hardly extended at the deployment completion of the shielding member 51B, so that the tension of the oblique side 53 can be made higher than that of the portion such as the lower edge portion 54 in the vicinity of the oblique side 53. In short, the tension established in and along the oblique side 53 is higher than those in other directions.

Figure 31:
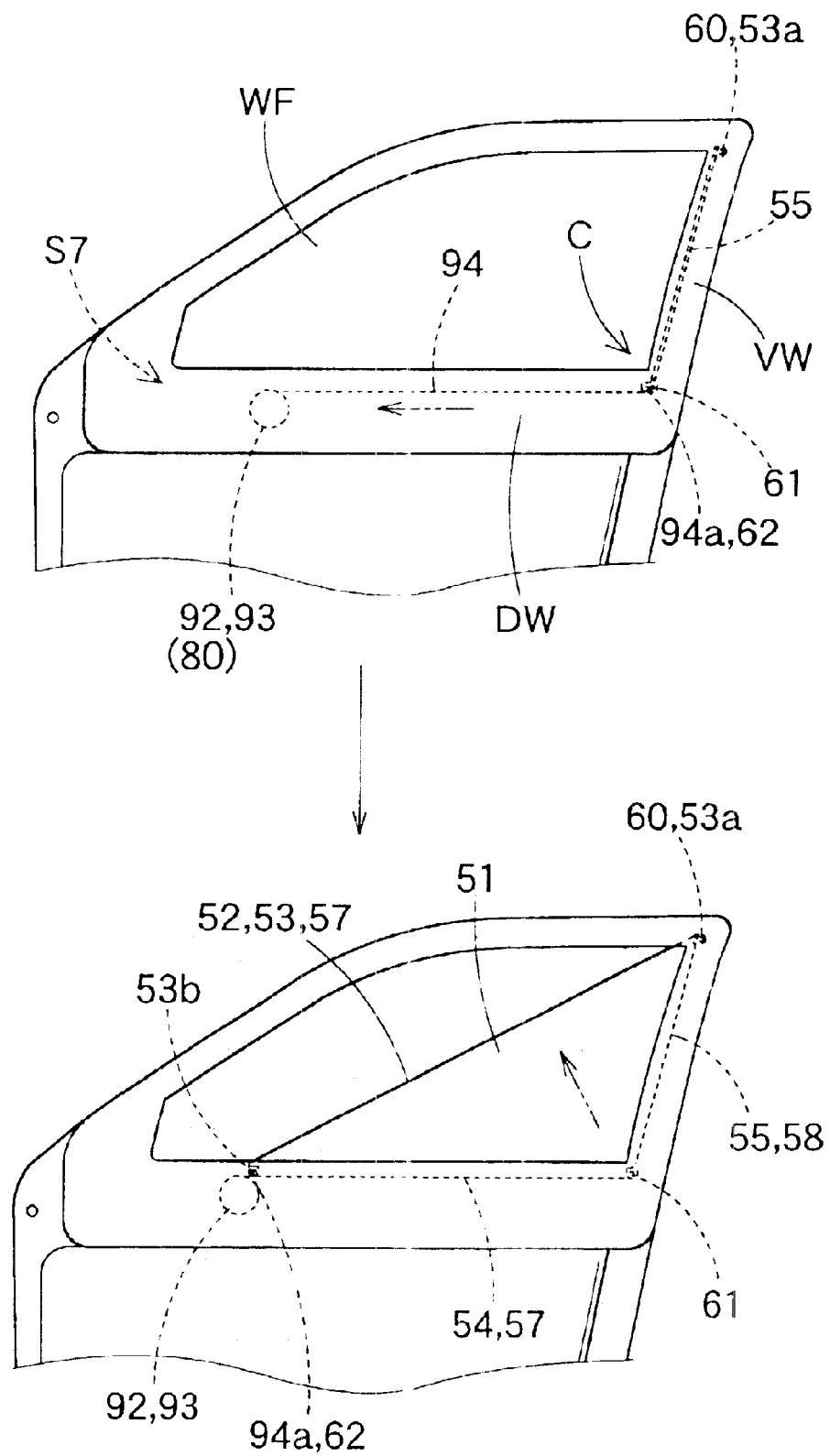
FIG. 31 presents diagrams showing an occupant restraining device of a seventh embodiment.
Figure 32:
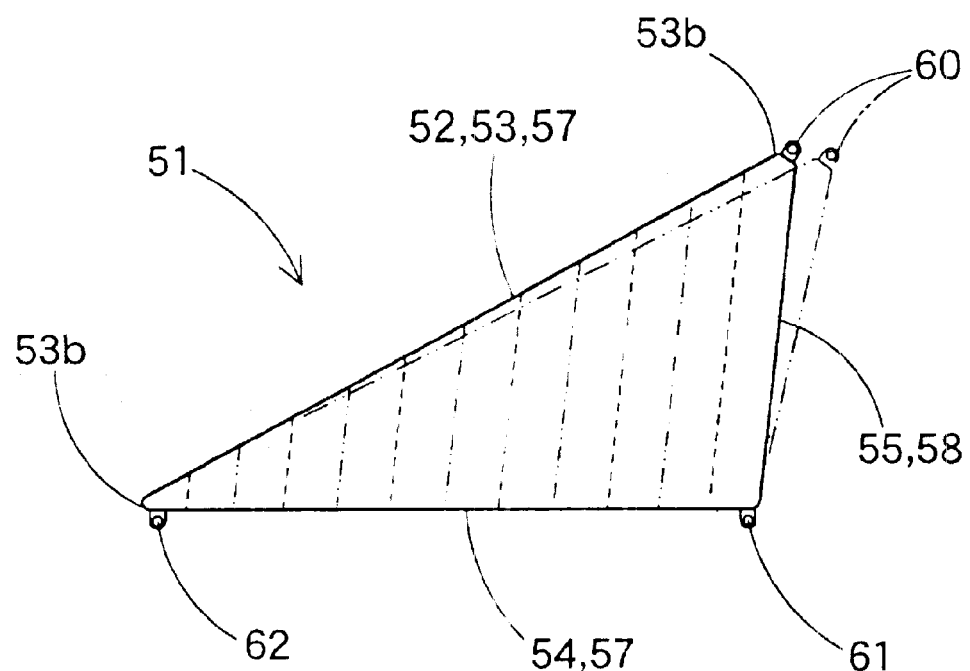
FIGS. 32A–32B illustrate the folding steps of the shielding member of the seventh embodiment.
Figure 32:
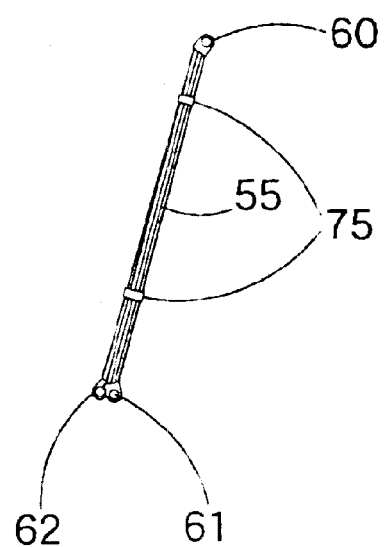
Figure 33:
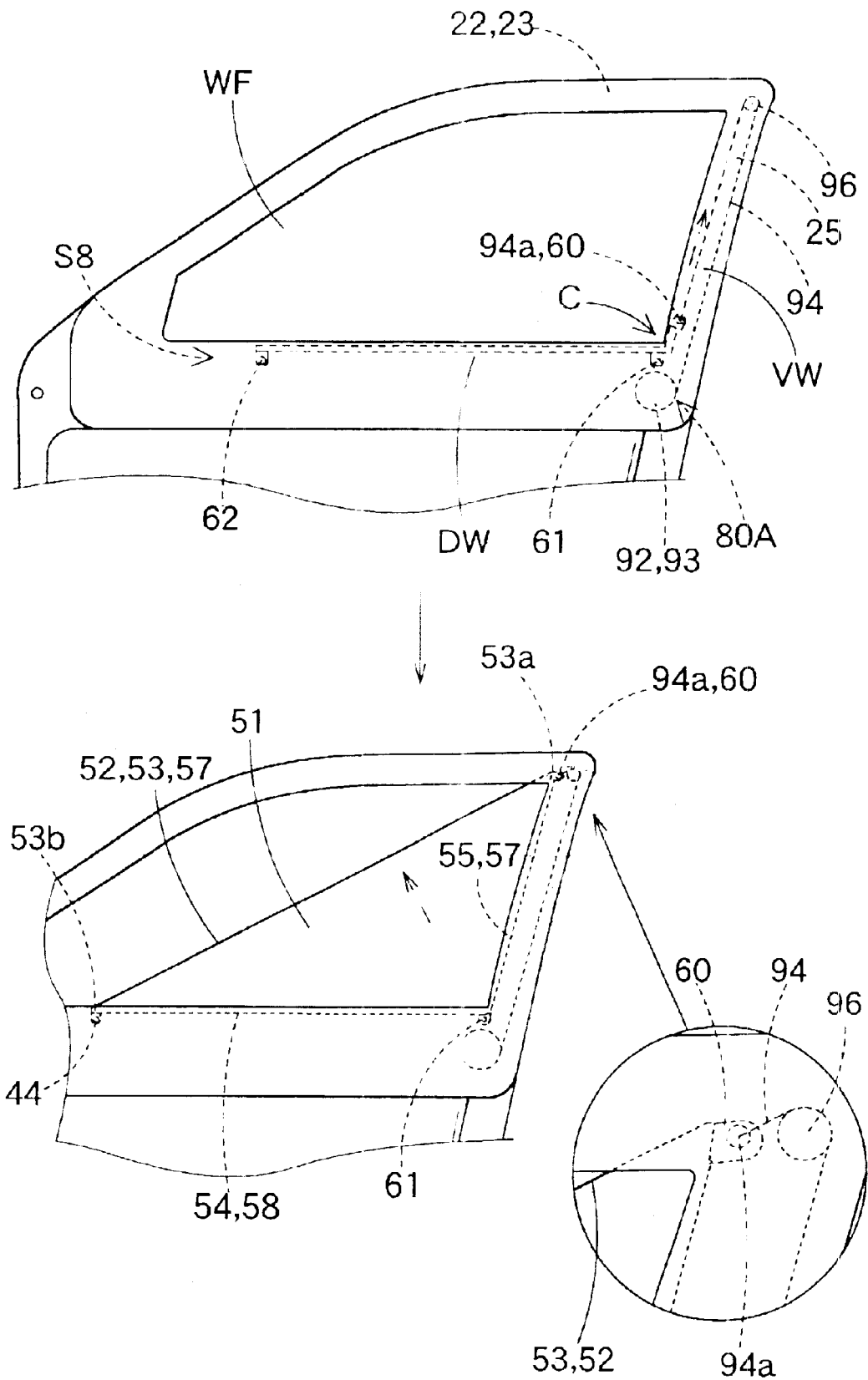
FIG. 33 presents diagrams showing an occupant restraining device of an eighth embodiment.
Figure 34:
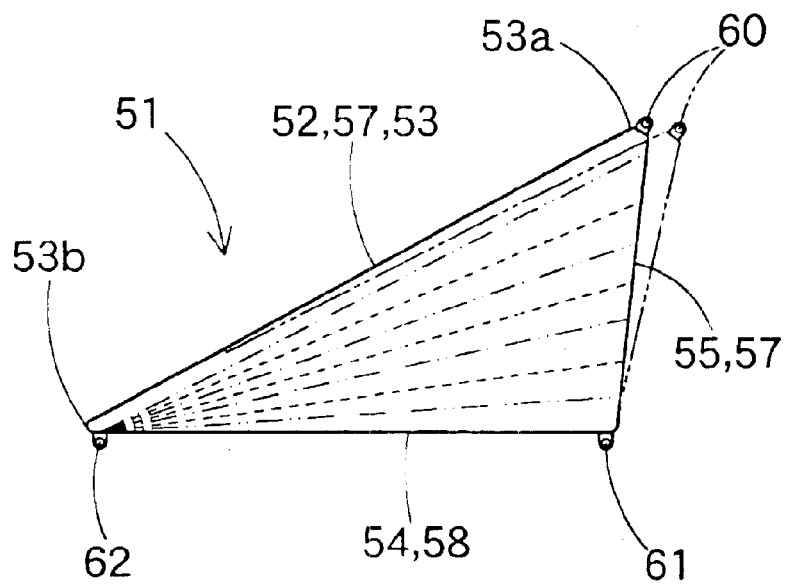
FIGS. 34A–34C illustrate the folding steps of the shielding member of the eighth embodiment.
Figure 34:
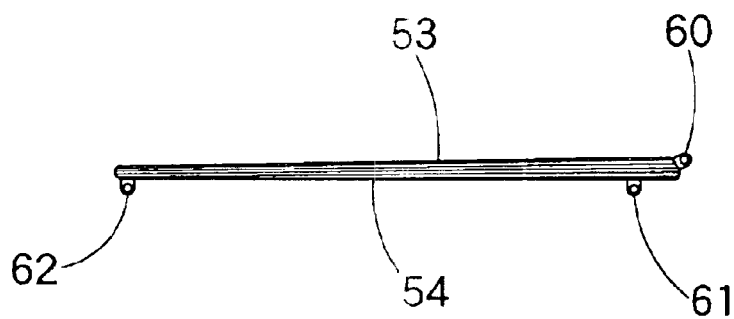
Figure 34:
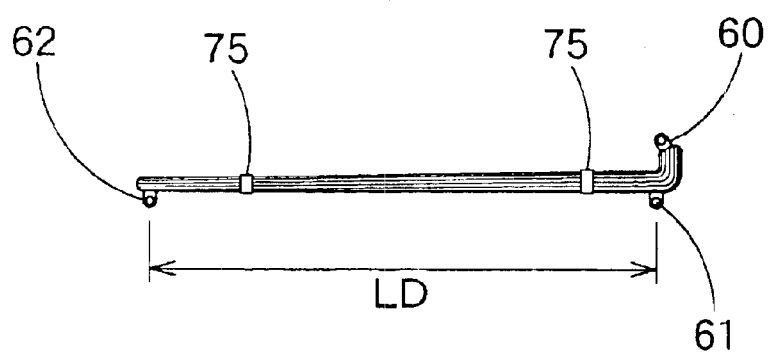

In order to establish a high tension in the oblique side 53 of the shielding member 51, moreover, the construction may be made like an occupant restraining device S7 of a seventh embodiment shown in FIGS. 31 and 32 or an occupant restraining device S8 of an eighth embodiment shown in FIGS. 33 and 34.

The seventh embodiment shown in FIGS. 31 and 32 differs from the third embodiment in the folding manner of the shielding member 51. This shielding member 51 is folded and housed only in the vertical edge portion VW of the window WF. In the folding method of the seventh embodiment, as shown in FIG. 32, the folds along the generally vertical direction generally parallel to the vertical edge portion 55 are made from the state in which the shielding member 51 of the triangular sheet shape is flatly expanded. Moreover, the shielding member 51 is folded in such a bellows shape as to bring the leading side apex portion 62 at the leading end of the side of the lower end 53b of the oblique side 53 to the side of the lower edge portion 54 (i.e., to the side of the lower apex portion 61).

In this folding method of the shielding member 51, too, the pretensioner 92 as the deployment mechanism 80 acts to deployed the leading end apex portion 62 along the lower edge portion DW so that the shielding member 51 completes the deployment. Moreover, the oblique side 53 of the shielding member 51 is set such that the length L1 at the deployment completion is larger than the length L0 at the flat, expanded and non-deployment time. In the oblique side 53, therefore, the tension therealong is higher than those in other directions.

The eighth embodiment shown in FIGS. 33 and 34 differs from the third embodiment in the folding manner of the shielding member 51. The eighth embodiment further differs from the third embodiment in the release direction of the shielding member 51 from the housed state. In this folding manner of the eighth embodiment, as shown in FIG. 34, the shielding member 51 in the triangular sheet shape is folded from the flatly expanded state in such a folding-fan shape on the leading end apex portion 62 on the side of the lower end 53b of the oblique side 53 that the side of the vertical edge portion 55 has a larger folding width than the side of the leading end apex portion 62. The deployment mechanism 80A is constructed to include the pretensioner 92 similar to that of the third embodiment for tensing the tension member 94, and a rotatable roller 96 for winding the tension member 94 thereon. The tension member 94 protrudes from the body 93 of the pretensioner 92 and is wound on the upper outer circumference of the roller 96. Moreover, the leading end 94a of the tension member 94 is connected to the upper apex portion 60 of the upper end 53a of the oblique side 53 of the shielding member 51 folded. Moreover, the roller 96 is rotatably mounted near the intersecting portion between the upper edge portion 23 and the rear vertical edge portion 25 of the door frame 22. Still moreover, the roller 96 is arranged such that the portion from the leading end 94a of the tension member 94 to the roller 96 may be generally parallel to the oblique side 53 at the deployment completion of the shielding member 51.

In this occupant restraining device S8 of the eighth embodiment, the tension member 94 is tensed by the activated pretensioner 92 so that the shielding member 51 in the folded state raises the upper apex portion 60 along the vertical edge portion VW thereby complete the deployment action. At the deployment completion, moreover, the portion from the leading end 94a of the tension member 94 to the roller 96 becomes generally parallel to the oblique side 53 to tense the oblique side 53 directly along the oblique side 53. Therefore, the tension in the oblique side 53 can be made higher than that of the portion such as the lower edge portion 54 near the oblique side 53. In short, in the oblique side 53, the tension in the direction along the oblique side 53 is higher than those in other directions.

Figure 35:
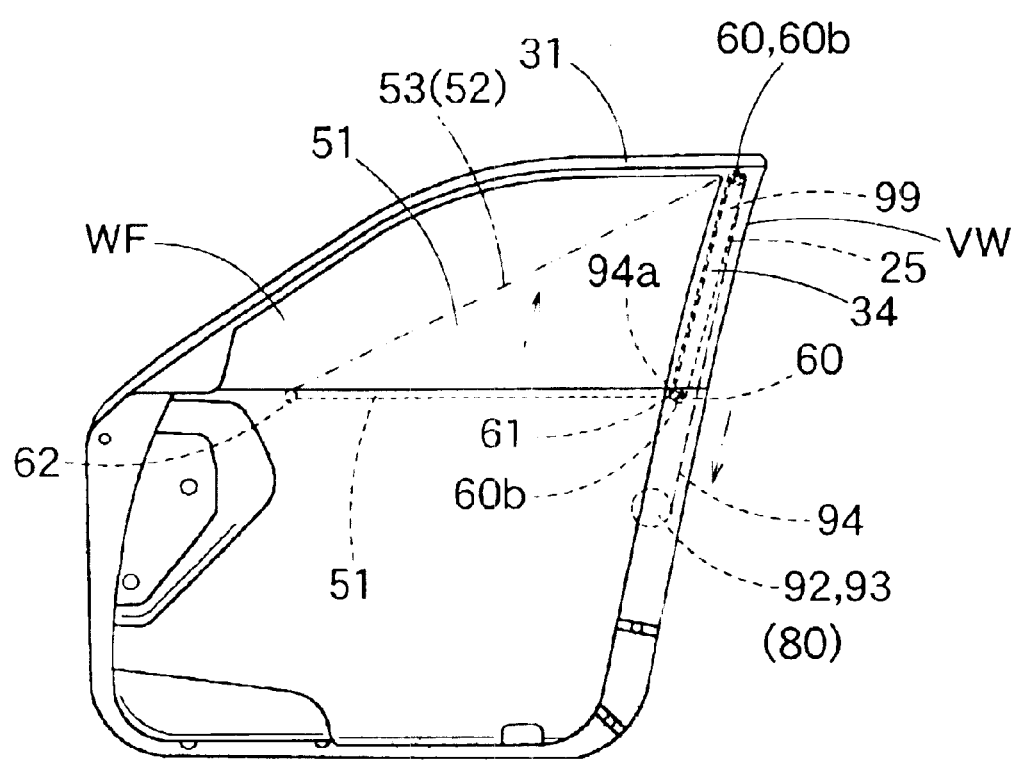
FIG. 35 is a diagram showing a modification of the eighth embodiment.

In case the shielding member is to be deployed by raising the leading end 94a of the tension member 94 in the pretensioner 92 along the vertical edge portion VW, a guide rail may be used as the guide means for stabilizing the upward moving track of the leading end 94a. As shown in FIG. 35, more specifically, a guide rail 99 along the vertical edge portion VW is so fixed on the door frame rear vertical edge portion 25 that it may be covered with the rear vertical edge portion 34 of the garnish 31. The upward movement of the shielding member 51 can be stabilized if the shielding member 51 is provided at its upper apex portion 60 or the like with an engagement portion 60b such as a cam follower to be guided in the moving direction by the guide rail 99.

Here, in case the leading end 94a is laterally moved as in the third embodiment, too, it is arbitrary that the shielding member 51 is provided at its leading end apex portion 62 with an engagement portion 60b or a cam follower and that the lower edge portion DW is provided with a guide rail for guiding the engagement portion 60b.

Figure 36:
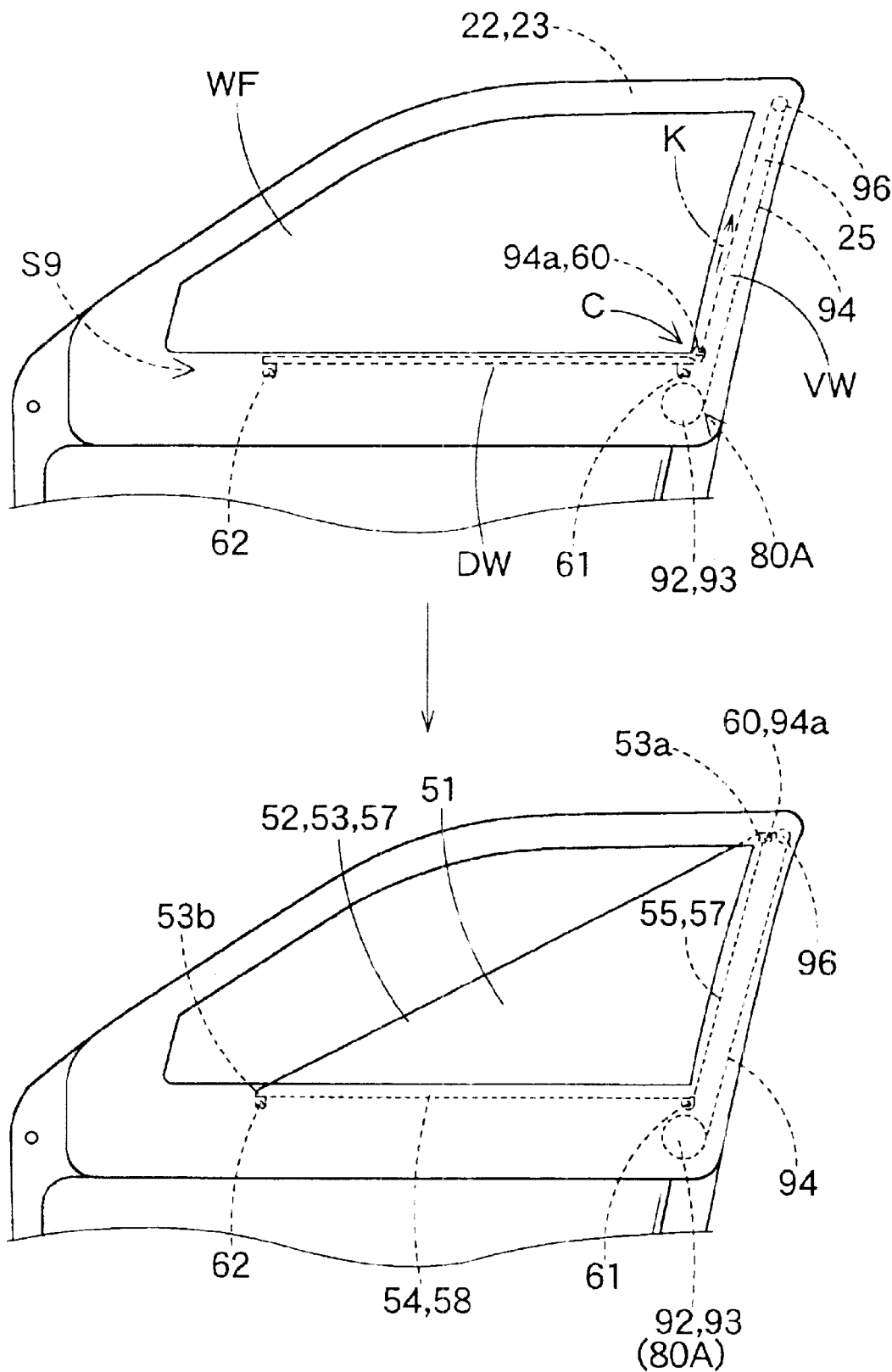
FIG. 36 presents diagrams showing an occupant restraining device of a ninth embodiment.
Figure 37:
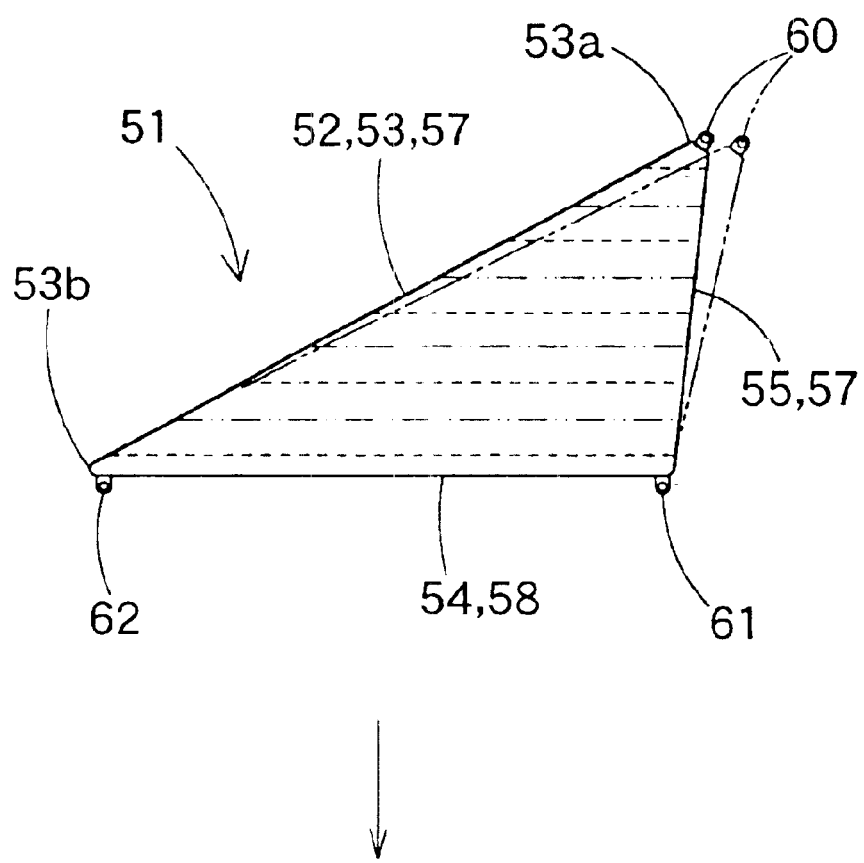
FIGS. 37A–37B illustrate the folding steps of the shielding member of the ninth embodiment.
Figure 37:
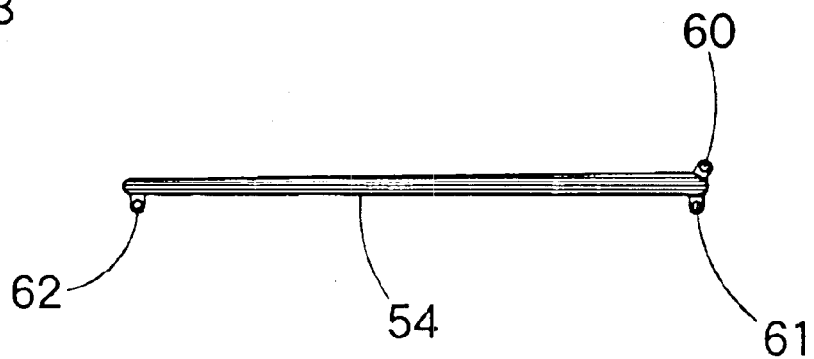

In case the construction is made to deployed the upper apex portion 60 of the shielding member 51 upward, as in an occupant restraining device S9 of a ninth embodiment shown in FIGS. 36 and 37, the shielding member 51 of a triangular sheet shape may be folded from its flatly expanded state in a bellows shape on generally longitudinal folds generally in parallel with the lower edge portion 54. At this time, the upper apex portion 60 on the side of the upper end 53a of the oblique side 53 approaches the side of the lower edge portion 54 (or the side of the lower apex portion 61). Then, the shielding member 51 thus folded may be housed only in the lower edge portion DW of the peripheral edge of the window WF.

In this occupant restraining device S9 of the ninth embodiment, too, at the deployment completion of the shielding member 51, the portion from the leading end 94a of the tension member 94 to the roller 96 becomes generally parallel to the oblique side 53 to tense the oblique side 53 directly along the oblique side 53. Therefore, the tension of the oblique side 53 can be made higher than those of the portions such as the lower edge portion 54 in the vicinity of the oblique side 53.

In comparison with the ninth embodiment, in the occupant restraining device S3 of the third embodiment, the shielding member 51 is housed across the intersection corner C, over the vertical edge portion VW in the peripheral edge of the window WF extending upward from the intersection corner C and the lower edge portion DW in the peripheral edge of the window WF extending from the intersection corner C.

Therefore, as compared with the ninth embodiment, in which the shielding member 51 is housed only in the lower edge portion DW in the peripheral edge of the window WF, or the seventh embodiment in which the shielding member 51 is housed only in the vertical edge portion VW of the window WF, the folded shielding member 51, according to the third embodiment, can be dispersed between the lower edge portion DW and the vertical edge portion VW in the peripheral edge of the window WF. As a result, according to the third embodiment, the shielding member 51 can be easily housed in the door FD which has a limited space in the peripheral edge of the window WF.

Moreover, the third embodiment is constructed such that the folded shielding member 51 is dispersed and housed in the lower edge portion DW and the vertical edge portion VW in the peripheral edge of the window WF. With the release direction K being forward along the lower edge portion DW of the window WF, the pretensioner 92 as the deployment mechanism 80 connects the tension member 94 as the connection means 86 to the leading end apex portion 62 in the lower end 53b of the oblique side 53. Moreover, the leading end apex portion 62 is arranged at the leading end on the side housed in the lower edge portion DW. In the third embodiment, therefore, it is possible to minimize the moving stroke of the leading end apex portion 62 on the side of the oblique side lower end 53b at the deployment time. As a result, according to the third embodiment, the pretensioner 92 as the deployment mechanism 80 can be made simple and compact.

Here, the deployment mechanism 80 for deploying the shielding member 51 may be exemplified not only the pretensioner 92 of the third embodiment but also by an inflator or a cylinder and so on using gas pressure as in the first/second embodiment, such as the type in which a combustion gas is produced by an ignition, a compressed gas is discharged or their mixed type. Then, the leading end apex portion 62 on the side of the oblique side lower end 53b may be connected to the moving connection means of those deployment mechanism 80.

Moreover, the third embodiment is constructed such that the pretensioner 92 (especially, the pretensioner body 93 as the drive source 81) as the deployment mechanism 80 of the shielding member 51 is arranged between the door frame lower edge portion 26 and the garnish lower edge portion 35 in the lower edge portion DW of the peripheral edge of the window WF. As compared with the upper edge portion UW (as referred to FIG. 21) or the generally vertically extending vertical edge portion VW in the peripheral edge of the window WF, more specifically, there is a larger surplus space between the door frame lower edge portion 26 and the garnish lower edge portion 35 in the lower edge portion DW of the peripheral edge of the window WF. Therefore, the deployment mechanism 80 (especially, the pretensioner body 93 as the drive source 81) such as the pretensioner 92 can be easily arranged in the lower edge portion DW.

In the third embodiment, moreover, in order to keep unchanged the distance of the vertical edge portion 55 to be fixed on the peripheral edge of the window WF, i.e., the distance LV between the upper apex portion 60 on the side of the upper end 53a of the oblique side 53 and the lower apex portion 61 in the vicinity of the crossing corner C, the folding width of the shielding member 51 at the lower portion of the oblique side 53 at the time of deployment completion is made so larger on the side of the lower edge portion 54 than on the upper side that the oblique side 53 may approach the vertical edge portion 55to be arranged on the vertical edge portion VW of the peripheral edge of the window WF at the time of deployment completion.

In other words, the shielding member 51 is folded to keep the length of the stationary side edge portion 58 (55) unchanged by using the oblique side 53 and the lower edge portion 54 out of the three edge portions 53/54/55 as a moving side edge portion 57, and by using the remaining edge portion 55 as a stationary side edge portion 58. In the third embodiment, moreover, the shielding member 51 is folded like a folding-fan on the intersection (or the upper apex portion 60) between the oblique side 53 and the stationary side edge portion 55.

On finishing the folding, therefore, the vertical edge portion 55 of the shielding member 51 has its length unchanged so that the upper/lower apex portions 60/61 at the upper/lower ends of the vertical edge portion 55 of the folded shielding member 51 can be mounted as they are on the outer side of garnish rear vertical edge portion 34 in the vertical edge portion VW. As a result, the shielding member 51 can be easily mounted at the predetermined position as folded.

Figure 38:
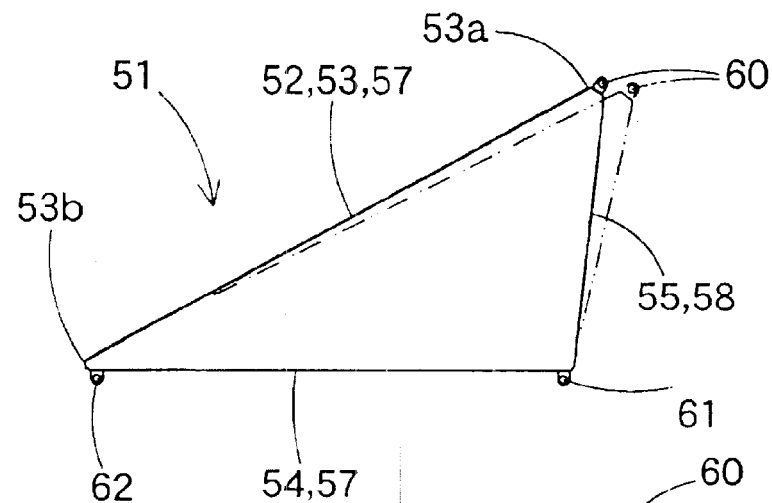
FIGS. 38A–38D illustrate other folding steps of the shielding member of the third embodiment.
Figure 38:
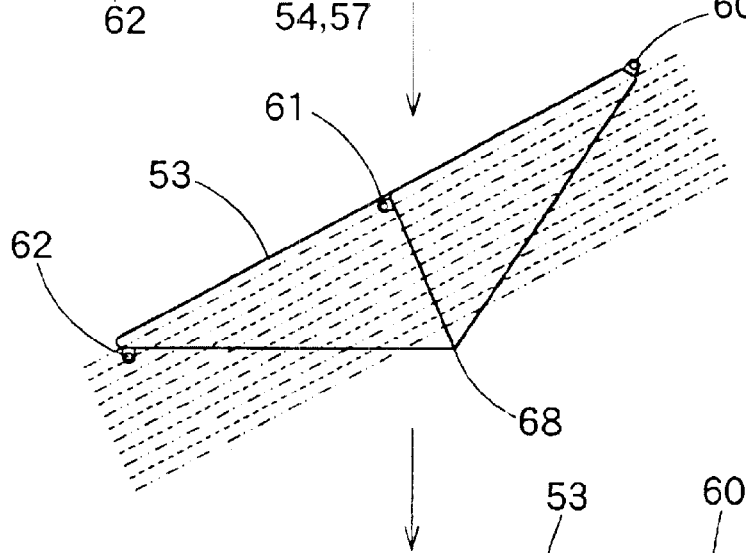
Figure 38:
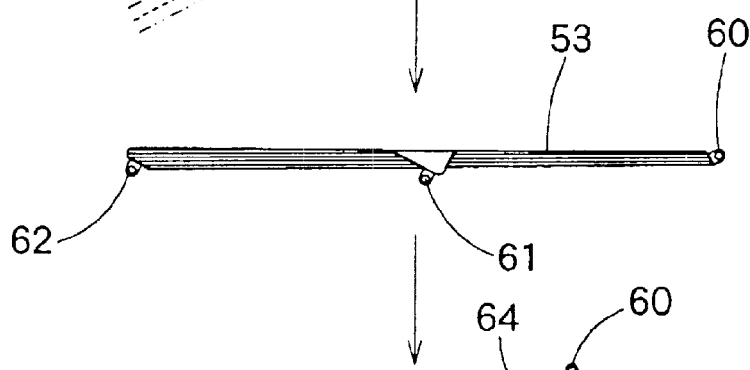
Figure 38:
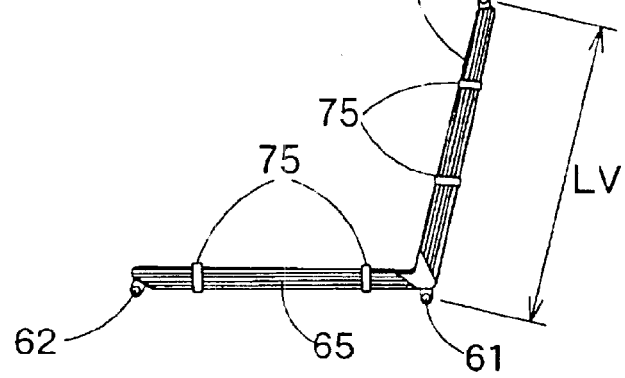

Here, the shielding member 51 may be folded, as shown in FIG. 38, with the distance between the upper/lower apex portions 60/61 unchanged, by using the vertical edge portion 55 as the stationary edge portion 58. For this folding work, the lower apex portion 61 is applied at first to the oblique side 53 while the distance LV between the upper/lower apex portions 60/61 is unchanged, as shown in FIGS. 38A and 38B. Next, the shielding member 51 is then folded in a bellows, as shown in FIGS. 38B and 38C, by forming crest and valley folds parallel to the oblique side 53 so that the folded-back top portion 68 may approach the oblique side 53. After this, the shielding member 51 is folded up and is wrapped with the tape members 75, as shown in FIG. 38D.

By this folding method, as in the third embodiment, the shielding member 51 can be folded without changing the distance LV (i.e., the distance LV of the stationary edge portion 58) between the upper apex portion 60 and the lower apex portion 61 at the completely folded state. Therefore, the shielding member 51 can be easily mounted on the door frame rear vertical edge portion 25 of the vertical edge portion VW.

Figure 39:
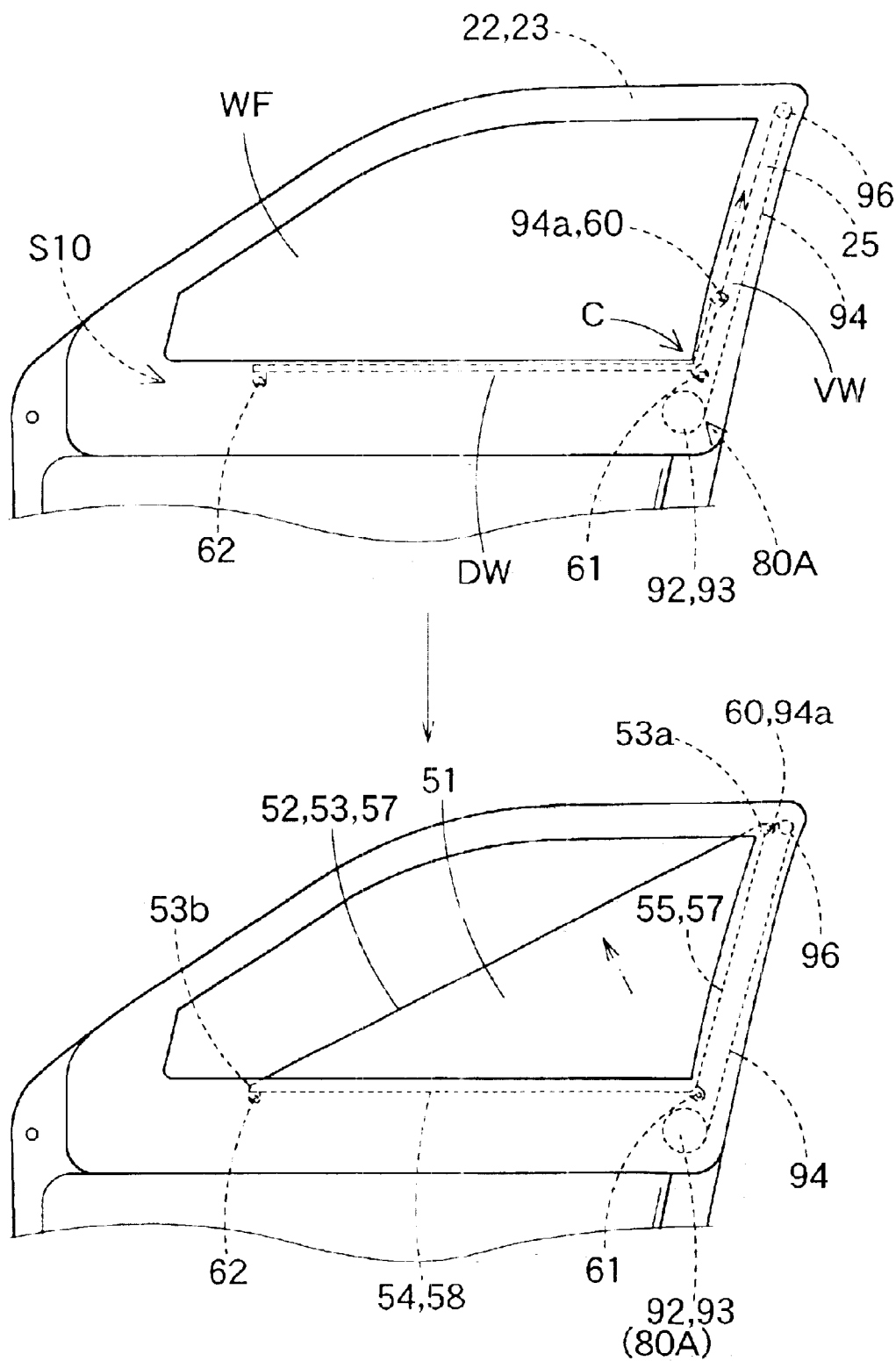
FIG. 39 illustrates an occupant restraining device of a tenth embodiment.
Figure 40:
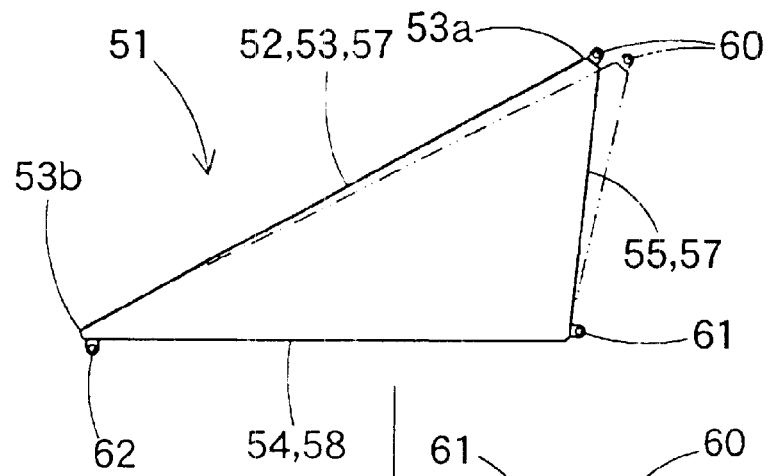
FIGS. 40A–40D illustrate other folding steps of the shielding member of the tenth embodiment.
Figure 40:
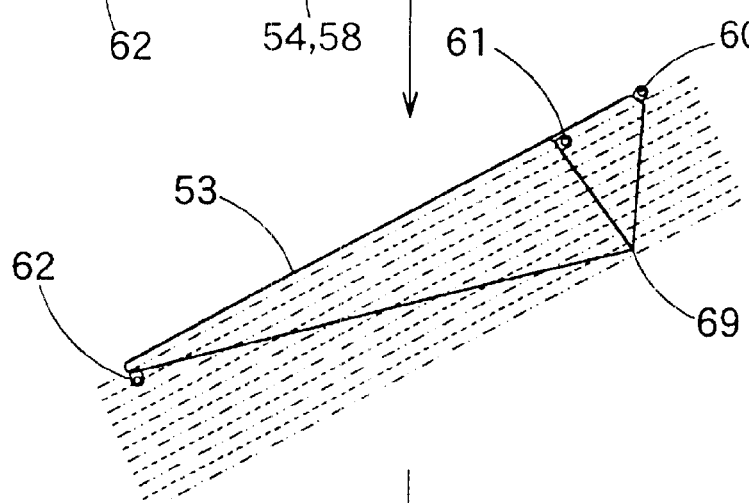
Figure 40:
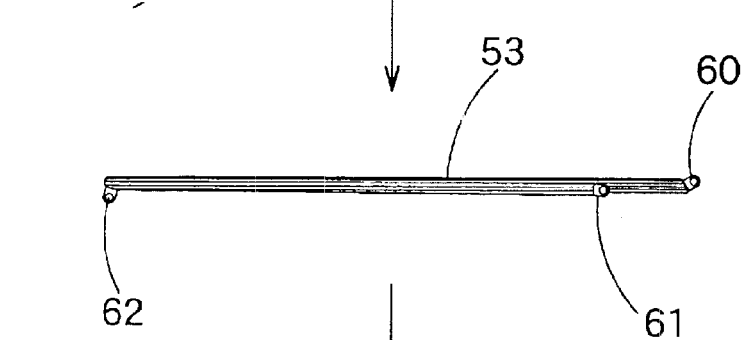
Figure 40:
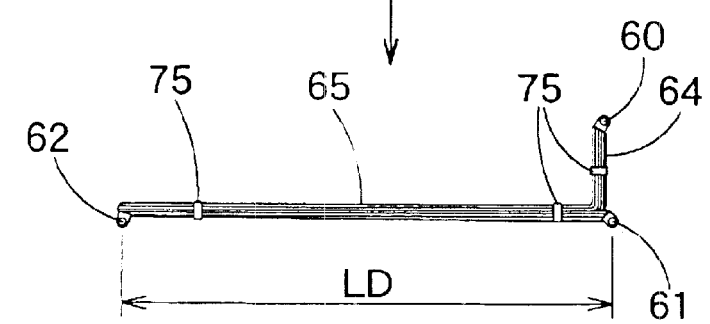

Here, in order to facilitate the mounting work on the peripheral edge of the window WF, the shielding member 51 may be folded, as in the aforementioned occupant restraining device S8 shown in FIGS. 33 and 34 or an occupant restraining device S10 shown in FIGS. 39 and 40, without changing the length of the lower edge portion 54 of the shielding member 51 (i.e., the distance LD between the leading end apex portion 62 and the lower side apex portion 61). Specifically, the shielding member 51 may be folded by using the oblique side 53 and the vertical edge portion 55 out of the three edge portions 53/54/55 as the moving side edge portion 57 and using the remaining one edge portion 54 as the stationary side edge portion 58 thereby to keep the length of the stationary side edge portion 58 (54) unchanged.

In the occupant restraining device S8 of the eighth embodiment, the shielding member 51 of a triangular sheet shape is folded in a folding-fan shape from the flatly expanded state by setting the leading end apex portion 62 (at the intersection between the oblique side 53 and the stationary side edge portion 54) on the side of the lower end 53b of the oblique side 53 as the center of the fan, and by making the folding width larger on the side of the vertical edge portion 55 than on the side of the leading end apex portion 62, while the distance LD (i.e., the distance LD of the stationary side edge portion 54) between the leading end and lower apex portions 62 and 61 is unchanged.

In the occupant restraining device S10 of the tenth embodiment, on the other hand, the lower apex portion 61 is applied at first to the oblique side 53 without changing the distance LD between the leading end and lower apex portions 62/61, as shown in FIGS. 40A and 40B. Then, the shielding member is folded in such a bellows shape with the folds of crests and valleys in parallel with the oblique side 53 that the folded-back top portion 69 may approach the oblique side 53, as shown in FIGS. 40B and 40C. After this, the folded shielding member is wrapped with the tape members 75, as shown in FIG. 40D.

By this folding method, too, the shielding member 51 can be folded without any change in the distance LD (or the distance LD of the stationary side edge portion 54) between the leading end apex portion 62 and the lower apex portion 61 at the time of completion of the folding operations. Therefore, it is easy to mount the shielding member 51 on the door frame lower edge portion 26 of the lower edge portion DW (as referred to FIG. 39).

Here, the tenth embodiment employs the deployment mechanism 80A of the eighth embodiment. Specifically, the tension member 94 of the pretensioner 92 is wound on the roller 96 to connect its leading end 94a to the upper apex portion 62 folded. In the tenth embodiment, as shown in FIG. 39, therefore, at the completion of deployment of the shielding member 51, the tensile force along the oblique side 53 is applied to the oblique side 53 by the tension member 94, so that the high tension is established in the oblique side 53.

Figure 41:
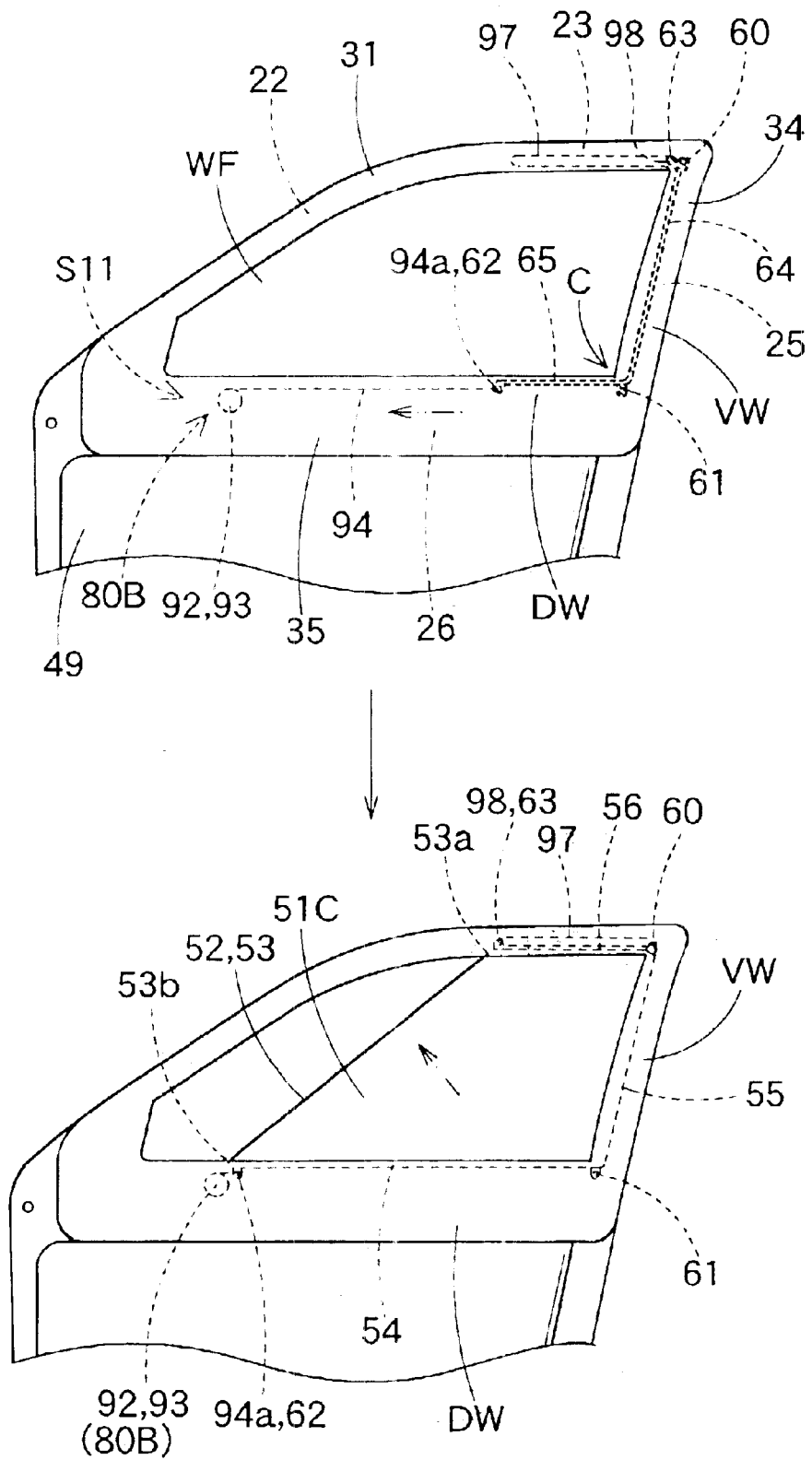
FIG. 41 presents diagrams showing an occupant restraining device of an eleventh embodiment.

On the other hand, the shielding member should not be so limited to the triangular sheet shape having the three apexes as to facilitate the mounting work on the peripheral edge of the window WF. Instead, like an occupant restraining device S11 of an eleventh embodiment shown in FIGS. 41 and 42, it may employ a generally triangular sheet-shaped shielding member SIC which has its upper end side cut to form a rectangular sheet shape.

This shielding member 51C is formed as its completely deployment shape to have the oblique side 53 crossing the window WF as an opening obliquely. Moreover, the shielding member 51C is shaped to shield such one of the regions of the window WF halved by the oblique side 53 as is located on the lower side of the oblique side 53. Specifically, the shielding member 51C has a generally triangular shape including: the oblique side 53; the lower edge portion 54 extending from the lower end 53b of the oblique side 53 to the vertical edge portion VW on the housing side; an upper edge portion 56 extending from the upper end 53a of the oblique side 53 to the vertical edge portion VW on the housing side; and the vertical edge portion 55 along the vertical edge portion VW.

Moreover, the shielding member 51C is constructed such that the oblique side 53 has a larger length at the deployment completion than that at the flat, expanded and non-deployment time, so as to increase the tension in and along the oblique side 53 at the deployment completion.

On the other hand, the shielding member 51C is folded and housed between the rear vertical edge portion 25 of the door frame 22 and the rear vertical edge portion 34 of the door frame garnish 31 in the vertical edge portion VW of the peripheral edge of the window WF, and between the lower edge portion 26 of the door frame 22 in the lower edge portion DW of the peripheral edge of the window WF and the lower edge portion 35 of the door frame garnish 31. In short, the shielding member 51C is folded and housed in such an inverted L-shape as to cross the intersection corner C at which the vertical edge portion VW and the lower edge portion DW intersect.

In the shielding member 51C, moreover, the upper apex portion 60 at the intersection of the vertical edge portion 55 and the upper edge portion 56, and the lower apex portion 61 near the intersection of the vertical edge portion 55 and the lower edge portion 54 are fixed on the rear vertical edge portion 25 of the door frame 22 in the vertical edge portion VW, and the leading end apex portion 62 on the side of the lower end 53b of the oblique side 53 is connected to the leading end 94a of the tension member 94 of the pretensioner 92 acting as deployment mechanism 80B. On an upper leading end apex portion 63 at the intersection of the oblique side 53 and the upper edge portion 56, i.e., on the upper end 53a of the oblique side 53, there is mounted a roller 98 which is slid on and guided by a guide rail 97.

The deployment mechanism 80B of the eleventh embodiment for deploying the shielding member 51C is constructed to include: the pretensioner 92 provided with the tension member 94 similar to that of the third embodiment; the roller 98 mounted on the upper leading end apex portion 63; and the guide rail 97 mounted on the upper edge portion 23 of the door frame 22 for sliding and guiding the roller 98. The guide rail 97 is so arranged on the door frame upper edge portion 23 as to guide the roller 98 from the position of the upper leading end apex portion 63 at the time of folding/housing of the shielding member 51C to the position of the upper leading end apex portion 63 at the time of deployment completion.

Figure 42:
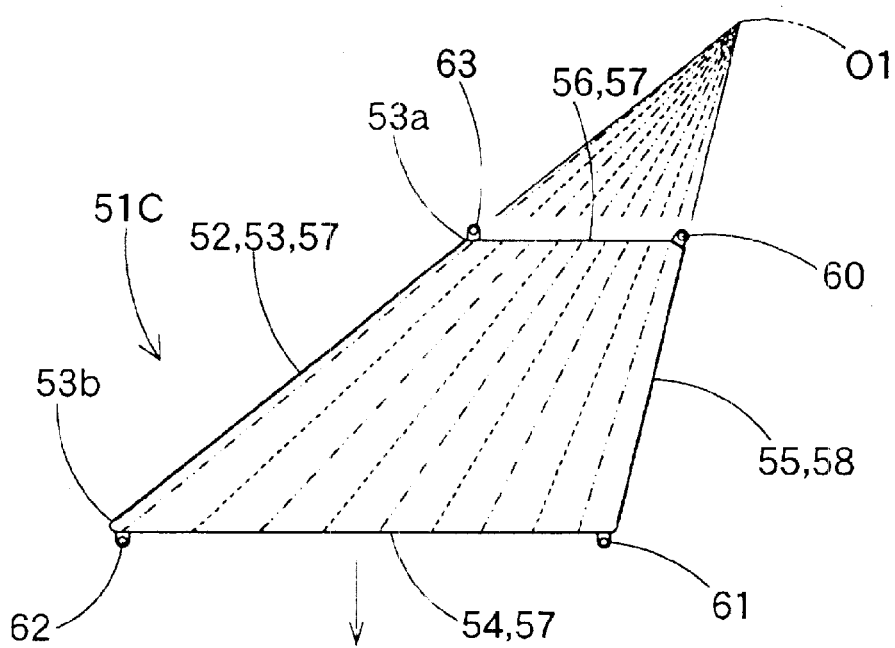
FIGS. 42A–42C illustrate the folding steps of the shielding member of the eleventh embodiment.
Figure 42:
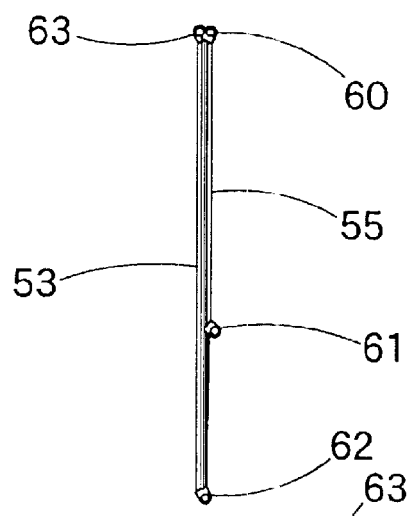
Figure 42:
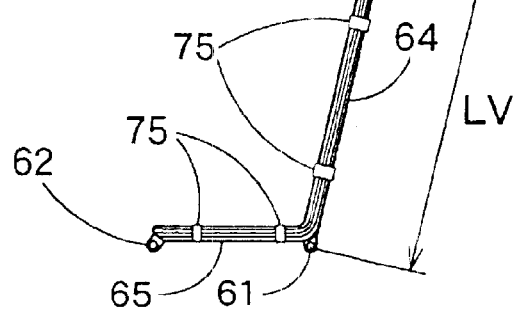

Moreover, the shielding member 51C is folded from the flat and expanded state, when housed, as shown in FIG. 42, such that the distance of the vertical edge portion 55 (or the stationary side edge portion 58) to be fixed on the peripheral edge of the window WF may not be changed. Specifically, the shielding member 51C is folded to bring the side of the oblique side 53 closer to the side of the vertical edge portion 55 by making the folding width larger on the lower edge side than on the upper edge side but with the distance LV between the upper apex portion 60 and the lower apex portion 61 near the intersection corner C being unchanged. In the case of the embodiment, the shielding member 51C is folded in such a folding-fan shape on an intersection 01 between the extension of the oblique side 53 and the extension of the vertical edge portion 55 in the flatly expanded state that the folding width is made wider on the side of the lower edge portion 54 than on the side of the upper edge portion 56. Here, the shielding member 51C thus folded is wrapped with the collapse preventing breakable tape members 75 and is provided with the roller 98 at its upper leading end apex portion 63.

At the time of completion of the folding, the folded portion of the vertical edge portion 55 from the upper apex portion 60 to the lower apex portion 61 is the vertical edge side housed portion 64 which is housed between the rear vertical edge portion 25 of the door frame 22 and the rear vertical edge portion 34 of the door frame garnish 31. The folded portion of the lower edge portion 54 from the lower apex portion 61 to the leading end apex portion 62 is the lower edge side housed portion 65 which is housed between the lower edge portion 26 of the door frame 22 and the lower edge portion 35 of the door frame garnish 31.

Then, the occupant restraining unit is assembled by mounting the pretensioner 92 on the garnish 31 on the outer side face of the vehicle, mounting the folded shielding member 51C on the garnish 31 and by connecting the leading end apex portion 62 of the shielding member 51C to the tension member leading end 94a of the pretensioner 92. When the occupant restraining unit thus assembled is mounted together with the garnish 31 on the door frame 22 while attaching the roller 98 to the guide rail 97, moreover, the occupant restraining unit can be mounted on the door frame 22. When the door trim 49 is then mounted on the lower portion of the door frame lower edge portion 26, the assembly of the door FD can be completed. When the door FD is mounted on the body 1, moreover, the shielding member 51C and the deployment mechanism 80B can be mounted on the vehicle.

In this occupant restraining device S11, too, at the deployment time of the shielding member SIC, the oblique side 53 substantially rises from the intersection corner C of the peripheral edge of the window WF so that it may turn clockwise, as viewed from the inner side of the vehicle, on the upper leading end apex portion 63 to be moved forward while being guided by the guide rail 97 to the deployment completion position. In short, the oblique side 53 as the edge portion 52 to cross the window is deployed obliquely upward from the intersection corner C on the lower side of the peripheral edge of the window WF. Even if an occupant leans against the peripheral edge of the window WF, therefore, the oblique side 53 raises the occupant from the lower side, and the shielding member 51C is deployed smoothly. At the deployment completion, moreover, the high tension is established in the oblique side 53, so that the same working-effects as those of the third embodiment can be attained.

In order to establish higher tension in the oblique side 53 of the shielding member 51C than in the vicinity thereof, the construction may be made, as in the fourth to sixth embodiments, by shifting the position of the pretensioner 92 of the deployment mechanism 80B downward, by forming a notched recess in the lower edge portion 54 of the shielding member 51C, or by making the shielding member 51C of woven fabric to arrange the warps or wefts along the oblique side 53.

Figure 44:
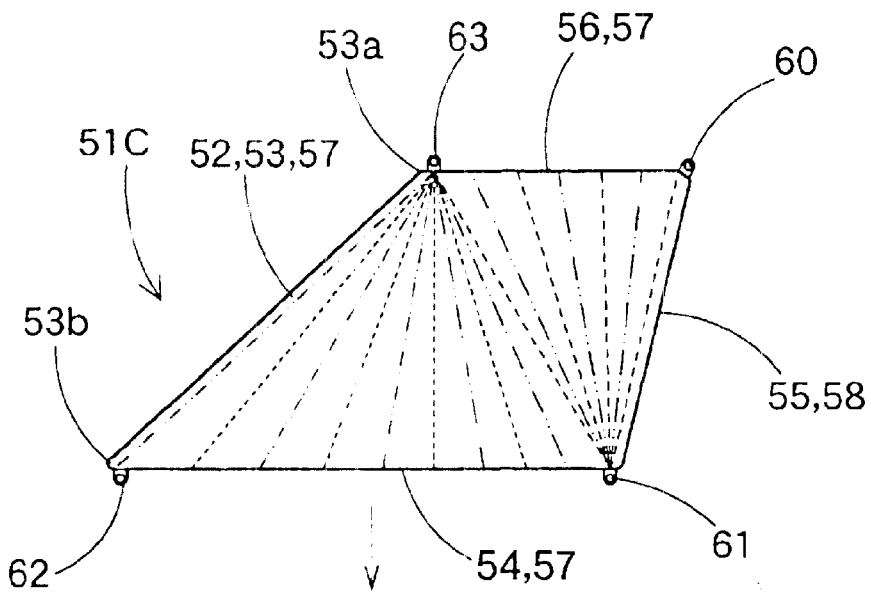
FIGS. 44A–44C illustrate the folding steps of the shielding member of the twelfth embodiment.
Figure 44:
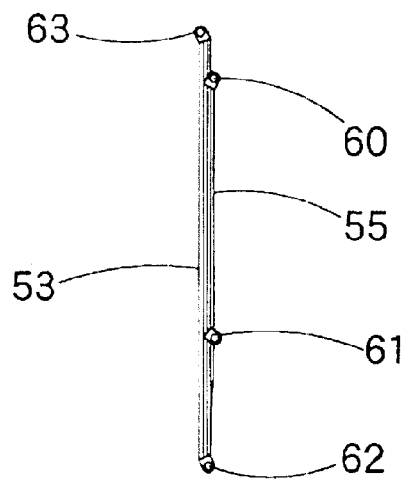
Figure 44:
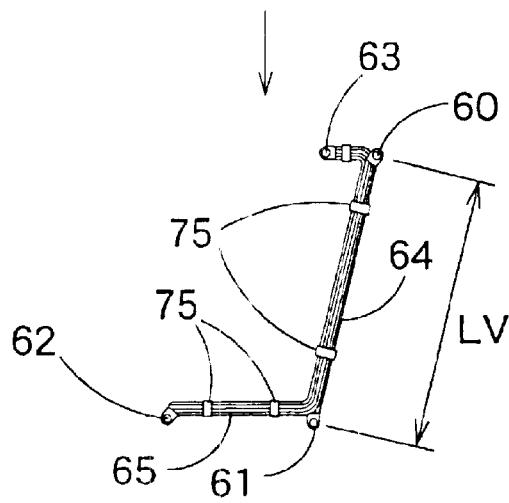

In case of employing the shielding member SIC having a generally triangular shape similar to a trapezoidal shape, on the other hand, the shielding member 51C may be folded and housed as in an occupant restraining device S12 of an twelfth embodiment shown in FIGS. 43 and 44.

In this twelfth embodiment, the shielding member SIC is dispersed and housed, too, in the upper edge portion UW extending from the upper end of the vertical edge portion VW of the window WF. In this case, the shielding member 51C is at first folded, as shown in FIGS. 44A, 44B and 44C, such that the upper leading end apex portion 63 is located on the center of a folding-fan for the region below the oblique side 53 to make the folding width on the side of the lower edge portion 54 larger than that on the side of the upper leading end apex portion 63 thereby to bring the leading end apex portion 62 closer to the lower apex portion 61. Moreover, with respect to the region from the straight line joining the upper leading end apex portion 63 and the lower apex portion 61 to the side of the vertical edge portion 55, the shielding member 51C is folded in such a fan shape on the lower apex portion 61 while making the folding width of the upper edge portion 56 larger than that of the lower apex portion 61 and bringing the upper leading end apex portion 63 closer to the upper apex portion 60. In this folded state, too, the shielding member 51C can be folded to locate the vertical edge portion 55 as the stationary edge portion 58 without any change in the distance LV between the upper apex portion 60 and the lower apex portion 61 near the intersection corner C. Moreover, the shielding member 51C thus folded can be dispersed in three portions of the lower edge portion DW, the vertical edge portion VW and the upper edge portion UW of the peripheral edge of the window WF.

At the action time of this occupant restraining device S12, like the eleventh embodiment, the pretensioner 92 of the deployment mechanism 80 tenses the tension member 94. At this time, the leading end apex portion 62 moves forward to the position of the deployment completion, and the leading end apex portion 63 moves forward to the position of the deployment completion by the roller's sliding on the guide rail 97 so that the shielding member 51C completes the deployment action. In such a manner that the oblique side 53 turn clockwise, as viewed from the inner side, on the upper leading end apex portion 63 guided to move forward to the position of the deployment completion by the guide rail, therefore, the oblique side 53 substantially rises from the intersection corner C of the peripheral edge of the window WF. Consequently, the oblique side 53 is deployed obliquely upward from the side of the intersection corner C on the lower side of the peripheral edge of the window WF.

Figure 46:
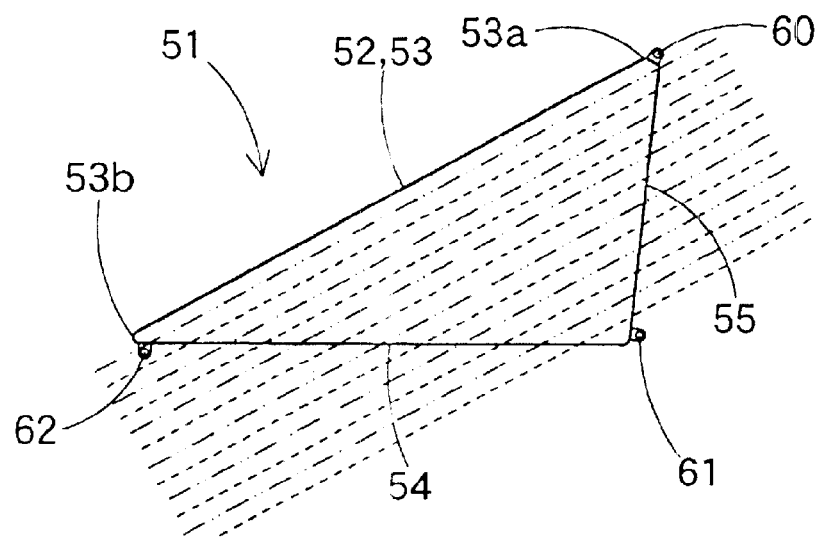
FIGS. 46A–46C illustrate the folding steps of the shielding member of the thirteenth embodiment.
Figure 46:
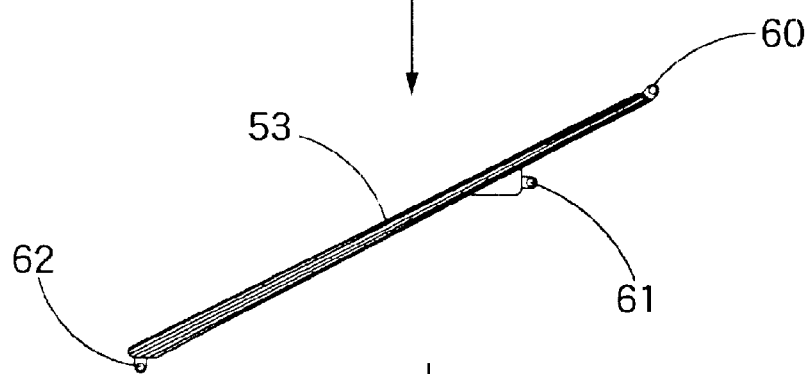
Figure 46:
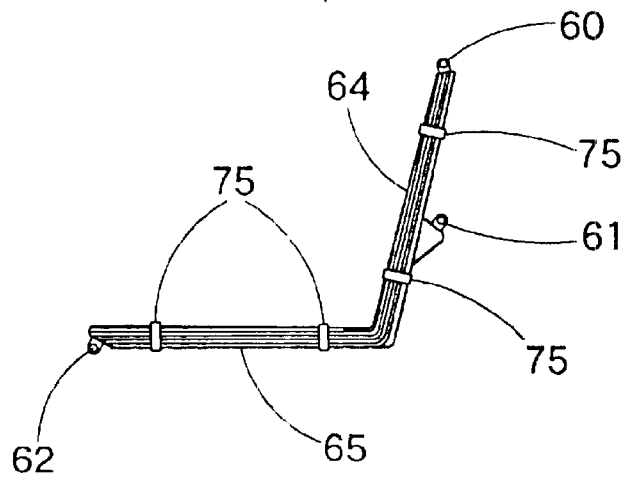

Moreover, the construction for dispersing and housing the shielding member in the lower edge portion DW and the vertical edge portion VW in the peripheral edge of the window WF may be made such that only one of the apex portions in the peripheral edge of the shielding member is fixed at the peripheral edge of the window WF. This construction may be exemplified by an occupant restraining device S13 of a thirteenth embodiment shown in FIGS. 45 and 46.

This occupant restraining device S13 differs from the third embodiment in the folded state of the shielding member 51 of a triangular sheet shape. Moreover, the thirteenth embodiment further has a deployment mechanism 80C different from the third embodiment. This deployment mechanism 80C is provided with not only the pretensioner 92 but also the guide rail 99 and a roller 100. The guide rail 99 is arranged along the vertical edge portion VW in the lower side of the rear vertical edge portion 25 of the door frame 22 on the lower side of the vertical edge portion VW. The roller 100 is so mounted on the lower apex portion 61 of the shielding member 51 as to engage slidably with the guide rail 99. The remaining constructions of the thirteenth embodiment are similar to those of the third embodiment.

The shielding member 51 of this occupant restraining device S13 is folded from flat expanded state, as shown in FIGS. 46A and 46B, in a bellows shape having folds of crests and valleys parallel to the oblique side 53 to bring the lower apex portion 61 to the oblique side 53. Then, the shielding member 51 thus folded is wrapped at predetermined positions with the tape members 75, as shown in FIG. 46C.

The shielding member 51 thus folded is housed in the door FD by fixing the upper apex portion 60 near the upper end of the vertical edge portion VW, bringing the roller 100 attached to the lower apex portion 61 into engagement with the guide rail 99 and connecting the leading end apex portion 62 to the tension member leading end 94a of the pretensioner 92 arranged at the lower edge portion DW. The folded shielding member 51 is thus dispersed in the lower edge portion DW and the vertical edge portion VW.

At the action time of this thirteenth embodiment, the leading end apex portion 62 is pulled to move forward by the tension member 94, and the oblique side 53 rises from the intersection corner C of the peripheral edge of the window WF so that it may be turned clockwise, as viewed from the inner side, on the upper apex portion 60. Specifically, the oblique side 53 as the edge portion 52 to cross the window is deployed obliquely upward from the side of the intersection corner C on the lower side of the peripheral edge of the window WF. Then, the lower apex portion 61 moves downward with the roller 100 connected thereto slid in the guide rail 99 to be arranged at the position of the deployment completion near the intersection of the lower edge portion DW and the vertical edge portion VW.

In this thirteenth embodiment, too, the shielding member 51 can be dispersed and housed. Moreover, the lower side of the oblique side 53 in the shielding member 51 is housed in the lower edge portion DW, and the tension member leading end 94a in the pretensioner 92 of the deployment-mechanism 80C is connected to the leading end apex portion 62 at the front side leading end of the lower edge side housed portion 65. Therefore, it is possible to minimize the moving stroke of the leading end apex portion 62 on the side of the oblique side lower end 53b at the deployment time. As a result, the pretensioner 92 as the deployment mechanism 80C is made to have a simple and compact construction, so that the same working-effects as those of the third embodiment can be attained excepting the mounting feasibility of the vertical edge portion 55.

Here, this construction, in which the roller 100 sliding in the guide rail 99 is arranged at the apex portion of the shielding member to be arranged near the intersection corner C at the completion of deployment and in which another apex portion is fixed at the upper end of the vertical edge portion VW so that the shielding member is folded and housed-across the intersection corner C over the lower edge portion DW and the vertical edge portion VW, can also be applied to the shielding members 51C of the eleventh and twelfth embodiments.

On the other hand, the third to thirteenth embodiments have been described on the case in which the shielding members 51/51A/51B/51C are arranged in the peripheral edge of the window WF of the front door FD. It is, however, natural that the shielding member 51R to be deployed by the deployment mechanism 80 to shield the window WR of the rear door RD may be arranged in the peripheral edge of the window WR.

Figure 47:
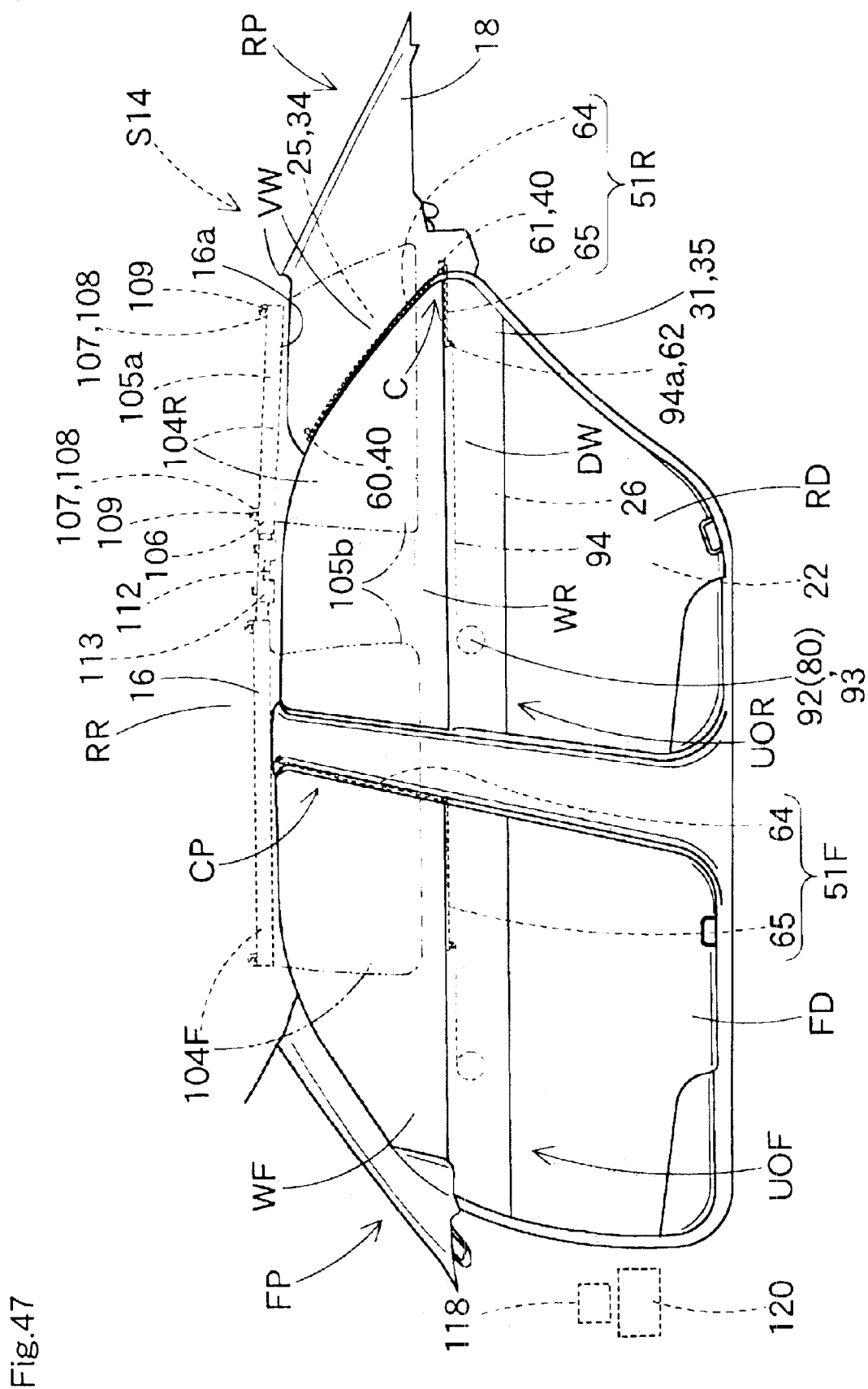
FIG. 47 is a diagram showing an occupant restraining device of a fourteenth embodiment.
Figure 48:
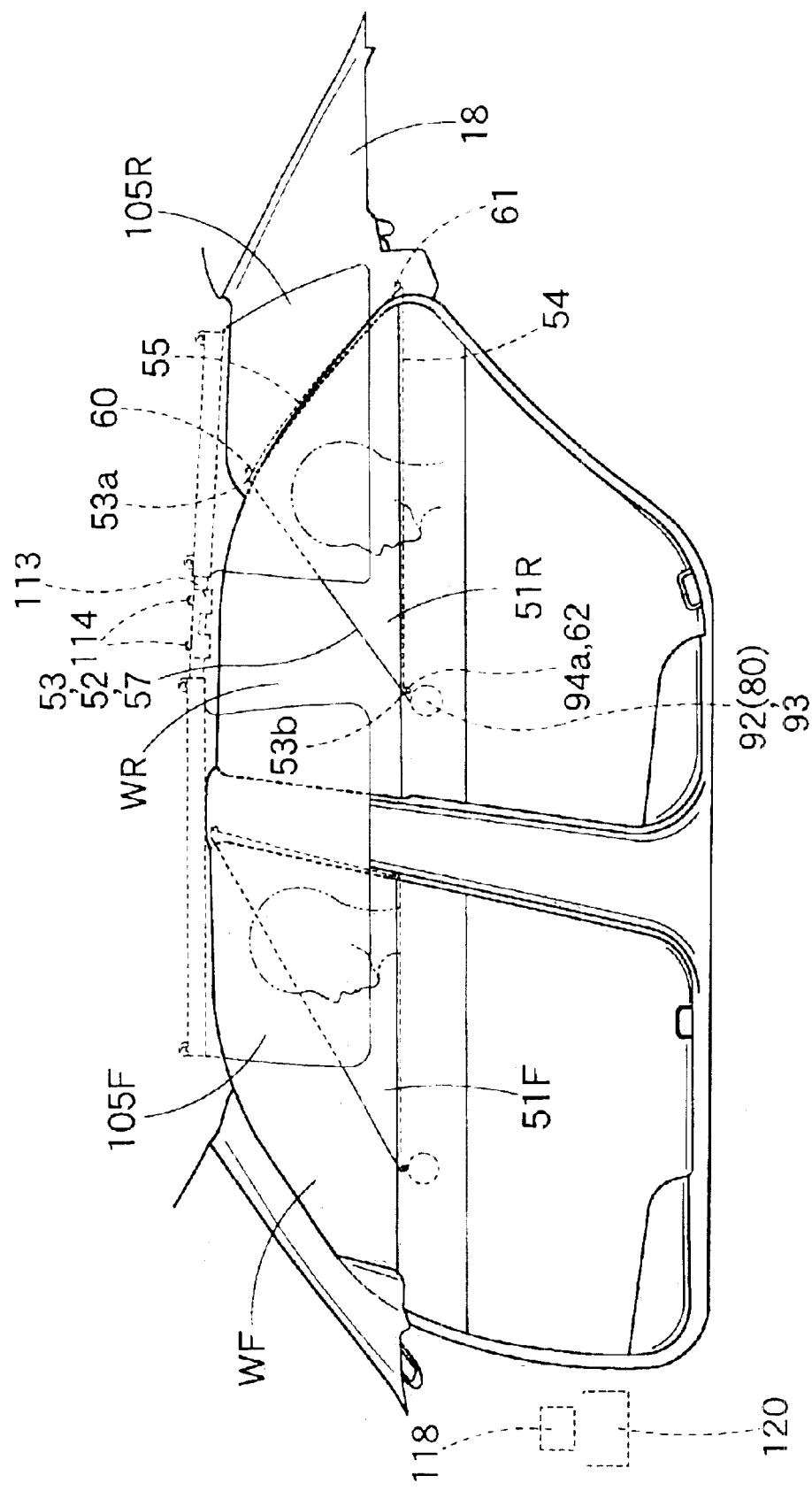
FIG. 48 is a diagram showing the occupant restraining device of the fourteenth embodiment in action.

In an occupant restraining device S14 of FIGS. 47 and 48, the shielding members 51F/51R are arranged in the front door FD and the rear door RD, respectively, and the shielding member 51 is as the same as the third embodiment. The shielding member 51R has the vertical edge portion 55 formed to match the opening shape of the window WR and is made similar to the shielding member 51F arranged in the front door FD.

Specifically, this shielding member 51R is also provided as the shape at the deployment completion with the oblique side 53 to cross the window WR as the opening obliquely. Moreover, the shielding member 51R is formed into a generally triangular sheet shape for shielding one of the regions halved by the oblique side 53 in the window WR, that is, the lower region of the oblique side 53.

Like the shielding member 51F, moreover, the shielding member 51R is so folded and housed in the inverted L-shape as to cross the intersection corner C of the peripheral edge of the window WR, at which the vertical edge portion VW and the lower edge portion DW intersect. Specifically, the shielding member 51R is folded and housed between the rear vertical edge portion 25 of the door frame 22 and the rear vertical edge portion 34 of the door frame garnish 31 and is folded and housed between the lower edge portion 26 of the door frame 22 and the lower edge portion 35 of the door frame garnish 31.

In the shielding member 51R, moreover, like the shielding member 51F, the upper apex portion 60 of the shielding member 51R of a generally triangular sheet shape on the side of the upper end 53a of the oblique side 53 and the lower apex portion 61 or the intersection between the lower edge portion 54 and the vertical edge portion 55 are fixed on the rear vertical edge portion 25 of the door frame 22 in the vertical edge portion VW, and the leading end side apex portion 62 or the side of the lower end 53b of the oblique side 53 is connected to the tension member 94 of the pretensioner 92. The upper/lower apex portions 60/61 are constructed to have the mounting holes 60a/61a (as referred to FIG. 49), respectively. Moreover, the upper/lower apex portions 60/61 are fixed on the door frame 22 by inserting the retaining pins 40 buried in the garnish 31 arranged on the inner side of the door frame 22 into the mounting holes 60a/61a, to retain them to mounting holes 25a/25b formed in the upper/lower portions of the rear vertical edge portion 25 of the door frame 22. The leading end apex portion 62 is connected to the leading end 94a of the tension member 94 of the pretensioner 92. Moreover, this shielding member 51R is also assembled together with the pretensioner 92 as the deployment mechanism 80 to form an occupant restraining unit U0R (as referred to FIG. 50), to be mounted on the rear door RD.

Figure 49:
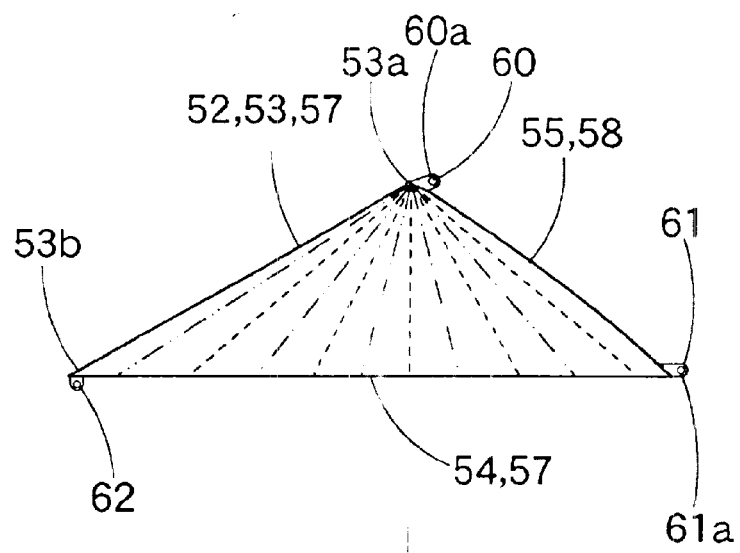
FIGS. 49A–49C illustrate the folding steps of the shielding member of the fourteenth embodiment on the rear side of the vehicle.
Figure 49:
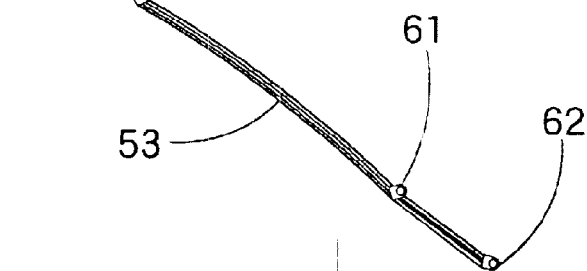
Figure 49:
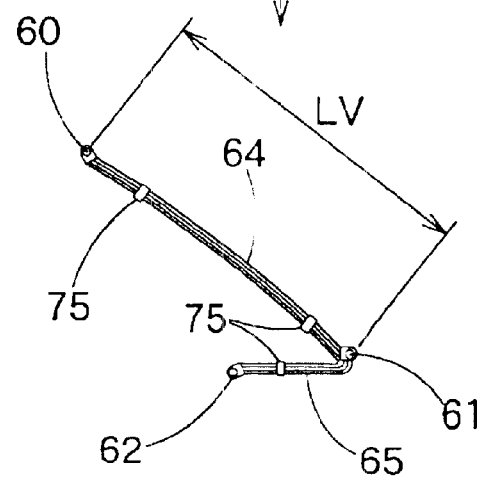

Like the shielding member 51F, the shielding member 51R is also so folded from the flatly expanded state before housed, as shown in FIG. 49, that the oblique side 53 may approach the vertical edge portion 55 without changing the distance of the vertical edge portion 55 (or the stationary edge portion 58) to be fixed on the peripheral edge of the window WR, i.e., the distance LV between the upper apex portion 60 of the upper end 53a of the oblique side 53 and the lower apex portion 61 near the intersection corner C. Thus the shielding member 51R in the flatly expanded state is folded in a folding-fan shape on the upper apex portion 60 of the flat, expanded shielding member 51R so that the folding width on the side of the lower edge portion 54 is larger than on the side of the upper apex portion 60.

In the fourteenth embodiment, moreover, there is arranged not only the airbag 104F same as the airbag 104 of the third embodiment but also the airbag 104R which covers the inner side of the rear seat (i.e., the inner sides of the window WR and the garnish 18 of the rear pillar portion RP). The inflator 112 is made as a dual type capable of feeding the airbags 104F/104R with the inflating gas, as has been described hereinbefore.

Here, the third to fourteenth embodiments have been described on the construction in which the shielding members 51/51F/51R and the airbags 104/104F/104R are activated on detecting a rollover. However, the side collision sensor for detecting a side collision of the vehicle may be connected with the control device 120 so that the shielding members 51/51F/SIR and the airbags 104/104F/104R may be activated when the vehicle makes a side collision.

It is quite natural that the airbags 104/104F/104R may be omitted from the vehicle so that the shielding members 51/51F/51R only may be activated at the rollover detection time. This construction may be adopted in the first and second embodiments.

Figure 51:
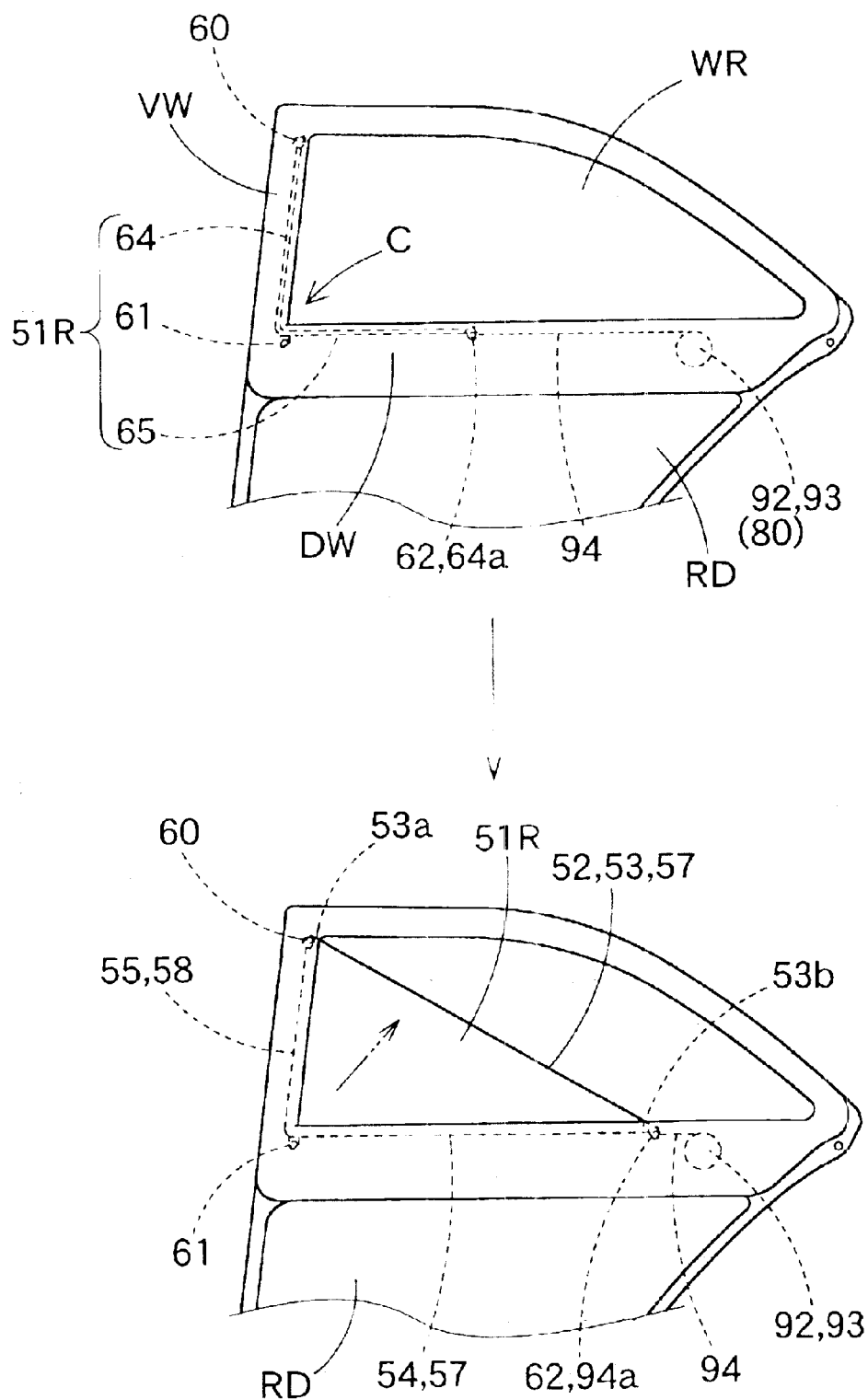
FIG. 51 presents diagrams showing a modification of the fourteenth embodiment.

On the other hand, the shielding member for covering the window WR may be housed in an L-shape from the vertical edge portion VW to the lower edge portion DW of the window WR on the front side of the vehicle, as shown in FIG. 51. This construction may naturally be applied to the shielding 51/51F arranged in the peripheral edge of the window WF on the front side of the vehicle, including the first and second embodiments. In this case, moreover, the shielding members 51/51F/51R may be housed only in the vertical edge portion VW or the lower edge portion DW on the front side of the vehicle.

The individual embodiments have been described on the case in which the shielding members 51/51F/51R/121 are housed in the doors FD/RD. However, the shielding member may naturally be arranged on the peripheral edge of the window which is formed in a body other than a door, as exemplified in a vehicle having three tandem seats, as long as the shielding member is housed in the peripheral edge of any window.

Figure 52:
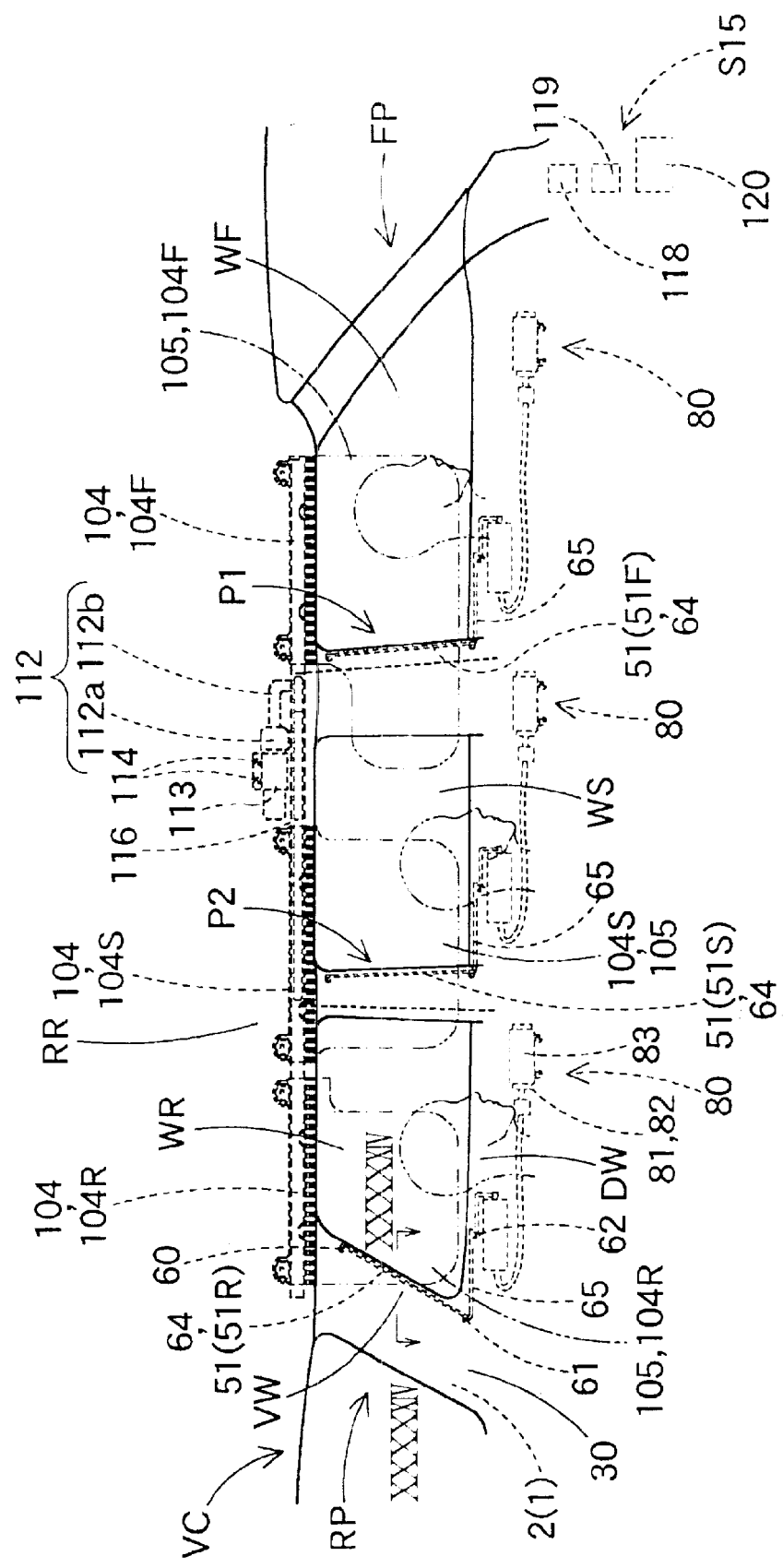
FIG. 52 is a diagram showing an occupant restraining device of a fifteenth embodiment.
Figure 53:
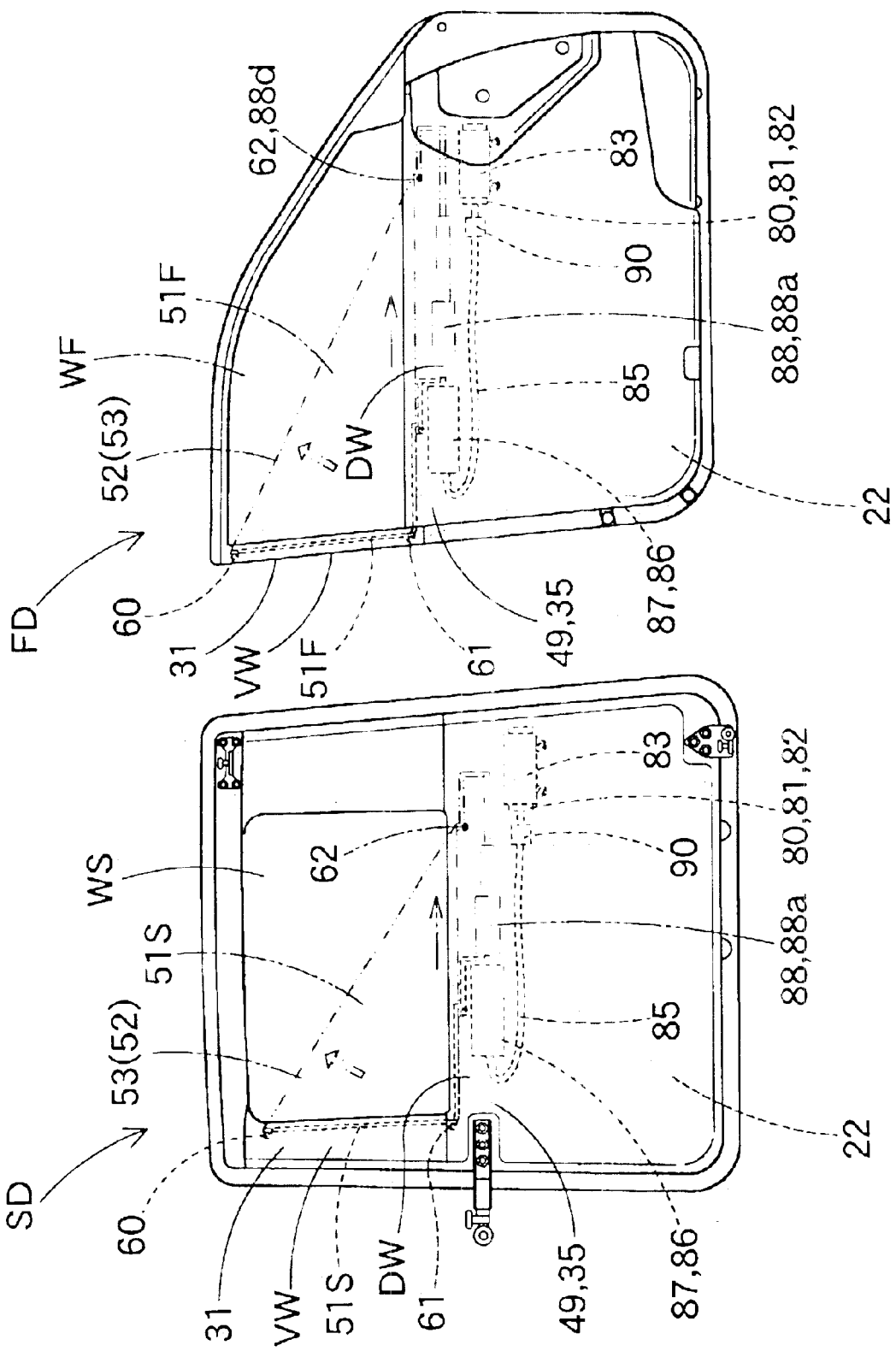
FIG. 53 is a diagram showing a front door and a slide door of the fifteenth embodiment.
Figure 55:
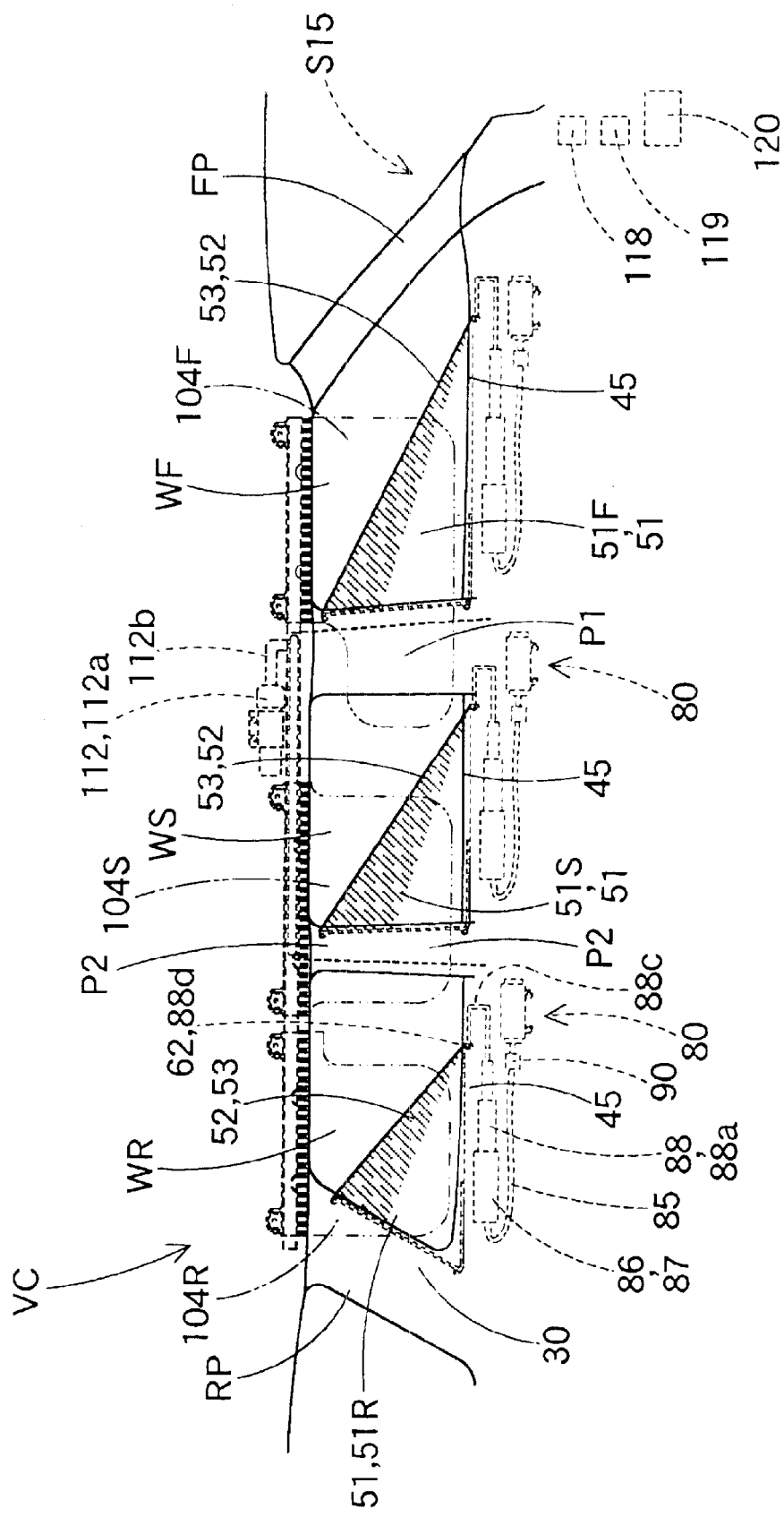
FIG. 55 is a diagram showing the action time of the fifteenth embodiment.

As shown in FIGS. 52 and 55, an occupant restraining device S15 of a fifteenth embodiment is mounted on a vehicle VC having three tandem sheets. The shielding member 51 is housed in the peripheral edge of each of the windows WF/WS/WR of the doors or the body on the inner side. The three folded airbags 104 (104F/104S/104R) are arranged in the roof side rail portion RR in the upper edge side peripheral edge of the window WF/WS/WR from the vicinity of the front pillar portion FP through first/second intermediate pillar portions P1/P2 to the vicinity of the rear pillar portion RP. In this vehicle VC, moreover, there is arranged a slide door SD which is slid backward when opened and forward when closed.

Each shielding member 51 (51F/51S/51R) is made of a flexible cloth having a triangular sheet shape in its expanded state and is folded and housed in a L-shape from the rear vertical edge portion VW to the lower edge portion DW in the peripheral edge of the window WF/WS/WR. Each shielding member 51 has the apex portions 62/60/61 at the front end portion, the rear edge upper portion and the rear edge lower portion in its expanded state. The apex portion 62 is connected to the piston rod upper end 88d of the drive source 81, and the apex portions 60/61 are fixed at the upper/lower portions of the vertical edge portion VW in the peripheral edge of the window WF/WS/WR. In the front side shielding member 51F/51S of the fifteenth embodiment, the apex portion 60 is fixed in the upper portion of the vertical edge portion VW of the peripheral edge of the window WF/WS in the door frame 22 of the front door FD or the slide door SD, and the apex portion 61 is fixed in the lower portion of the vertical edge portion VW of the peripheral edge of the window WF/WS in the door frame 22. In the shielding member 51R on the rear end side, the apex portion 60 is fixed in the inner panel 2 on the side of the body 1 in the upper portion of the vertical edge portion UV of the peripheral edge of the window WR, and the apex portion 61 is fixed in the inner panel 2 on the side of the body 1 in the lower portion of the vertical edge portion VW of the peripheral edge of the window WR.

Moreover, each shielding member 51 is deployed from the peripheral edge of each window WF/WS/WR by the deployment mechanism 80. As in the first embodiment, the deployment mechanism 80 is activated by the control device 120 and is constructed to include the inflator 82 as the drive source 81, the cylinder 87 and the piston rod 88 as the connection means 86, the feed pipe 85 for feeding the inflating gas, and the flow control valve 90.

Each inflator 82 is fixed on the lower side of the peripheral edge of the window WF/WS/WR in the door frame 22 or the inner panel 2 by using the mounting bracket 83, and each cylinder 87 is fixed on the lower side of the peripheral edge of the window WF/WS/WR in the door frame 22 or the inner panel 2 by using not-shown mounting bracket.

Figure 54:
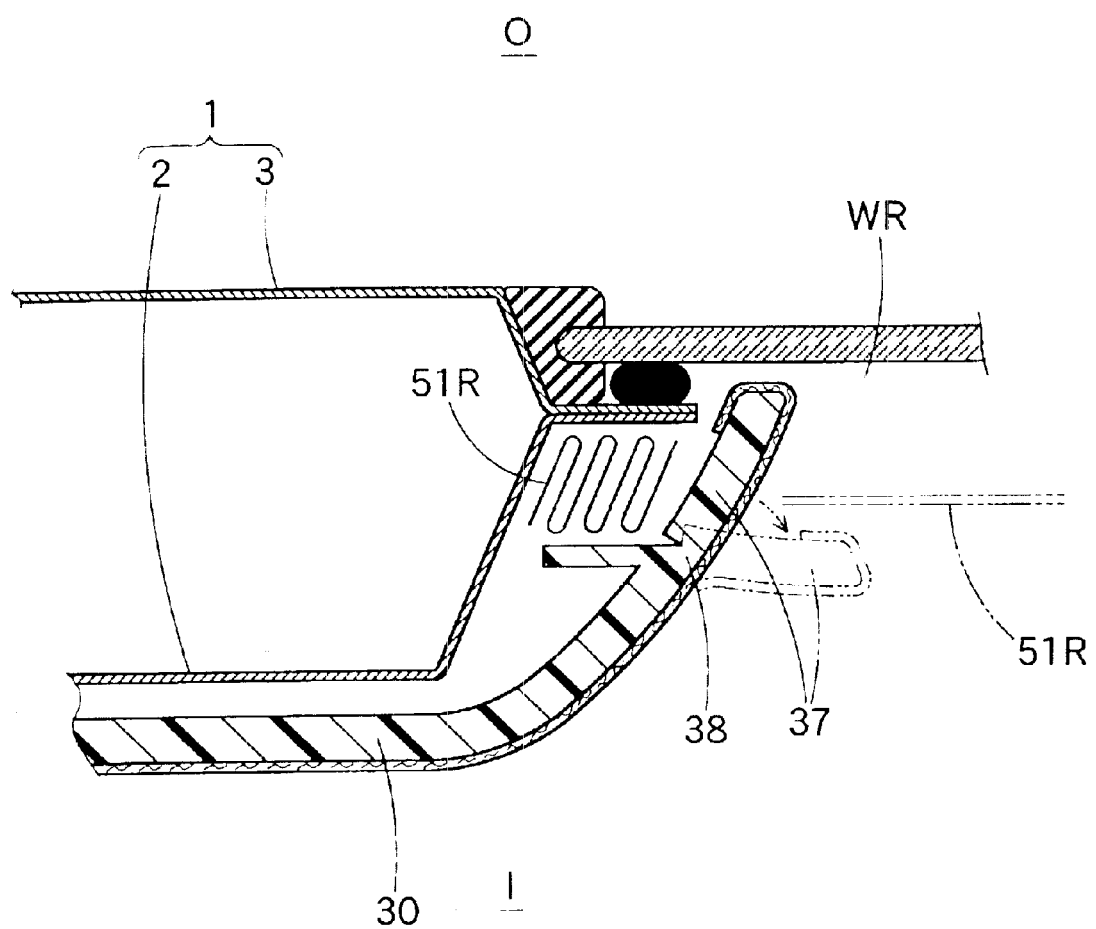
FIG. 54 is a schematic section of a portion XXXXXIV—XXXXXIV of FIG. 52.

Moreover, each shielding member 51F/51S/51R is covered, when folded and housed in the L-shape, with the door frame garnish 31, the door trim 49 or a window edge garnish 30. Here in the case of the fifteenth embodiment, the lower edge portion 35 of the garnish 31 of the first embodiment is formed in the side of the door trim 49. Moreover, as in the first embodiment, the door frame garnish 31, the door trim 49 or the window edge garnish 30 can be opened at its door portion 37/45 by the push of the shielding members 51F/51S/SIR, when each shielding member 51F/51S/51R is expanded, so that each shielding member 51F/51S/51R is expanded (as referred to FIGS. 3, 4 and 54).

The airbag 104 (104F/104S/104R) is fed through a feed pipe 116 with the inflating gas from the inflator 112.

This inflator 112 is arranged on the inner side I of the inner panel 2 of the body 1 in the roof side rail portion RR, and is constructed, as shown in FIGS. 52 and 55, to include: a body portion 112a of a cylinder type; and a communication portion 112b of a pipe shape for introducing the inflating gas discharged from the body portion 112a into the feed pipe 116. The inflator 112 is held by the mounting bracket 113 for clamping the body portion 112a and is fixed on the inner panel 2 by fastening the mounting bracket 113 on the inner panel 2 by means of the bolts 114.

Also in this occupant restraining device S15 of the fifteenth embodiment, the control device 120 activates the inflator 82/112 when it receives a predetermined signal from the sensor 118/119. Specifically, as shown in FIG. 55, the shielding members 51F/51S/51R shield the window WF/WS/WR. Moreover, the airbags 104F/104S/104R are expanded/inflated with the inflating gas coming from the inflator 112 through the feed pipe 116.

Here, in the first and third to fifteenth embodiments, the shielding member 51 is constructed in the complete sheet shape. However, each shielding member may be formed into a net or mesh shape having holes, if it can shield one of the windows WF/WR. Moreover, the shielding member may be formed into either a belt shape having only the side of the oblique side 53 of the shielding member 51 or a T-shaped belt shape having only the vicinity of the expansion portion 121b and the inlet passage 121a of the shielding member 121.

Figure 56:
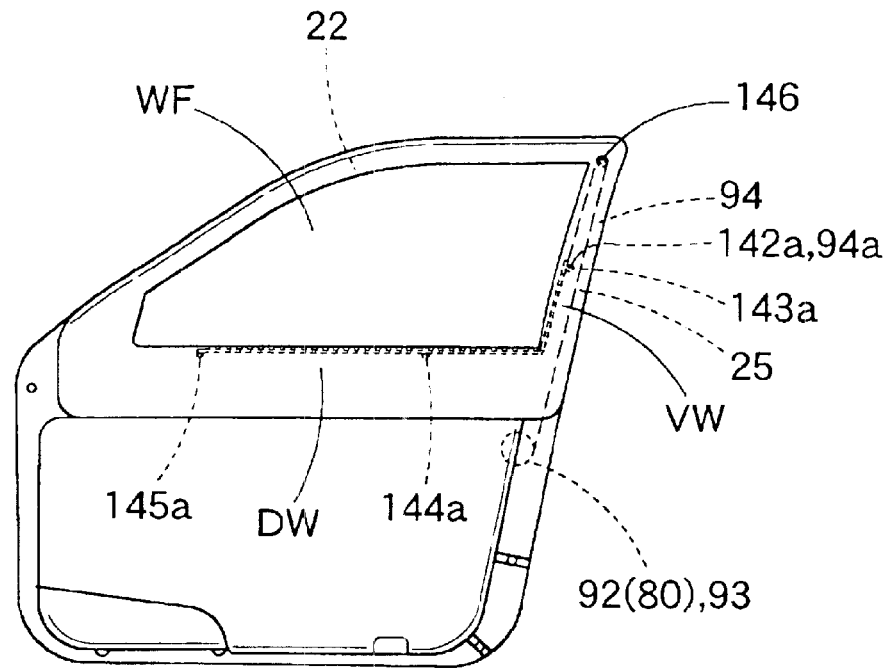
FIGS. 56A–56B are diagrams showing a modification of the shielding member.
Figure 56:
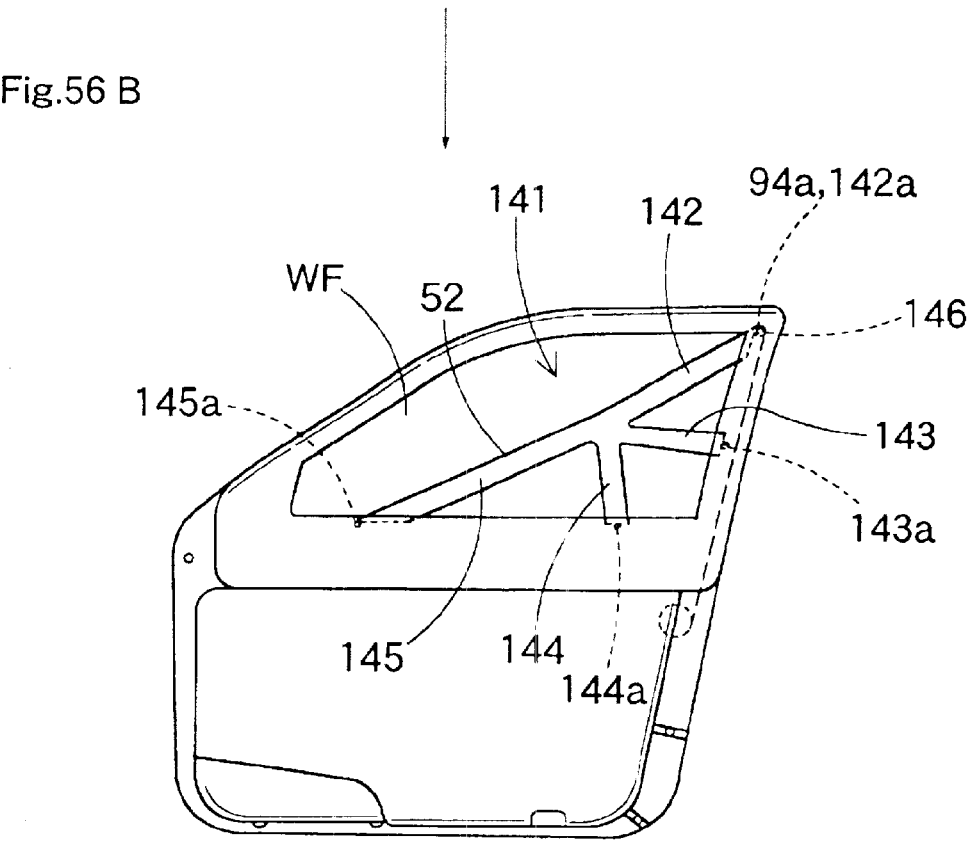
Figure 57:
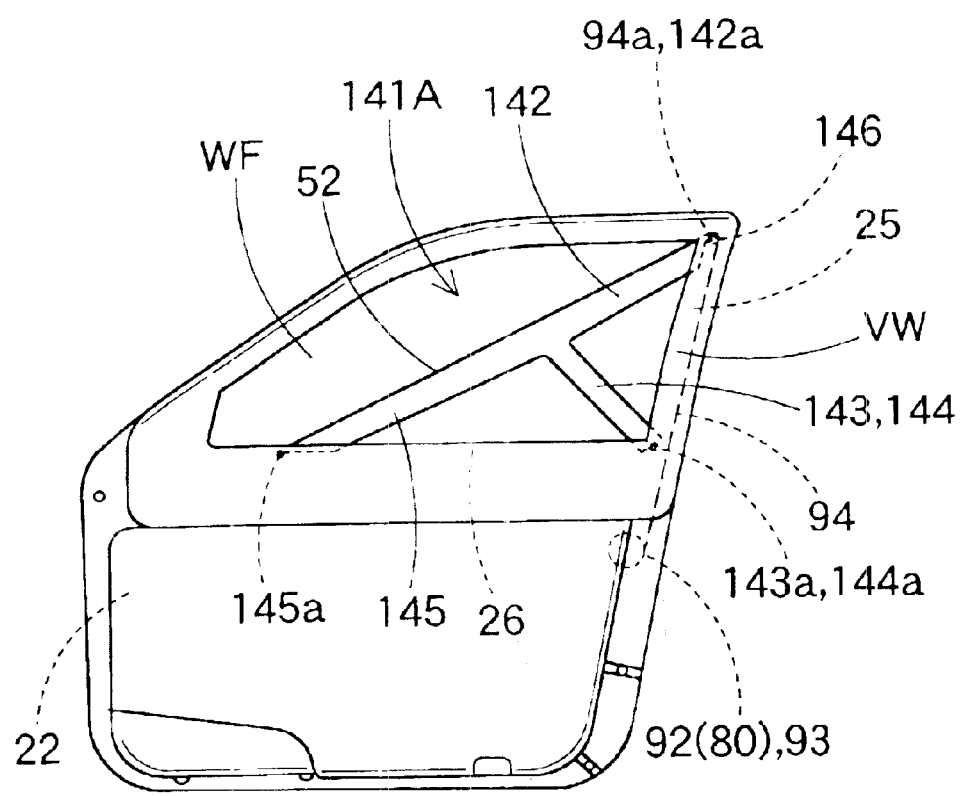
FIG. 57 is a diagram showing another modification of the shielding member.

Here, the belt-shaped shielding member may be formed like a shielding member 141 shown in FIG. 56, by jointing a plurality of band-shaped portions 142/143/144/145 for shielding the window WF. In this shielding member 141, the leading-ends 143a/144a/145a of the band-shaped portions 143/144/145 are connected to the door frame 22, and the leading end 142a of the band-shaped portion 142 is connected to the leading end 94a of the tension member 94 in the pretensioner 92 as the deployment mechanism 80. The tension member 94 is wound on a rotatable roller 146 arranged in the upper portion of the rear vertical edge portion 25 of the door frame 22 and is connected to the band-shaped portion leading end 142a. At the housing time, the shielding member 141 is housed in the vertical edge portion VW and the lower edge portion DW, as shown in FIG. 56A. At the acting time, moreover, the pretensioner 92 tenses the tension member 94 and pulls up the leading end 142a of the band-shaped portion 142, as shown in FIG. 56B, so that the deployment is completed. When the shielding member is constructed of band-shaped portions, it is possible to set the number of the band-shaped portions arbitrarily. For example, a T-shaped shielding member 141A may be constructed, as shown in FIG. 57, by joining the band-shaped portions 143/144 of the shielding member 141 into one to make the three band-shaped portions including the band-shaped portions 142/145 and by connecting the respective leading ends 143a/144a of the single band-shaped portions 143/144 to the vicinity of the intersection between the rear vertical edge portion 25 and the lower edge portion 26 of the door frame 22. The housed state of this shielding member 141A is the same as that shown in FIG. 56A, excepting the connected positions of the band-shaped portions 143/144 to the door frame 22.

Also in shielding members 141/141A, the tensile force of the pretensioner 92 as the deployment mechanism 80 acts directly on the band-shaped portions 142/145, so that a high tension is established in the band-shaped portions 142/145 acting as the edge portion 52 to be deployed across the window WF.

In case the pretensioner 92 is used as the deployment mechanism 80 of the shielding member 51, the tension member 94 itself may be used as a part of the shielding member 51. Specifically, a part of the tension member 94 may be used as the edge portion 52'of the shielding member 51 to cross the window WF/WR.

Figure 58:
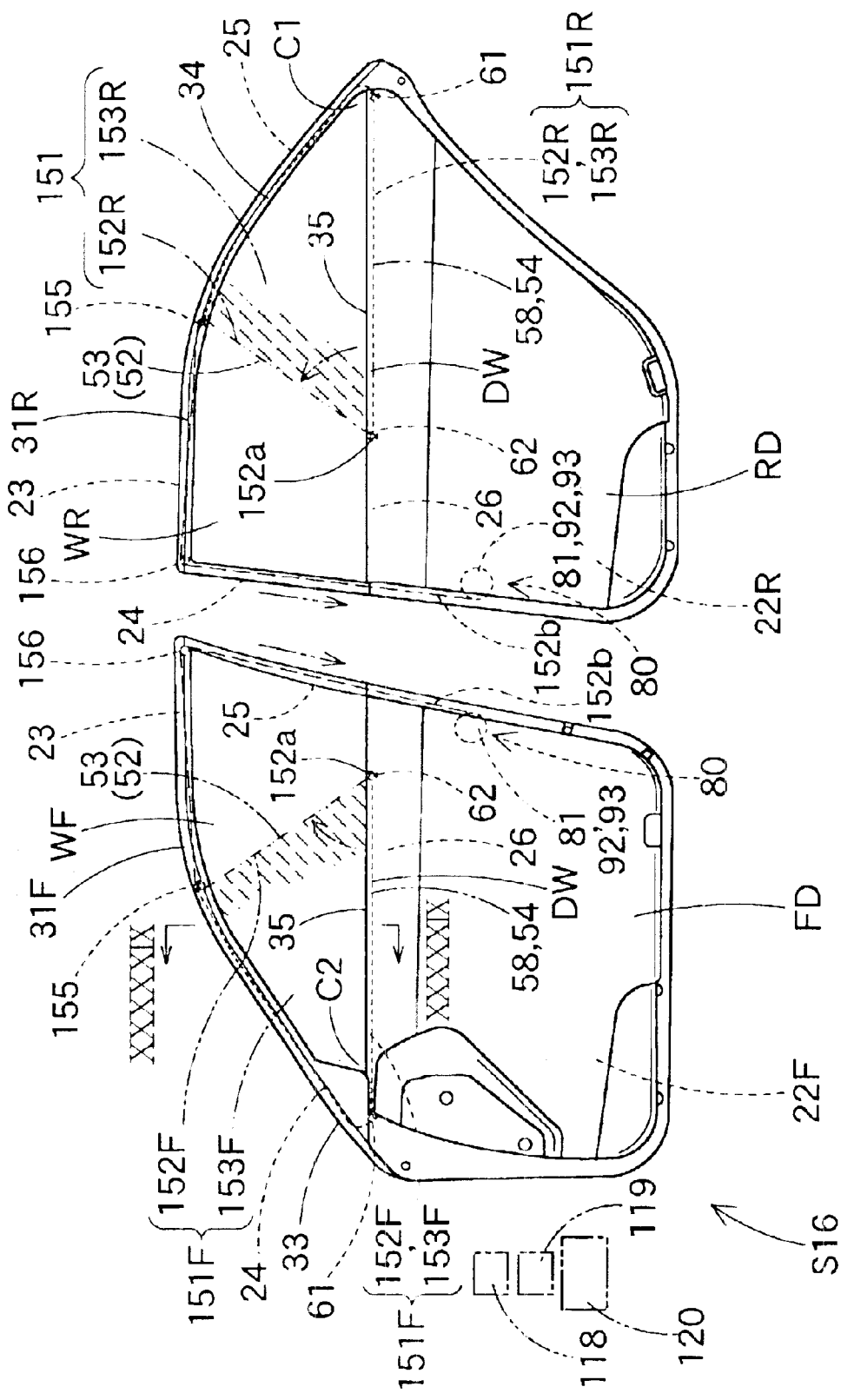
FIG. 58 is a diagram showing an occupant restraining device of a sixteenth embodiment.
Figure 59:
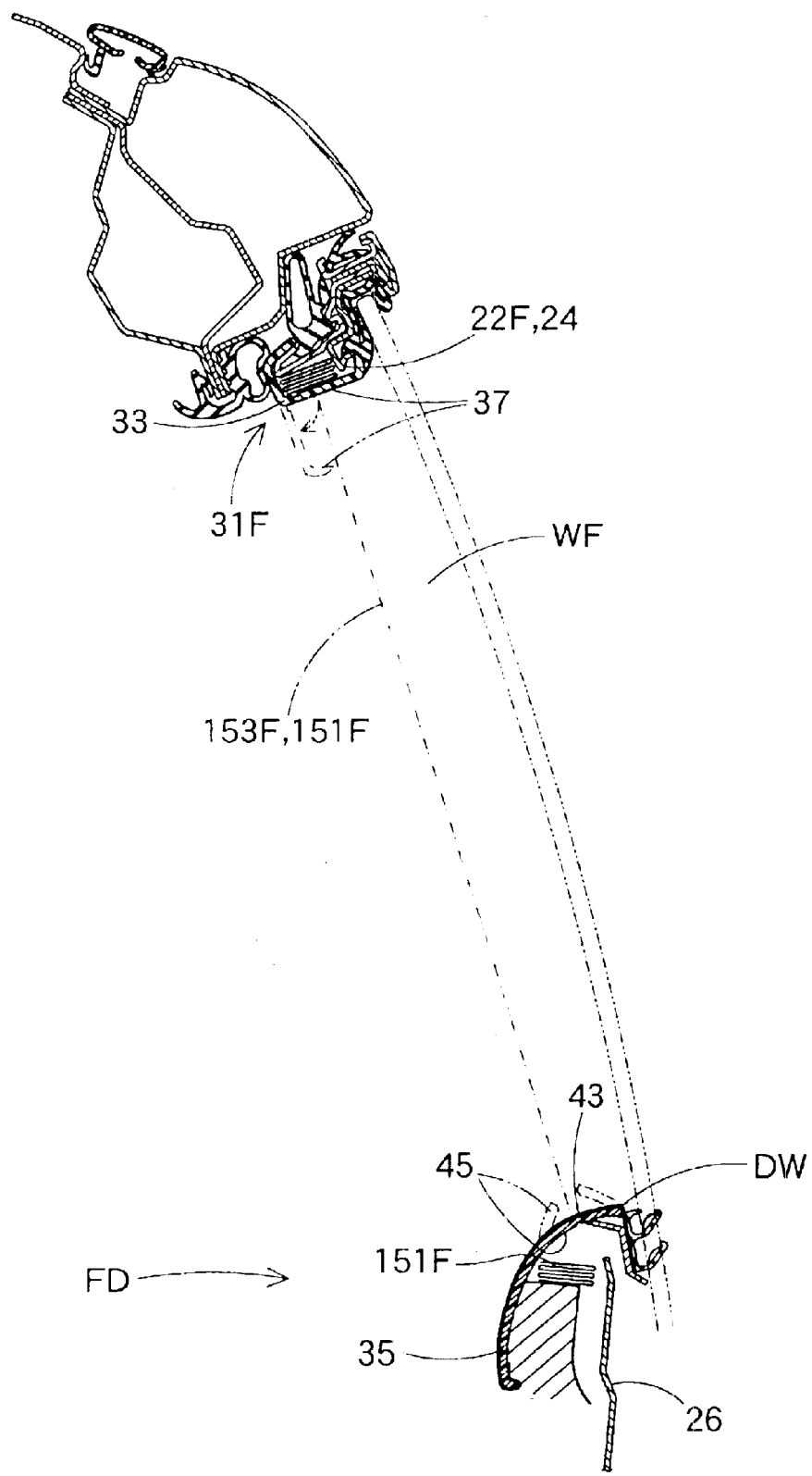
FIG. 59 is a schematic section of a portion XXXXXIX—XXXXXIX of FIG. 58.

As in an occupant restraining device S16 of a sixteenth embodiment shown in FIGS. 58 and 59, for example, the shielding members 151F/151R may be constructed to include flexible triangular sheet members 153F/153R for covering the side of the front lower corner C2 of the window WF or the rear lower corner C1 of the window WR, and string members 152F/152R. The string members 152F/152R are connected at their respective leading end-sides to the substantially entire length of the oblique side 53 on the upper edge side of the sheet members 153F/153R. The sheet members 153F/153R are fixed at the front/rear end portions 61/62 of the lower edge portion 54 on the lower edge portion 26 of respective door frames 22F/22R in the side of the lower edge portion DW by using the lower edge portion 54 as the stationary edge portion 58.

The string member 152F is bonded at the side of its leading end portion 52a to the oblique side 53 acting as the edge portion 52 in the sheet member 153F to cross the window WF and is fixed at its leading end portion 152a together with the edge portion 62 of the sheet member 153F to the lower edge portion 26 of the door frame 22F in the vicinity of a center pillar portion. Moreover, the string member 152F is wound at the side of its root portion 152b on a free roller 155 fixed in the vicinity of the front portion of the upper edge portion 23 in the door frame 22F and further on a free roller 156 fixed in the vicinity of the upper end of the rear vertical edge portion 25 in the door frame 22F. Moreover, the root portion 152b is connected in a tensible manner to the body 93 of the pretensioner 92 arranged at the lower edge portion 26 of the door frame 22F.

The string member 152R is bonded at the side of its leading end portion 152a to the oblique side 53 acting as the edge portion 52 in the sheet member 153R to cross the window WR and is fixed at its leading end portion 152a together with the edge portion 62 of the sheet member, 153R to the lower edge portion 26 of the door frame 22R in the vicinity of a center pillar portion. Moreover, the string member 152R is wound at the side of its root portion 152b on a free roller 155 fixed in the vicinity of the rear portion of the upper edge portion 23 in the door frame 22R and further on a free roller 156 fixed in the vicinity of the upper end of the front vertical edge portion 24 in the door frame 22R. Moreover, the root portion 152b is connected in a tensible manner to the body 93 of the pretensioner 92 arranged at the lower edge portion 26 of the door frame 22R.

The shielding member such as the shielding members 151F/151R is so folded along the lower edge portion 54 that the sheet members 153F/153R together with the string member 152F/152R may be close to the lower edge portion 54 as the stationary edge portion 58 to be covered with the lower edge portion 35 of the door frame garnishes 31F/31R. On the other hand, the string member 152F is so housed along the garnish 31F from the side of the door frame front vertical edge portion 24 through the free rollers 155/156 that the portion extending from the sheet member 153F may be covered with the garnish 31F on the side of the door FD. Moreover, the string member 152R is so housed along the garnish 31R from the side of the door frame rear vertical edge portion 25 through the free rollers 155/156 that the portion extending from the sheet member 153R may be covered with the garnish 31R on the side of the door RD.

In this sixteen embodiment, when the control device 120 activates each pretensioner body 93 acting as the drive source 81 of the deployment mechanism 80 on detecting a rollover, the string member 152F/152R is tensed while being guided by the free rollers 155/156. Then, the sheet member 153F raises the oblique side 53 obliquely backward and upward from the front lower corner C2 of the window WF. The sheet member 153R raises the oblique side 53 obliquely forward and upward from the rear lower corner C1 of the window WR. Thus, the shielding members 151F/151R respectively shield the windows WF/WR. At this action time, the string member 152 and the sheet member 153 push/open the door portions 37/45 of the garnish 31 (as referred to FIG. 59).

Figure 60:
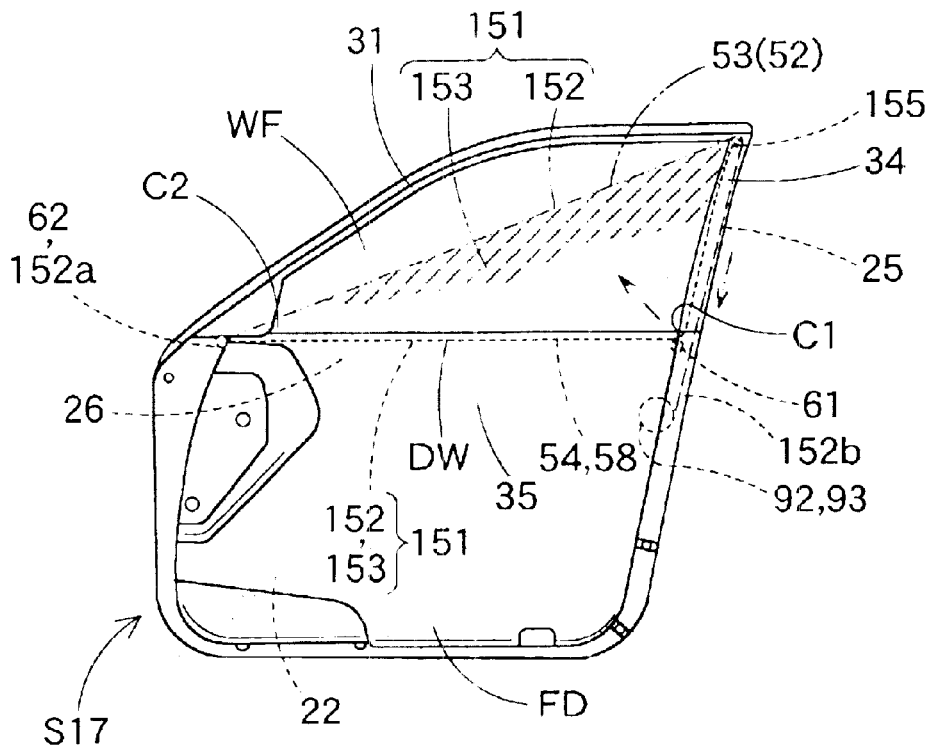
FIG. 60 is a diagram showing an occupant restraining device of a seventeenth embodiment.
Figure 61:
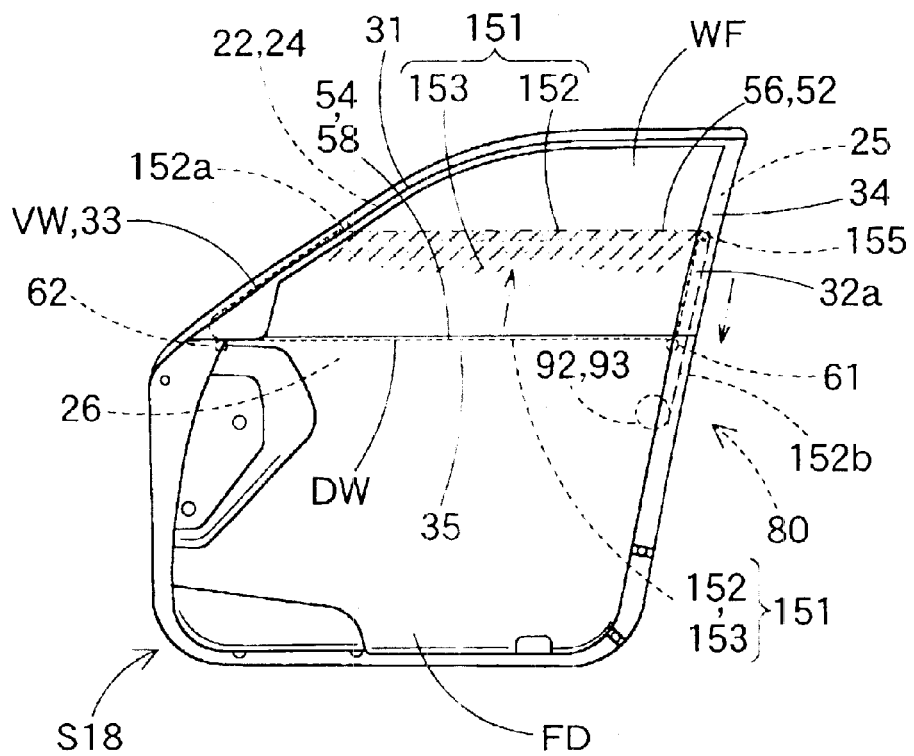
FIG. 61 is a diagram showing an occupant restraining device of an eighteenth embodiment.

Moreover, the shapes and the arrangement positions of those string member 152 and sheet member 153 may be constructed as in occupant restraining devices S17 and S18 in the seventeenth and eighteenth embodiments shown in FIGS. 60 and 61, if they rise from the side of the lower edge portion DW in the peripheral edge of the windows WF/WR.

The shielding member 151 shown in FIG. 60 is constructed to include a triangular sheet member 153 for shielding the half of the window WF on the side of the rear lower corner C1, and a string member 152 connected to the oblique side 53 of the sheet member 153. In the sheet member 153, the lower edge portion 54 is fixed as the stationary side edge portion 58 at its front and rear edge portions 61/62 on the door frame lower edge portion 26. Moreover, the sheet member 153 is so folded and housed close to the lower edge portion 54 as to be covered with the lower edge portion 35 of the garnish 31. The string member 152 is fixed at its leading end portion 152a in the vicinity of the front lower corner C2 of the door frame 22 and is covered, when housed, with the lower edge portion 35 of the garnish 31. Moreover, the string member 152 is housed at its portion apart from the sheet member 153 in the rear vertical edge portion 34 on the rear side of the garnish 31 and is wound on the free roller 155 fixed at the rear vertical edge portion 25 of the door frame 22. The reversed string member 152 is connected at its root portion 152b to the body 93 of the pretensioner 92 arranged at the door frame lower edge portion 26.

Therefore, in the shielding member 151 of the seventeenth embodiment shown in FIG. 60, when the pretensioner body 93 is active, the string member 152 is tensed so that the oblique side 53 rises so obliquely upward and forward from the rear lower corner C1 as to rotate counterclockwise on the front lower corner C2, thereby to shield the window WF.

A shielding member 151 of an eighteenth embodiment shown in FIG. 61 is constructed to include a sheet member 153 for shielding the lower half of the window WF, and the string member 152 connected to the substantially entire length of the upper edge portion 56 of the sheet member 153. The string member 152 is fixed at its leading end portion 152a in a vertically intermediate portion of the front vertical edge portion 24 of the door frame 22. The string member 152is housed at its leading end portion 152a, while being extended downward, in the front vertical edge portion 33 on the front side of the garnish 31 and is covered with the lower edge portion 35. Moreover, the string member 152 is housed at its portion apart from the sheet member 153 in the rear vertical edge portion 34 on the rear side of the garnish 31 and is turned-back while wound on the free roller 155 fixed at the rear vertical edge portion 25 of the door frame 22. Still moreover, the string member 152 is connected at its root portion 152b to the body 93 of the pretensioner 92 arranged at the door frame lower edge portion 26. In the sheet member 153, the lower edge portion 54 is fixed as the stationary side edge portion 58 at its front and rear edge portions 61/62 on the door frame lower edge portion 26. Moreover, the sheet member 153 is so folded and housed, together with the string member 152, close to the lower edge portion 54 as to be covered with the lower edge portion 35 and the front vertical edge portion 33 of the garnish 31.

In the shielding member 151 of the eighteenth embodiment shown in FIG. 61, at the action time of the pretensioner body 93, the string member 152 is tensed so that the upper edge portion 56 of the sheet member 153 acts as the edge portion 52 to cross the window WF and rises from the lower edge portion DW of the window WF thereby to shield the window WF. In these sixteenth, seventeenth and eighteenth embodiments, too, the tension of the string member 152 is applied directly to the oblique side 53 or the upper edge portion 56 acting as the edge portion 52 to cross the windows WF/WR so that a high tension is established.

Figure 62:
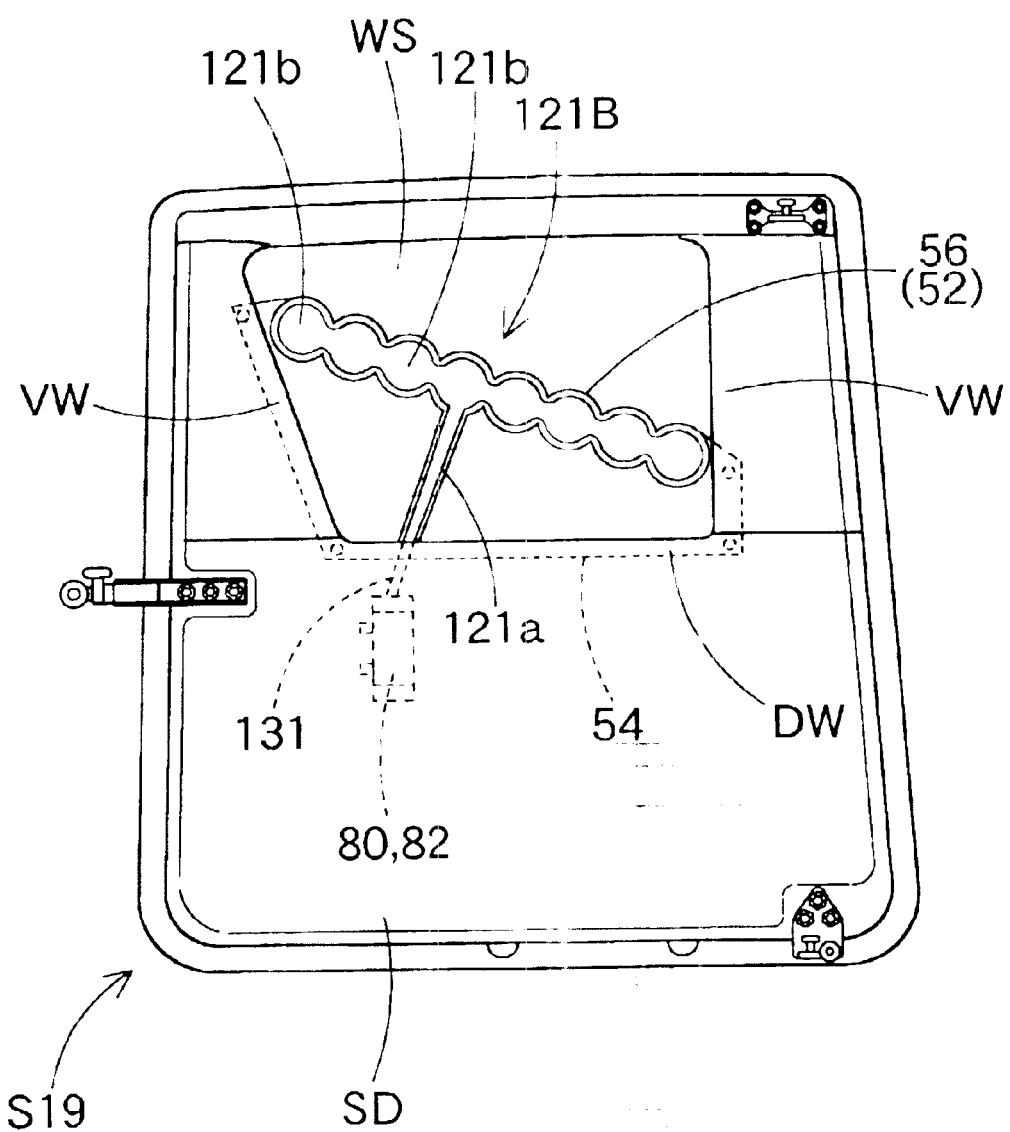
FIG. 62 is a diagram showing an occupant restraining device of a nineteenth embodiment.

Here in case the shielding member for shielding the window is formed into a generally rectangular shape, it may be expanded from its folded state admitting the inflating gas. As in an occupant restraining device S19 of a nineteenth embodiment shown in FIG. 62, for example, with respect to the peripheral edge of a shielding member 121B, the lower edge portion 54 is fixed on the lower edge portion DW of the peripheral edge of the window WS, and the two front/rear end portions of the upper edge portion 56 are individually fixed to the front/rear vertical edge portions VW extending upward from the two front/rear ends of the lower edge portion DW. In this shielding member 121B, moreover, there are arranged the gas flow passage 121a for the deployment expansion, and in the upper edge portion 56., a plurality of inflation portions 121b which are bulged into spherical shapes to produce a tension in the direction along the upper edge portion 56. The gas passage 121a is connected to the feed pipe 131 for feeding the inflating gas from the inflator 82 as the deployment mechanism 80, and is made to communicate from the lower side with the inflation portions 121b in the vicinity of the center of the upper edge portion 56. This shielding member 121B is folded and housed in the peripheral edge of the shielded region of the window WS to be shielded by the completely expanded shielding member 121B. In this shielding member 121B, moreover, the upper edge portion 56 rises to shield the window WS at the action time of the inflator 82 as the deployment mechanism 80.

In case the shielding member 51 or the like admitting no inflating gas is employed, it can be formed of a thin flexible sheet or band members unlike the shielding member 121 or the like to be deployed admitting the inflating gas, so that the shielding member 51 can be housed not bulkily but compactly when folded.

As the shielding member, moreover, a wide-band-shaped string member 152 may be used to form a shielding member 151A instead of using the sheet members 153 of the sixteenth to eighteenth embodiments.

Figure 63:
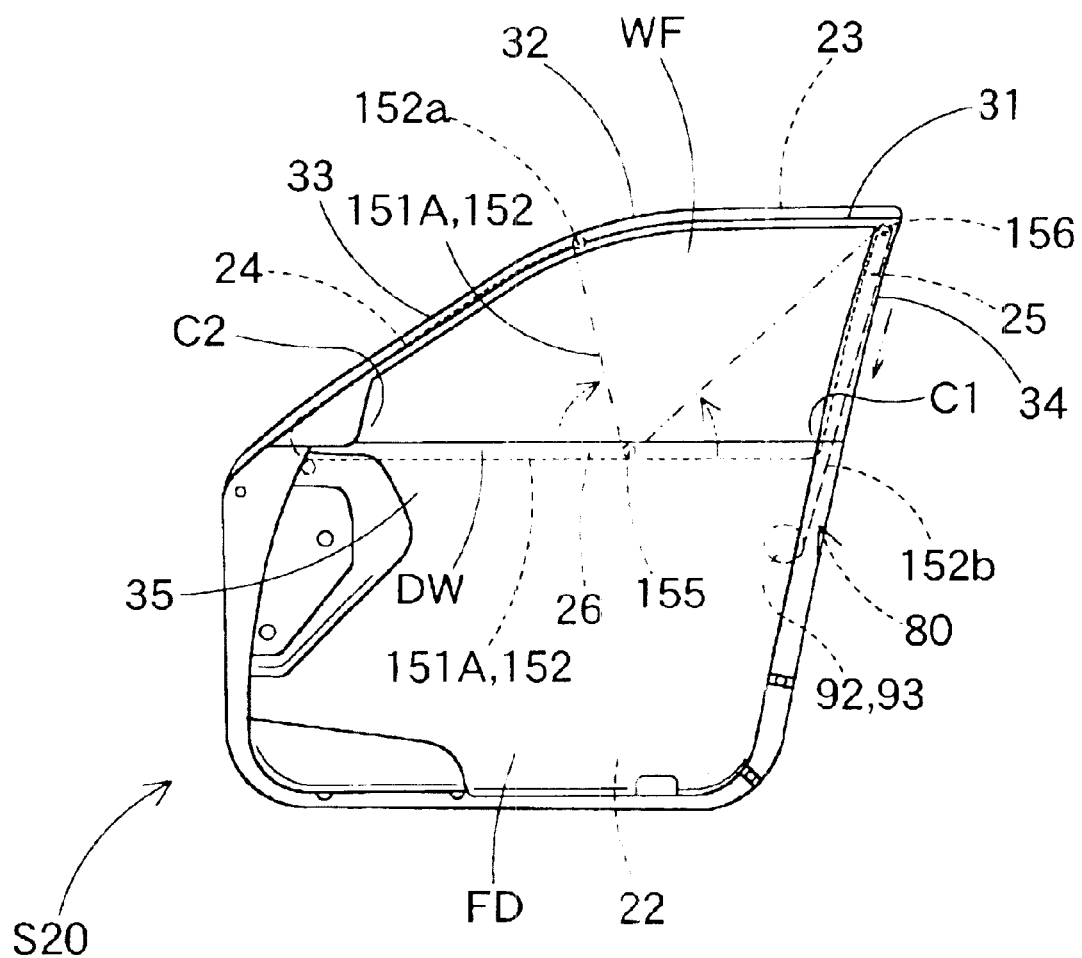
FIG. 63 is a diagram showing an occupant restraining device of a twentieth embodiment.

The shielding member 151A in an occupant restraining device S20 of a twentieth embodiment shown in FIG. 63 is constructed of the band-shaped string member 152. This string member 152 is fixed at its leading end portion 152a at a position near the front end of the upper edge portion 23 of the door frame 22 of the peripheral edge of the window WF. Moreover, the string member 152 is extended, when housed, downward with the side of its leading edge portion 152a being covered with the front vertical edge portion 33 on the front side of the garnish 31, and extends backward passing below the free roller 155 fixed at the door frame lower edge portion 26, while being covered with the lower edge portion 35 of the garnish 31. Moreover, the string member 152 is wound on the free roller 156 fixed-at the upper end of the rear vertical edge portion 25 of the door frame 22 from the upper side and is reversed, and is connected at its root portion 152b to the body 93 of the pretensioner 92 arranged at the door frame lower edge portion 26.

In the shielding member 151A shown in FIG. 63, when the pretensioner body 93 is activated, the string member 152 is tensed to rise obliquely backward and upward from the front lower corner C2 of the window WF and obliquely forward and upward from the rear lower corner C1 of the window WF so that it shields the window WF while joining the leading edge portion 152a and the free rollers 155/156, as fixed at the door frame 22, sequentially and linearly.

Here, the foregoing individual embodiments have been described on the case in which only one shielding member shields the windows WF/WR/WS. However, a plurality of shielding members may be deployed to shield the single window.

Moreover, the shielding member may be constructed to cover not only the inner side of a window but also the outer side of the window.

What is claimed is:

1. An occupant restraining device for shielding a vehicle window during a vehicle rollover, comprising:
    a shielding member adapted to be deployed from a peripheral lower edge side of the window to shield the window; and
    a deployment mechanism for deploying said shielding member to shield the window upon detection of the vehicle rollover, wherein
    said deployment mechanism including a drive source arranged on a lower side of the window for generating a motive power to deploy said shielding member, and a connector for connecting said drive source and said shielding member, and
    said connector moving upwardly with said shielding member along a peripheral vertical edge portion of the window upon deployment of said shielding member by said deployment mechanism.

2. An occupant restraining device for a vehicle window, comprising:
    a shielding member housed within, and adapted to be deployed from, a peripheral edge of the window to shield the window; and
    a deployment mechanism for deploying said housed shielding member to shield the window, wherein
    said shielding member is formed generally in a sheet shape and has at least one oblique side for crossing the window upon deployment completion, with an end thereof connected to said deployment mechanism so that a tension of said shielding member in a direction along the at least one oblique side is higher than tension in other directions, and
    said shielding member includes a notched recess formed in a vicinity of said deployment mechanism and not on the at least one oblique side.

3. An occupant restraining device comprising:
    a shielding member housed within, and adapted to be developed from, a peripheral edge of the window to shield the window; and
    a deployment mechanism for deploying said housed shielding member to shield the window, wherein
    said shielding member is formed generally in a sheet shape and has at least one oblique side for crossing the window upon deployment completion, with an end thereof connected to said deployment mechanism so that a tension of said shielding member in a direction along the at least one oblique side is higher than tension in other directions, and
    wherein said shielding member:
    is formed of a woven fabric of warps and wefts; and
    is arranged to have said warps or said wefts generally in parallel with said at least one oblique side and to have the bias direction of said woven fabric at the deployment completion set along a deployment direction of said development mechanism.

4. An occupant restraining device according to claim 3, wherein the at least one oblique side of said shielding member is constructed to have a longer length at the deployment completion than at non-deployment.

5. An occupant restraining device according to claim 3, wherein said deployment mechanism has a deployment direction set generally along said at least one oblique side of said shielding member at deployment completion.

6. An occupant restraining device for shielding a window of a vehicle, comprising:

a shielding member adapted to be deployed from a peripheral edge of the window to shield the window; and a deployment mechanism for deploying said shielding member, wherein:

said shielding member folded in an L-shaped configuration and is housed both in a lower peripheral edge portion of the window and in a vertical edge portion of the window that extends upwardly from the lower edge portion, said shielding member including a moving side edge portion that moves across the window when said deployment mechanism deploys said shielding member and a fixed end portion, one end of which is housed at an intersection of the lower peripheral edge portion and the vertical edge portion of the window.

7. An occupant restraining device comprising:

a shielding member housed in, and adapted to be deployed from, a peripheral edge of a window of a vehicle so as to shield said window; and a deployment mechanism for deploying said shielding member, wherein:

said shielding member includes a stationary side edge portion that remains stationary upon deployment, and an, oblique moving side edge portion for obliquely crossing said window, said shielding member being formed in a generally triangular shape to shield said window on lower side of said oblique moving side edge portion;

said shielding member is folded such that said oblique moving side edge portion is closer to said stationary side edge portion without changing a length of said stationary side edge portion;

said shielding member is folded in a bellows fashion on folds generally parallel to said oblique moving side edge portion with said stationary side edge portion overlapped on said oblique moving side edge portion; and said shielding member is housed in the peripheral edge of said window so that two end portions of said stationary side edge portion are mounted and fixed on the peripheral edge of said window.

8. An occupant restraining device comprising: a shielding member adapted to be deployed from a peripheral edge of a window of a vehicle to shield said window; and a deployment mechanism for deploying said shielding member, wherein:

said shielding member includes a stationary side edge portion that remains stationary upon deployment and;

an oblique moving side edge portion for crossing said window obliquely upon deployment, said shielding member being formed in a generally triangular shape to shield said window on the lower side of said oblique moving side edge portion;

said shielding member is folded such that said oblique moving side edge portion comes closer to said stationary side edge portion without changing a length of said stationary side edge portion;

said shielding member is folded in a folding-fan shape having a center near an intersection of said oblique moving side edge portion and said stationary side edge portion; and said shielding member is housed in the peripheral edge of said window so that two end portions of said stationary side edge portion are mounted and fixed on the peripheral edge of said window.

* * * * *